US006308516B1

(12) United States Patent
Kamada

(10) Patent No.: US 6,308,516 B1
(45) Date of Patent: Oct. 30, 2001

(54) CONTROL DEVICE FOR HYDRAULICALLY-OPERATED EQUIPMENT

(75) Inventor: Seiji Kamada, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/317,443

(22) Filed: May 24, 1999

(30) Foreign Application Priority Data

May 22, 1998 (JP) ........................................... 10-141963

(51) Int. Cl.[7] ........................................... F16D 31/02
(52) U.S. Cl. ........................................... 60/450; 60/452; 60/911
(58) Field of Search ........................................... 60/450, 452, 433, 60/368, 911, 329

(56) References Cited

U.S. PATENT DOCUMENTS 5,152,143 * 10/1992 Kajita et al. ........................... 60/420
5,680,760 * 10/1997 Lunzman ........................... 60/426
5,743,089 * 4/1998 Tohji ........................... 60/450

* cited by examiner

*Primary Examiner*—F. Daniel Lopez
*Assistant Examiner*—Thomas E. Lazo

(74) *Attorney, Agent, or Firm*—Armstrong, Westerman, Hattori, McLeland & Naughton, LLP

(57) ABSTRACT

Workability and operability of hydraulically-operated equipment is enhanced by optimally changing in accordance with the work content a responsiveness of an output signal relative to an input signal of each hydraulic control device, which constitutes a hydraulic system, at times heightening quick reaction capabilities, and at other times heightening steadiness. As a quantity of state of a load pressure signal of a hydraulic actuator, for example, is inputted to a response suppressing portion, and in accordance with a high-pass filter, a higher frequency fluctuation component in a pressure signal is extracted. An operation quantity of an operation lever, for example, is inputted from a suppression quantity specifying portion, and a frequency domain extracted by the high-pass filter is changed so as to become a narrow range of greater than a higher frequency in accordance with an operation quantity becoming larger, and further, so as to become a broad range of greater than a lower frequency in accordance with an operation quantity becoming smaller. Then, a compensation operation is performed, which subtracts from a flow command to a response suppression target apparatus, a signal of a high frequency component of a hydraulic actuator load pressure, and a compensated flow command is outputted to the response suppression target apparatus.

24 Claims, 39 Drawing Sheets

HIGH-PASS FILTER CHARACTERISTICS
(BODE DIAGRAM)

CONTROL DEVICE FOR HYDRAULICALLY-OPERATED EQUIPMENT

BACKGROUND OF THE INVENTION

1. Field of the Invention

The present invention relates to a control device capable of optimally adjusting in accordance with work content the responsiveness of a hydraulic system in hydraulically-operated equipment, comprising a hydraulic shovel, crane and other construction machinery.

2. Description of the Related Art

Hydraulically-operated equipment such as construction equipment is generally provided with a hydraulic pump 2, which is driven in accordance with a motor (engine) 1, and constitutes a hydraulic system, as shown in FIG. 1, so that the pressure oil discharged from this hydraulic pump 2 is supplied to various hydraulic actuators 3, 4. In this case, the orifice size of various flow control valves 5, 6 is changed respectively in accordance with the operation quantity of a plurality of operation levers 7, 8, and the discharge pressure oil of the hydraulic pump 2 is distributed to the respective hydraulic actuators 3, 4.

There are various kinds of systems for controlling the swash plate of a hydraulic pump 2, but in general, when an operation lever 7, 8 is operated, the position of the swash plate 2*a* of the hydraulic pump 2 (pump displacement q (cc/rev)) is controlled so that the discharge quantity of the hydraulic pump 2 increases in accordance with the magnitude of the operation quantity thereof. In accordance therewith, the flow required by the operation of the operation lever 7, 8 is supplied to the respective hydraulic actuator 3, 4. The position of the swash plate 2*a* of the hydraulic pump 2 (pump displacement q (cc/rev)) is changed in accordance with a drive signal, that is, a flow command r outputted from a controller 30 to a mechanism 31, which drives the swash plate 2*a* of the hydraulic pump 2.

Herein lies a need to enhance workability by optimally controlling in accordance with work content the responsiveness of signals outputted relative to the inputted signals of a hydraulic pump 2 and other hydraulic control apparatus in a hydraulic system such as this.

For example, when work is to be carried out rapidly, the desire is to heighten responsiveness so that hydraulic actuators 3, 4 and the work machine driven thereby are driven with good responsiveness in accordance with the operation of the operation levers 7, 8. Further, for work that requires fine control, it is desirable to lower responsiveness so that even if operation levers 7, 8 are operated fully in haste, the work machine is not quick to follow suit.

In particular, there are cases wherein it is desirable to lower responsiveness in accordance with work content even in a hydraulic system, which is constructed so that the response of each individual hydraulic control apparatus is sufficiently large.

Accordingly, technology related to heightening this kind of workability is disclosed in Japanese Patent Laid-open No. 9-151859.

In the invention disclosed therein, when the load pressure of a hydraulic cylinder, hydraulic motor, or other hydraulic actuator suddenly increases, to prevent hydraulic pump discharge pressure from rising, and the number of revolutions of the motor (engine) driving the hydraulic pump from dropping, the change in hydraulic pump discharge pressure is detected, and when this discharge pressure change exceeds a predetermined value, the discharge quantity of the hydraulic pump is reduced, and the load acting on the motor is decreased. In accordance therewith, a drop in the number of revolutions of the motor is prevented in advance.

However, if the hydraulic pump load suddenly changes in accordance with this control, even though a drop in engine revolutions is prevented by reducing the pump discharge quantity in accordance with the magnitude of the hydraulic pump pressure change, in a situation, wherein engine revolutions do not drop, and for light load work, in which the change in hydraulic pump discharge pressure or discharge flow is small, with regard to the behavior of the hydraulic pump, it is the same as if no control is performed, and there is no change in the responsiveness of the hydraulic pump.

In general, for a hydraulic system, which sufficiently enhances the responsiveness of the hydraulic pump unit to improve the workability of "skeleton work" and "bucket sifting work", which require work machine responsiveness, when attempting to perform work, which requires extremely fine control, such as "correction and finishing work", there is the reverse problem that the hydraulic pump responds sensitively to hydraulic pump load pressure and operation lever operation, causing fine control capabilities to be lost. Consequently, skill is required to operate the operation levers when performing fine control work, placing a big burden on the operator.

Further, with the technologies disclosed Japanese Patent Publication No. 4-51670 and Japanese Patent Application Laid-open No. 6-200878, to prevent hydraulic pump discharge pressure from suddenly fluctuating or hunting when a work machine is suddenly put into operation, either a differential value of the hydraulic pump discharge pressure is calculated, or a pressure fluctuation component of a peculiar vibration frequency component determined beforehand in accordance with the hydraulic pump is calculated from a hydraulic pump discharge pressure signal, and this calculated value is subtracted from the hydraulic pump discharge flow command value. In accordance therewith, the fluctuation of the hydraulic pump discharge pressure is prevented from continuing, and the vibration characteristics of the hydraulic pump are enhanced.

However, even though it is possible to move toward curbing hydraulic pump discharge pressure vibration in accordance with this control, when performing work in which it is not desirable to suppress vibration, it is not possible to lower the responsiveness of the hydraulic pump in a direction that does not curb vibration. In other words, hydraulic pump responsiveness could not be changed in accordance with the work content.

Thus, load sensing control, negative pump control, and positive pump control are the usual control systems for a hydraulic pump.

First, load sensing control will be explained.

With the invention disclosed in Japanese Patent Application Laid-open No. 7-197907, in so-called load sensing control (hereinafter referred to as LS control for convenience sake), the differential pressure between hydraulic pump discharge pressure and maximum load pressure is detected, and control is performed by multiplying control gain relative to the flow command for the hydraulic pump so that this differential pressure constitutes the target differential pressure value. In this case, the operation quantity of the operation lever is detected, and control gain is increased in accordance with the increases in operation quantity, so that the deviation between target differential pressure and actual differential pressure is reduced more rapidly when operation quantity is large, thus enhancing the quick reaction capabilities of the hydraulic pump. And when the operation quantity of the operation lever is small, the deviation between the above-mentioned differential pressures is reduced relatively slowly by decreasing control gain so that the discharge flow of the hydraulic pump is made to change smoothly. Furthermore, load sensing control is one system for controlling the swash plate of a hydraulic pump, and controls the hydraulic pump swash plate so that the hydraulic pump discharge pressure is always higher by the magnitude of a predetermined target differential pressure than the maximum value of the load pressure (hereinafter referred to as the maximum load pressure) of the hydraulic actuator during operation.

Next, negative pump control will be described.

Negative pump control (hereinafter referred to as negative control for convenience sake) is a pump control system, which controls the swash plate of a pump so that the flow discharged from the center by-pass circuit to a tank is constant, and is designed to change the time it takes for the hydraulic pump discharge flow to reach a target flow by multiplying control gain of a magnitude that corresponds to the operation quantity of an operation lever by the flow command relative to the hydraulic pump. Furthermore, negative pump control is a system for controlling the swash plate of a hydraulic pump, and provides a center by-pass circuit, which discharges pressure oil inputted from the hydraulic pump to a tank via a flow control valve. The flow control valve increases the closing of the above-mentioned center by-pass circuit from a neutral state in accordance with the performance of a stroke, and also detects the flow discharged to the tank. As this flow becomes smaller, the negative control system controls the hydraulic pump swash plate so that the flow discharged from the hydraulic pump increases, making the flow discharged from the center by-pass circuit to the tank constant.

However, with the invention disclosed in this Japanese Patent Application Laid-open No. 7-197907, since control gain is simply multiplied by the flow command signal to the hydraulic pump, control deviation increases when control gain becomes small. That is, when carrying out a level fine control operation, in which the operation quantity of the operation lever is small, it is a problem in that normal state controllability worsens as a result of increased control deviation.

Further, as a pump control system other than the above-mentioned LS control and negative control, there is what is called positive pump control (hereinafter referred to as positive control for convenience sake), which detects the operation quantity of an operation lever, and controls the hydraulic pump swash plate so that a discharge volume (supply flow) corresponding to the sum of the operation quantity thereof (operator required flow) is discharged from the hydraulic pump.

However, in this positive control system, there is no control deviation, and the above-described control, wherein control gain is multiplied by a flow command, cannot be employed.

Conversely, in the above-mentioned positive control system, it might be possible to provide a sensor, which detects the position of the hydraulic pump swash plate, and to find the deviation between this detected position and a target position, and multiply same by control gain. However, to provide anew such a sensor to an existing positive control system would raise system construction costs. But without adding new hardware to an existing positive control system, control, wherein control gain is multiplied by a flow command, will not be possible.

Further, the invention disclosed in Japanese Patent No. 2651079 is constituted so that the change speed of the hydraulic pump swash plate inclined rotation angle (discharge volume) is selected in accordance with a switch operation by an operator, and hydraulic pump discharge volume is controlled by control gain corresponding to the selected speed.

However, in the art disclosed therein, the problem is that the response speed of the hydraulic pump must be switched using a switch operation each time work content differs, making operation troublesome. Furthermore, the nature of the control of the invention disclosed in this Patent No. 2651079 is the same as that disclosed in the above-mentioned Japanese Patent Application Laid-open No. 7-197907, giving rise to the problem that controllability deteriorates when performing work that requires fine lever control.

Further, the invention disclosed in Japanese Patent No. 2628418 is constituted so that flow control valve responsiveness can be changed by selecting the time until the flow of pressure oil supplied from the flow control valve to a hydraulic actuator reaches a command value.

However, the problem is that the art disclosed therein, similar to that disclosed in the above-mentioned Japanese Patent No. 2651079, requires that flow control valve responsiveness be switched using a switching operation, making for troublesome operation.

Furthermore, the nature of the control of this Japanese Patent No. 2628418 is such that, as shown in FIG. 23(*b*), control is performed by merely decreasing response time by decreasing the time change of an input signal (FIG. 23(*a*)), and does not perform control, wherein, as shown in FIG. 23(*c*), detects a quantity of state different from the input signal, and holds responsiveness in check by compensating the input signal in a direction, which hinders a change in this quantity of state. When performing the control of this Japanese Patent No. 2628418, an output signal is simply delayed relative to an input signal, making it impossible to achieve sufficient steadiness and quick reaction capabilities.

SUMMARY OF THE INVENTION

The present invention was devised with this situation in view, and challenges the problem of enhancing workability and operability by optimally changing in accordance with the work content the responsiveness of an output signal relative to an input signal of each hydraulic control device that constitutes a hydraulic system, at times heightening quick reaction capabilities, and at other times heightening steadiness. Moreover, the present invention challenges the problem of achieving same without the intervention of operator control, and without incurring high costs.

Accordingly, to solve for the above-mentioned problems, according to a first invention of the present invention, a control device of a hydraulically-operated machine which comprises, as hydraulic control apparatus, a motor, a hydraulic pump which is driven by the motor, at least one hydraulic actuator which is driven in accordance with being supplied with a pressure oil discharged from the hydraulic pump, and a flow control valve which is driven in accordance with an operation of an operation lever and which controls a flow of the pressure oil supplied to the hydraulic actuator, in which, from among the respective hydraulic control apparatus, there is established a response suppression target apparatus, for which a response of an output signal relative to an input signal is to be suppressed, wherein the control device comprises:

quantity of state detecting means for detecting as a quantity of state either a physical quantity which changes in accordance with an operation of the response suppression target apparatus, or an operation quantity which changes the physical quantity; and response suppressing means for suppressing the response of the output signal relative to the input signal in accordance with compensating the input signal to the response suppression target apparatus so as to prevent a change in the physical quantity based on the quantity of state detected by the quantity of state detecting means.

Further, according to a second invention, a control device of a hydraulically-operated machine which comprises, as hydraulic control apparatus, a hydraulic pump which is driven by a motor, at least one hydraulic actuator which is driven in accordance with being supplied with a pressure oil discharged from the hydraulic pump, and a flow control valve which is driven in accordance with an operation of an operation lever and which controls a flow of the pressure oil supplied to the hydraulic actuator, in which, from among the respective hydraulic control apparatus, there is established a response suppression target apparatus, for which a response of an output signal relative to an input signal is to be suppressed, wherein the control device comprises:

quantity of state detecting means for detecting as a quantity of state either a physical quantity which changes in accordance with an operation of the response suppression target apparatus, or an operation quantity which changes the physical quantity;

suppression quantity specifying means for specifying a suppression quantity of the response of the response suppression target apparatus; and response suppressing means for suppressing the response of the output signal relative to the input signal in accordance with compensating the input signal to the response suppression target apparatus so as to prevent by a magnitude of the specified suppression quantity a change in the physical quantity based on the quantity of state detected by the quantity of state detecting means and the suppression quantity specified by the suppression quantity specifying means.

In other words, if this were to be explained at the level of an aspect, as shown in FIG. 2, a load pressure signal x of a hydraulic actuator 4, for example, is inputted to response suppressing means 11 of the first and second inventions as the quantity of state detected by quantity of state means 9, and a high frequency fluctuation component y of the pressure signal x is extracted in accordance with a high-pass filter, which extracts a frequency component that exceeds a predetermined frequency fc.

Meanwhile, from suppression quantity specifying means 10 of the second invention, for example, operation quantity S of operation lever 8, which drives the hydraulic actuator 4, is inputted, and the frequency domain extracted by the high-pass filter 11*b* is changed (See FIG. 3) so that this domain constitutes the narrow range of a higher frequency as operation quantity S increases, and constitutes the wide range of a lower frequency as operation quantity S decreases. This suppression quantity specifying means 10 is not provided in the first invention.

And there is performed a compensation operation, which subtracts a high frequency component signal y of the hydraulic actuator 4 load pressure x, which is extracted by the high-pass filter 11*b* of response suppressing means 11 from a flow command r (pre-compensation flow command) to a response suppression target apparatus, the hydraulic pump 2 for example, and a compensation flow commend r' is outputted to the response suppression target apparatus 2.

When the quantity of state x (load pressure change signal) increases, the flow command r is compensated in a direction that reduces the discharge quantity of the response suppression target apparatus 2 (hydraulic pump) so as to suppress this increase, and when the quantity of state x (load pressure change signal) decreases, the flow command r is compensated in a direction that increases the discharge quantity of the response suppression target apparatus 2 (hydraulic pump) so as to suppress this decrease (See FIG. 23(*b*)).

In accordance therewith, when the operation quantity of the operation lever 8 is small, that is, at so-called fine lever control, as shown in FIG. 7(*a*), the load pressure x high frequency component y constitutes a component of not less than the low frequency fc (=1 Hz), and the response of the hydraulic pump 2 is suppressed so as to prevent slow load pressure x changes as well, making the pressure change of the pump 2 smooth. Consequently, since the hydraulic actuator 4 is not quick to imitate the operation of the operation lever 8, operability at fine lever control work is improved (improved steadiness).

Conversely, when the operation quantity of the operation lever 8 is large, that is, during full lever operation, as shown in FIG. 7(*b*), the load pressure x high frequency component y constitutes a component of greater than the high frequency fc (=20 Hz), and the response of the hydraulic pump 2 is suppressed so as to prevent only a change in load pressure x at a higher frequency. That is, since minute signals y such as noise (>20 Hz) have almost no affect on hydraulic pump 2 response, the response of the hydraulic pump 2 is hardly suppressed at all. Consequently, since the hydraulic actuator 4 is quick to imitate the operation of the operation lever 8, workability during full lever operation work is improved (improved quick reaction capabilities).

As described above, in the first and second inventions, a physical quantity (hydraulic actuator 4 load pressure PL), which changes in accordance with the operation of a response suppression target apparatus 2, is detected as a quantity of state x, an input signal r to the response suppression target apparatus 2 is subjected to a compensation operation so as to prevent a change in this quantity of state x, and this compensation input signal r' is sent to the response suppression target apparatus 2 so as to suppress the response of the response suppression target apparatus 2. And since suppression quantity specifying means 10 functions to change the suppression quantity of the response suppression target apparatus 2 response, the responsiveness of an output signal relative to an input signal of hydraulic control apparatus, which constitute a hydraulic system, can be optimally changed in accordance with the work content, at times enabling quick reaction capabilities to be enhanced, and at other times enabling steadiness to be enhanced. In accordance therewith, workability and operability are greatly improved. Moreover, operation is not troublesome since operator control does not play an active part. Further, it is possible to construct a hydraulic system without incurring high costs.

DETAILED DESCRIPTION OF PREFERRED EMBODIMENTS

The aspects of an embodiment of a control device of hydraulically-operated equipment related to the present invention will be described hereinbelow with reference to the figures.

Furthermore, in these aspects of the embodiment, the hydraulically-operated equipment is assumed to be construction equipment such as a hydraulic shovel.

Figure 1:
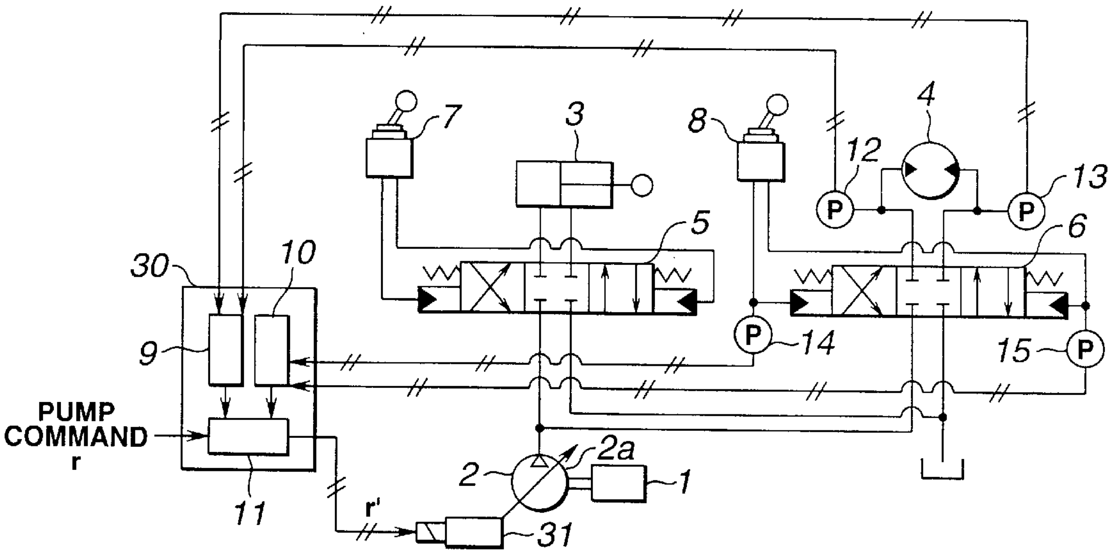
FIG. 1 is a diagram showing the constitution of a control device of a hydraulic shovel.

FIG. 1 shows the constitution of a hydraulic shovel control device.

As shown in this figure, the control device thereof constitutes a variable displacement-type hydraulic pump 2, which is driven by an engine 1; a hydraulic cylinder 3 for a boom, and a hydraulic motor 4 for rotating as a plurality of hydraulic actuators, which are driven by being supplied with pressure oil discharged from this hydraulic pump 2; flow control valves 5, 6 for changing the size of various orifices in accordance with the operation quantity of operation levers 7, 8, and for controlling the flow of pressure oil supplied to the boom cylinder 3, and rotation motor 4 from the hydraulic pump 2; a swash plate drive mechanism portion 31 for changing the position of a swash plate 2*a* of the hydraulic pump 2 (pump displacement); and a controller 30 for outputting a pump flow command r' to this swash plate drive mechanism portion 31. The swash plate drive mechanism portion 31 changes the position of the swash plate 2*a* of the hydraulic pump 2 so as to achieve a flow (displacement) q (cc/rev) that accords to the inputted pump flow command r'.

Furthermore, in accordance with the above-mentioned boom hydraulic cylinder being driven, the hydraulic shovel boom moves circularly in the up-down direction, and in accordance with the above-mentioned rotation hydraulic motor 4 being driven, the upper revolving superstructure of the hydraulic shovel revolves around relative to the undercarriage.

The first aspect will be described with regard to when the hydraulic pump 2 is set as the response suppression target apparatus, the drive pressure PL (load pressure PL) of the rotation hydraulic motor 4 is detected as the quantity of state, and, as suppression quantity specifying means, the suppression quantity of the response of the hydraulic pump 2 is specified in accordance with the operation quantity of the operation lever 8. Here, the quantity of state indicates a physical quantity (load pressure PL), which changes in accordance with the operation of the hydraulic pump 2, which is the response suppression target apparatus.

Figure 2:
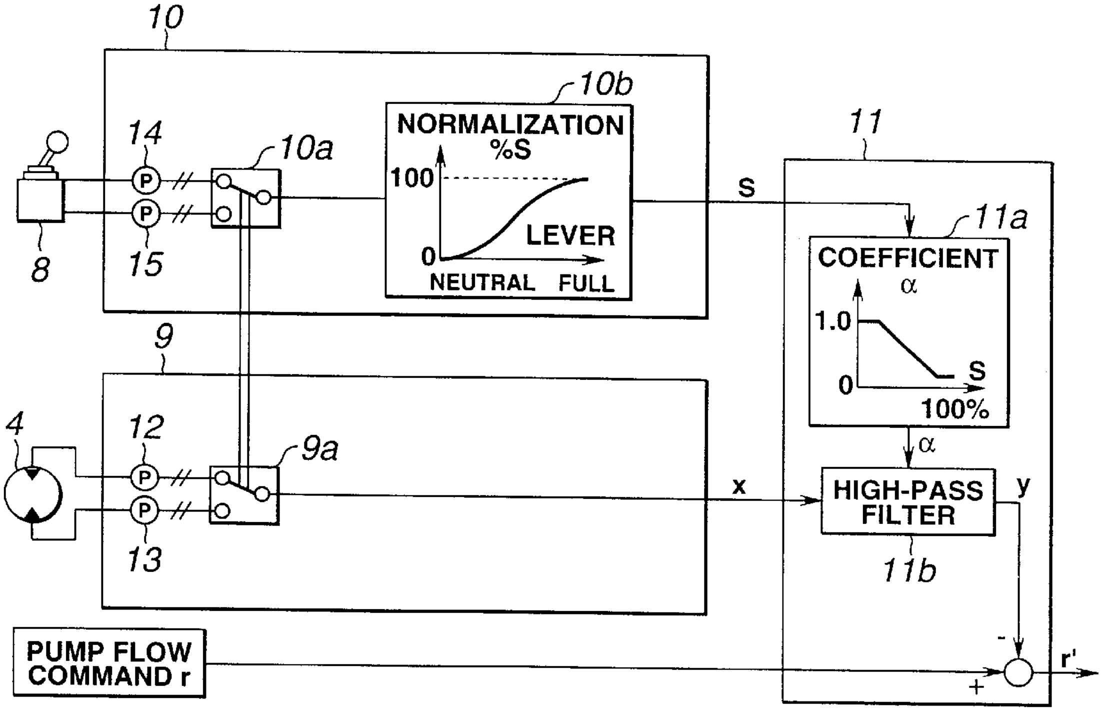
FIG. 2 is a diagram showing an aspect, which treats the operation quantity of an operation lever as a quantity of state.

In other words, as shown in FIG. 2, the controller 30 constitutes a quantity of state detecting portion 9, suppression quantity specifying portion 10, and a response suppressing portion 11.

The operation quantity of the operation lever 8 for rotation is detected as pilot pressure Pp in accordance with pressure sensors 14 (operation quantity to rotate to the left), 15 (operation quantity to rotate to the right) provided on the pilot pressure oil supply channel of the rotate-left side, and the pilot pressure oil supply channel of the rotate-right side, respectively. In the suppression quantity specifying portion 10, the pilot pressure Pp of the actual operating direction (for example, rotate to the left) is selected in accordance with comparing in the selecting portion 10*a* the magnitude of the 2 pilot pressures Pp (operation quantity to rotate to the left), (operation quantity to rotate to the right) detected by each pressure sensor 14, 15, However, when the operation lever 8 is in the neutral position, both pilot pressures Pp become zero.

Furthermore, when the pilot pressure Pp of the side to which rotation is to be performed is achieved, this pilot pressure Pp is normalized by the normalization processing portion 10*b* using a predetermined function, and in accordance with the magnitude of the pilot pressure Pp, is converted to a value S from 0 to 100%, for example, and a value S that indicates this operation quantity is outputted to the response suppressing portion 11.

Meanwhile, the load pressure (drive pressure) of the rotation motor 4 is detected in accordance with pressure sensors 12 (load pressure PL of rotate-left side), 13 (load pressure PL of rotate-right side) provided on the pressure oil supply channel of the rotate-left side, and the pressure oil supply channel of the rotate-right side, respectively.

In the selecting portion 9*a* of the quantity of state detecting portion 9, the load pressure x of the side (for example, the rotate-left side), on which pressure oil flows into the rotation hydraulic motor 4, is selected in response to a control direction selection operation in the selecting portion 10*a* of the suppression quantity specifying portion 10, and this load pressure x is outputted to the response suppressing portion 11.

In the response suppressing portion 11, by making use of the load pressure x of the above-mentioned rotation side as the quantity of state, the flow command r to the hydraulic pump 2 is compensated to r', and hydraulic pump 2 response is suppressed. In this case, the above-mentioned normalized rotation operation quantity S is utilized as the signal that designates suppression quantity, and the suppression quantity is changed.

Furthermore, the flow command r to the hydraulic pump 2 prior to a compensation operation is generally furnished in accordance with the respective hydraulic pump control system, such as LS control, positive control, and negative control.

Figure 3:
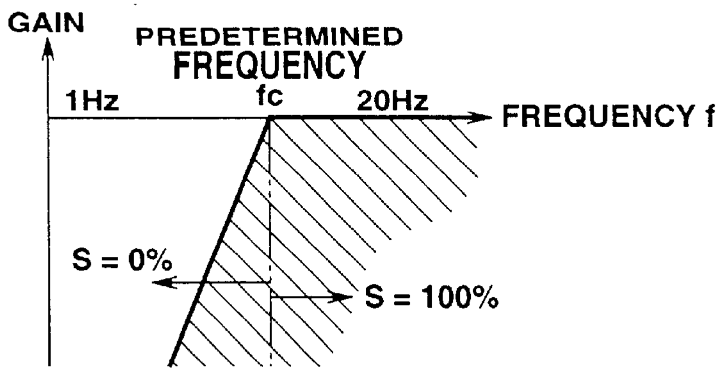
FIG. 3 is a Bode diagram showing the characteristics of a high-pass filter.

In the high-pass filter 11*b* of the response suppressing portion 11, a frequency component (signal fluctuation component) of greater than a predetermined frequency fc is extracted from among the inputted rotation side load pressure x signals, as shown in FIG. 3.

Here, the high-pass filter 11*b* may be constituted as an analog circuit, and it may be configured for digital processing in accordance with software.

Figure 4A:
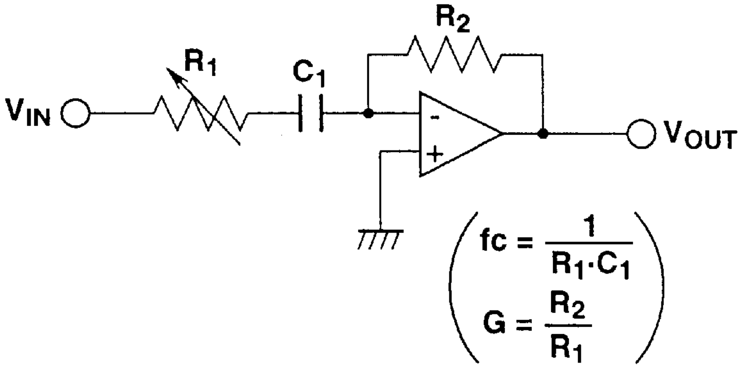
FIGS. 4(*a*), (*b*) are circuit diagrams of high-pass filters constituted from analog circuits.
Figure 4B:
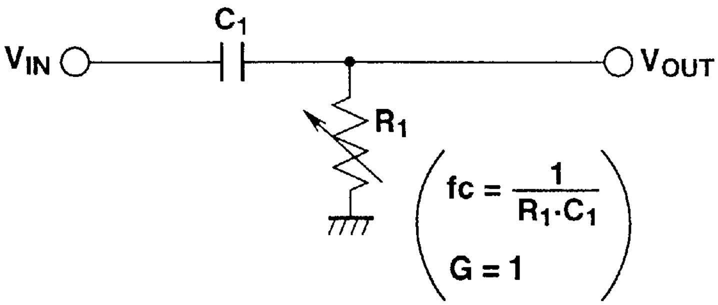

FIG. 4(*a*), (*b*) show examples of circuits, which constitute high-pass filters 11*b* from analog circuits. For example, a high-pass filter 11*b* can be realized using an operational amplifier circuit. Furthermore, in the figure, R indicates resistance, and C indicates capacitance.

In the circuit shown in FIG. 4(*a*), a frequency component of greater than the frequency fc (=1/R1·C1) is extracted from among the input signals $V_{IN}$ as the output signal $V_{OUT}$. Here, by letting resistance R1 be variable resistance, it is possible to adjust the frequency domain to be obtained. Further, the extracted high frequency component is amplified in accordance with gain G (=R2/R1), and the magnitude of this gain G can be changed in accordance with adjusting the resistance R1, R2.

Further, the circuit shown in FIG. 4(*b*) depicts a simple constitution of when gain G is fixed at 1. In this case, the high frequency component to be extracted constitutes a frequency component of greater than fc (=1/R1·C1).

Figure 5:
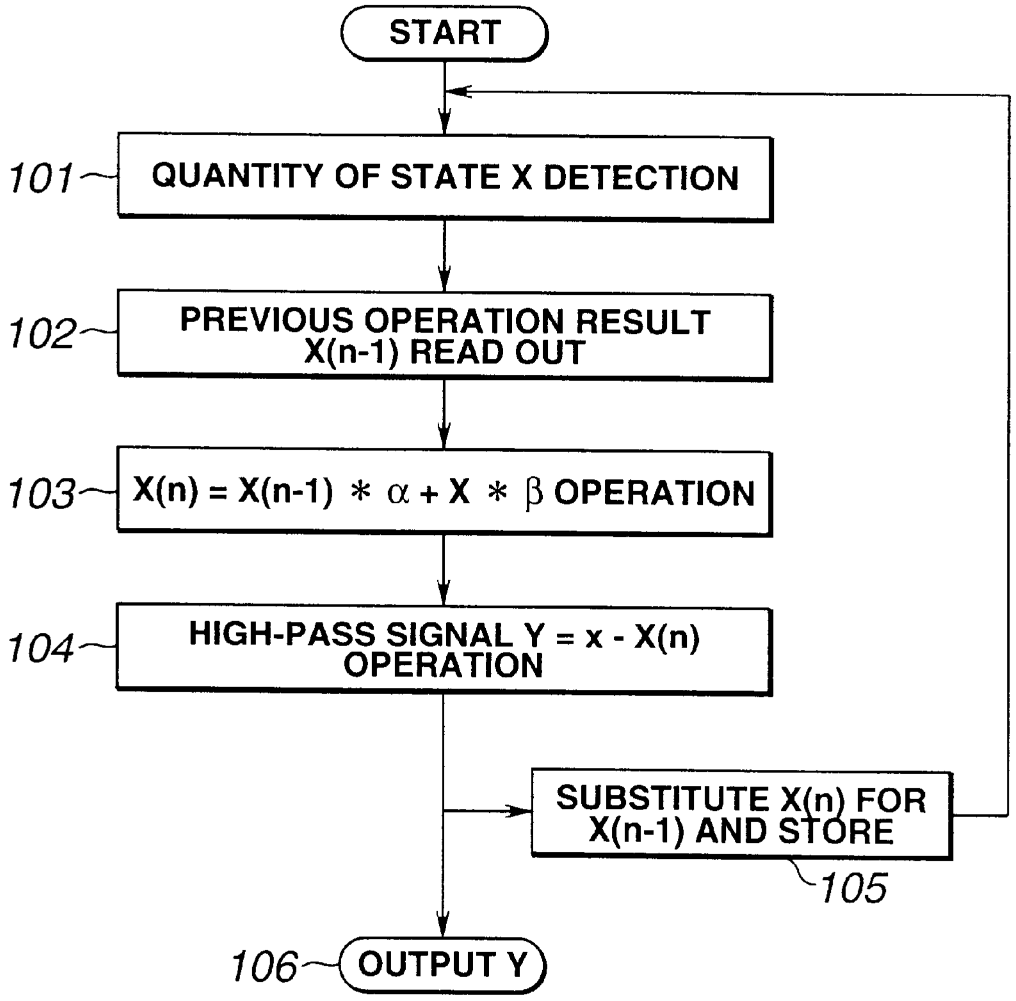
FIG. 5 is a flowchart illustrating the procedures for outputting a high-pass signal.
Figure 6A:
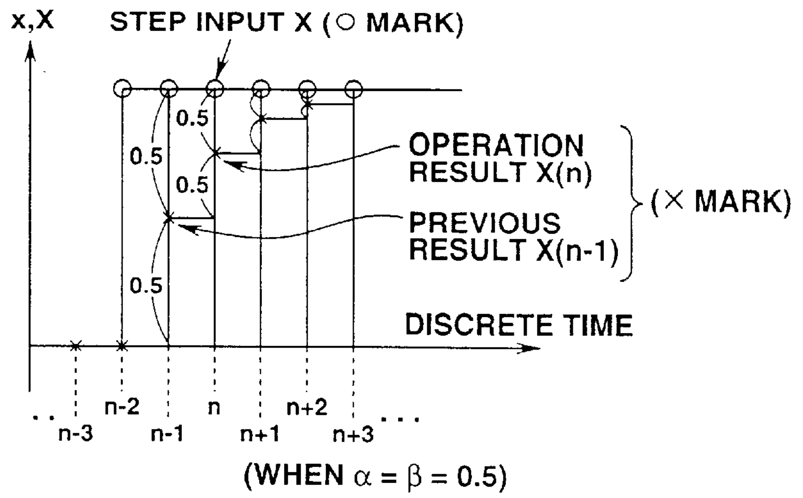
FIGS. 6(*a*), (*b*) are diagrams used to illustrate the contents of FIG. 5.
Figure 6B:
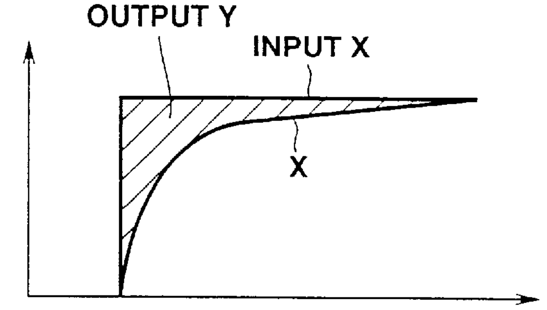

Conversely, FIG. 5 shows an example of a flowchart of when a high-pass filter 11*b* is processed digitally in accordance with software. The contents of the processing shown in FIG. 5 are shown in FIG. 6(*a*), and the relationship between the input x, and the output X produced in accordance with the processing thereof, is shown in FIG. 6(*b*).

In the controller 30, inputting, operating and outputting are repeated at predetermined time intervals (sampling times), the detected value of the quantity of state is treated as x, and the operation result of the nth sampling time is treated as X(n).

Thus, as shown in FIG. 5, first, the quantity of state x of the current sampling time is inputted (Step 101).

Next, the previous operation result X(n−1) is read out (Step 102), and using this previous operation result X(n−1) and the current quantity of state x, an operation for finding the current X(n) is executed as in Formula (1) below:

$$X(n)=X(n-1)*\alpha+x*\beta \text{(provided that } \alpha+\beta=1) \quad (1)$$

(Step 103)

Next, using the above-mentioned operation result X(n) and the current quantity of state x, an operation for finding the high-pass signal Y is executed as in Formula (2) below:

$$Y=x-X(n) \quad (2)$$

(Step 104)

And then, the current X(n) determined as described above is treated as the previous operation result X(n−1) (Step 105), the procedure returns to Step 101, and thereafter, the same processing is repeatedly executed.

By repeatedly carrying out this kind of operation, the low frequency (low-pass) component of the input value (quantity of state) x is obtained as X(n).

And the high frequency (high-pass) component of the input value (quantity of state) x is obtained as Y.

The above processing will be explained as specific movements on a graph, which plots discrete time along the horizontal axis, and X,x along the vertical axis, as shown in FIG. 6(*a*). Now, in the above-mentioned Formula (1), α=β=0.5 (identical) is a given, and an input value (quantity of state) x is furnished in step form. Thus, the waveform of X constitutes a waveform that sequentially takes the median of the value of the previous X(n−1) and a step input value (quantity of state) x. Consequently, as shown in FIG. 6(*b*), the waveform of X represents a gently fluctuation component (low frequency component) of the input waveform x.

Further, the high frequency component Y of x, as shown in the slanted line portion of FIG. 6(*b*), is represented by a fluctuating portion (high frequency fluctuation component) relative to a low frequency component X(n) in the quantity of state x.

Therefore, when the values of the coefficients α, β in Formula (1) above are changed, it is possible to change the above-mentioned extracted low frequency component, high frequency component.

For example, when α approaches 1 (β approaches 0), as is clear from Formula (1) above, even if the quantity of state x should suddenly change, the item of the previous operation result X(n−1) becomes dominant, and the current operation result X(n) becomes incapable of changing rapidly relative to the previous operation result X(n−1).

Further, by contrast, when α approaches 0 (β approaches 1), the item of the quantity of state x becomes dominant, and the operation result X(n) is changed in accordance with the change of the quantity of state x.

That is, the speed of change of a signal to be extracted is altered in accordance with the magnitude of coefficient α (β), and in accordance therewith, it becomes possible to change the extraction frequency component of the signal. Conversely speaking, when a threshold value fc for extracting a high frequency component y via the high-pass filter 11*b* is furnished, coefficient α(β) is univocally established.

To extract a low frequency component of less than the frequency fc, when sampling time is t, and the natural logarithm is e, the coefficient is generally given as α=e to the −2 πft power.

For example, when sampling time t=0.01 seconds, in order to extract a frequency of less than fc=1 Hz, the coefficient can be set to α=0.94. Further, in order to extract a frequency of less than fc=20 Hz, the coefficient can be set to α=0.28.

When a low frequency component of less than the frequency fc is extracted in this manner, it is possible to obtain a high frequency component y of greater than the frequency fc in accordance with the operation of Formula (2) above.

Figure 7A:
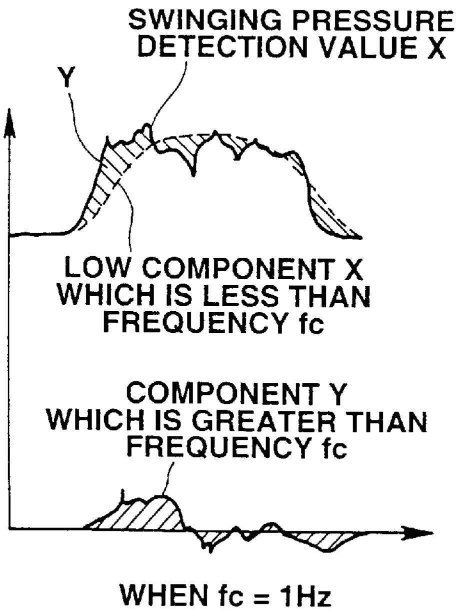
FIGS. 7(*a*), (*b*) are diagrams showing high frequency fluctuation components, which are emitted in accordance with the magnitude of a frequency threshold value.
Figure 7B:
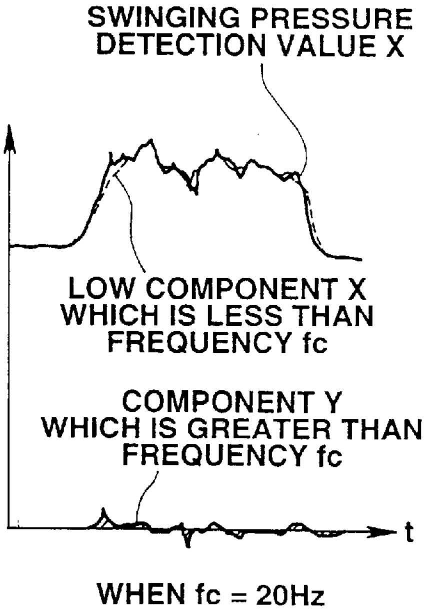

FIGS. 7(*a*), (*b*) are diagrams showing the circumstances when the value of α is changed, and a high frequency component y of greater than frequency fc=1 Hz, and a high frequency component y of greater than frequency fc=20 Hz, respectively, is extracted.

That is, in the same figure, first, a low frequency component X of less than frequency fc, which is indicated by a broken line, is extracted relative to the quantity of state x (rotation load pressure detection value) indicated by a solid line, and a high frequency component of greater than fc is extracted from among the quantity of state x as a high frequency fluctuating portion relative to this low frequency component X. In FIG. 7(*b*), in which the threshold value fc is high relative to that of FIG. 7(*a*), it can be seen that only an insignificant noise component is extracted as a high frequency component y.

Furthermore, in the processing shown in FIG. 5, for the sake of expedience, an example of a primary software filter was used in the explanation, but naturally, the present invention can constitute a secondary or higher order filter, which utilizes an operation result X(n−2) of prior to the n−$2^{nd}$ time. In accordance therewith, extraction frequency characteristics can be set by bringing them more in line with actual machine behavior.

Now then, in the coefficient operating portion 11*a* of the response suppressing portion 11, a frequency threshold value change coefficient α corresponding to a rotation operation lever 8 operation quantity normalization value (0–100%) inputted from the suppression quantity specifying portion 10 can be obtained from a memory table. In this memory table is stored a corresponding relationship, wherein the larger the operation quantity S of the operation lever 8, the smaller α becomes. That is, when the operation quantity S of the operation lever 8 approaches 0%, α approaches 1, and when the operation quantity S of the operation lever 8 approaches 100%, α becomes 0. This obtained a is inputted to the high-pass filter 11*b*.

In the high-pass filter 11*b,* a high frequency fluctuation component y of greater than a threshold value fc corresponding to the above-mentioned coefficient α is extracted from among the rotation side load pressure x signals detected by the quantity of state detecting portion 9.

FIG. 7(*a*) is a case when the operation quantity S of the operation lever 8 is small, and α=0.94 is furnished, and a high frequency component y of greater than frequency fc=1 Hz is extracted. FIG. 7(*b*) is a case when the operation quantity S of the operation lever 8 is large, and α=0.28 is furnished, and a high frequency component y of greater than frequency fc=20 Hz is extracted.

As shown in the same FIG. 7, in FIG. 7(*b*), in which the operation quantity S of the operation lever 8 is larger than that on FIG. 7(*a*), it can be seen that only an insignificant noise component if extracted as a high frequency component y.

Furthermore, when the high-pass filter 11*b* is constituted from an analog circuit shown in FIG. 4, the closer the operation quantity S of the operation lever 8 is to 0%, the more the resistance value of the variable resistance R1 can be increased, and the closer the operation quantity S of the operation lever 8 is to 100%, the more the resistance value can be decreased. Furthermore, in the case of FIG. 4(*a*), the closer the operation quantity S of the operation lever 8 is to 0%, the more the resistance value R2 can be increased, and the closer the operation quantity S is to 100%, the more the resistance value R2 can be decreased. By so doing, when the lever operation quantity is large, gain decreases, making it possible to further reduce the response suppression quantity.

A high frequency fluctuation component y of a rotation load pressure x obtained by the high-pass filter 11*b* is subtracted from the flow command value r relative to the hydraulic pump 2, and a compensated flow command value r' is outputted to the hydraulic pump 2 (swash plate drive mechanism portion 31).

Figures 23A, 23B, 23C:
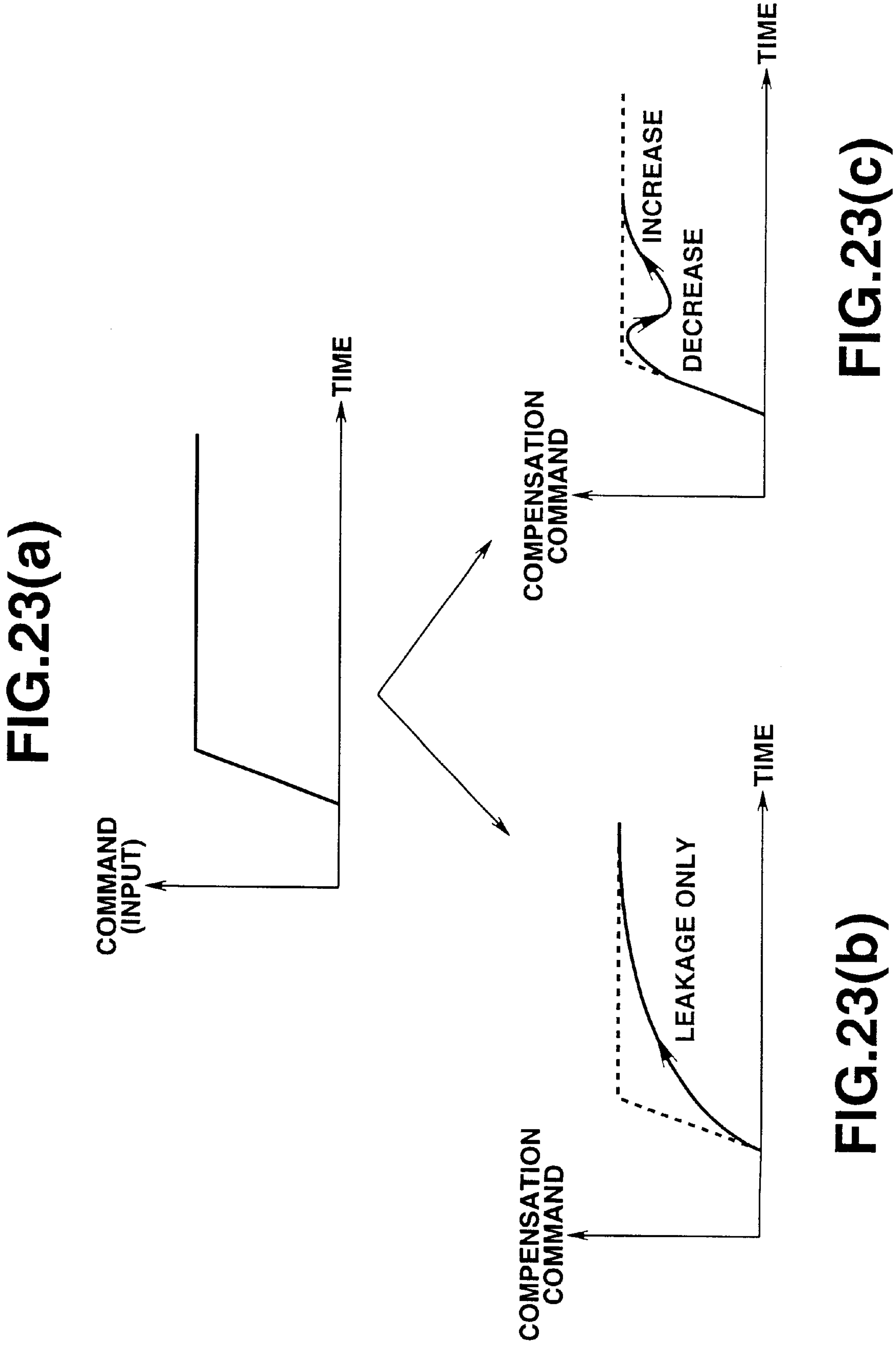
FIGS. 23(*a*), (*b*), (*c*) are diagrams used to illustrate differences in control between prior art and the present invention.

Because a high frequency fluctuation component y of a rotation load pressure x is subtracted from a flow command value r in this manner, when a quantity of state x (load pressure fluctuation signal) increases, the flow command r is compensated in a direction, which reduces the discharge quantity q of the hydraulic pump 2 so as to suppress this increase. Further, when a quantity of state x (load pressure fluctuation signal) decreases, the flow command r is compensated in a direction, which increases the discharge quantity q of the hydraulic pump 2 so as to suppress this decrease. The contents of this compensation are shown schematically is FIG. 23(*c*).

In this manner, the correspondence of an output signal relative to an input signal of the hydraulic pump 2 is suppressed. And the suppression quantity is changed so as to become smaller the larger the operation quantity S of the operation lever 8 becomes.

In accordance therewith, when the operation quantity of the operation lever 8 is small, that is, at fine lever control, as shown in FIG. 7(*a*), the load pressure x high frequency component y constitutes a component of greater than low frequency fc (=1 Hz), and the response of the hydraulic pump 2 is suppressed so as to greatly impede a load pressure x change. Consequently, since the drive pressure of the rotation hydraulic motor 4 changes slowly while the operation lever 8 is being operated only slightly, operability during fine lever control work is improved (improved steadiness).

Conversely, when the operation quantity of the operation lever 8 is large, that is, during full lever operation, as shown in FIG. 7(*b*), the load pressure x high frequency component y constitutes a component of greater than high frequency fc (=20 Hz), and the response of the hydraulic pump 2 is suppressed so as to impede only slightly a change in load pressure x. That is, since the response of the hydraulic pump is only suppressed for extremely sudden changes in rotation pressure x when the operation quantity S of rotation operation lever 8 is large, hydraulic system response is heightened. When operation lever 8 operation quantity S is large, and a signal y constitutes noise or some other minute signal y, since the response of the hydraulic pump 2 is affected little if at all even when this y is subtracted from a flow command r, the response of the hydraulic pump 2 is hardly suppressed at all.

Consequently, since the rotation hydraulic motor is quick to imitate the operation of the operation lever 8, workability during full lever operation work is improved (Improved quick reaction capabilities).

In this manner, according to a first aspect, under circumstances in which it is desirable to precision-operate the revolving superstructure by manipulating the operation lever 8 with fine precision, the response of the hydraulic pump 2 (rotation motor) decreases, enabling precision operation work to be performed easily, and enhancing precision operability, and under circumstances when it is desirable to operate the revolving superstructure rapidly by operating the operation lever 8 to the full extent, the revolving superstructure can be driven rapidly using the high responsiveness inherent in the hydraulic pump 2 unit, thus enhancing work efficiency.

Figure 8A:
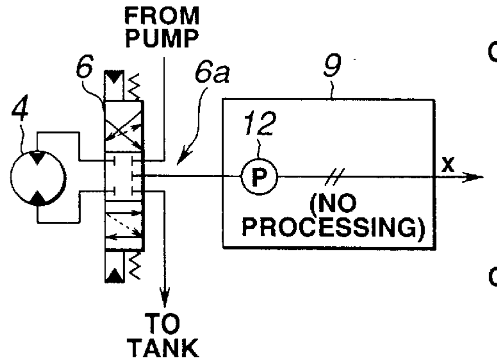
FIGS. 8(*a*), (*b*) are diagrams showing examples of the constitution of a pressure sensor.
Figure 8B:
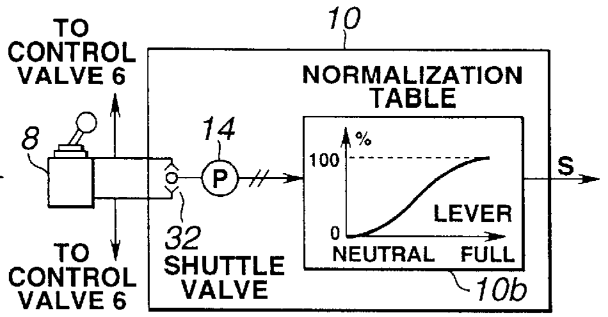

Furthermore, in the above-described aspect, left-right rotation pressure PL, respectively, is detected using independently-provided pressure sensors 12, 13, but it is not always necessary to provide 2 independent pressure sensors. That is, as shown in FIG. 8(*a*), in a flow control valve 6 of a hydraulic system that performs load sensing control, a port 6*a*, which extracts the rotation pressure PL of the side (drive side), where pressure oil flows into the hydraulic motor 4, is incorporated as an inflow pressure lead-through port. In an inflow pressure lead-through port equipped flow control valve 6 such as this, in accordance with detecting the pressure PL of the port 6*a* thereof using a single pressure sensor 12, it is possible to detect this pressure PL as a quantity of state x indicating rotation side drive pressure. Therefore, not only is one pressure sensor no longer necessary, but it is also possible to omit the selecting portion 9*a* of the quantity of state detecting portion 9.

Further, in the above-described aspect, pressure sensors 14, 15 for detecting a pilot pressure Pp, which indicates an operation quantity of the operation lever 8, are provided independently on each of the left rotation operation side and right rotation operation side, but, as shown in FIG. 8(*b*), an embodiment that uses 1 pressure sensor is also possible.

In the hydraulic circuit shown in FIG. 8(*b*), a pilot pressure oil supply channel of a left rotation operation side, and a pilot pressure oil supply channel of a right rotation operation side of the operation lever 8 are connected via a shuttle valve 32. Of the pilot pressure oil of the two pilot pressure oil supply channels, the pilot pressure oil of the high pressure side flows out from the shuttle valve 32. Accordingly, if the pressure Pp of the pilot pressure oil, which passed through the shuttle valve 32, is detected by a single pressure sensor 14, it is possible to detect the pilot pressure Pp of the side, which is currently being operated by the operation lever 8. In this case, too, since it is not necessary to determine the direction in which the operation lever 8 is being operated, it is possible to omit the provision of the selecting portion 10*a* of the suppression quantity specifying portion 10.

In the above-described first aspect, the operation quantity of the rotation operation lever 8 is detected, and, in accordance with the operation quantity of this rotation operation lever 8, the value of the frequency threshold value fc in the above-mentioned high-pass filter 11*b* is altered, and the hydraulic pump 2 response suppression quantity is changed.

Next, as a separate second aspect of the embodiment, an aspect, wherein the hydraulic pump 2 response suppression quantity can be changed in accordance with working conditions without detecting the operation lever 8 operation quantity, and generated a signal S for specifying a suppression quantity corresponding to the operation quantity thereof, will be described.

In the first aspect of the embodiment, the current working state (type of work) is determined form the operating state of the operation lever 8, and the hydraulic pump 2 response suppression quantity is changed in accordance with the current working state. In the second aspect, the operating state (load pressure PL) of a boom hydraulic cylinder 3 is detected as a quantity of state x, and by determining the current working state (type of work) from this quantity of state x, the hydraulic pump 2 response suppression quantity is changed in accordance with the current working state.

Figure 9:
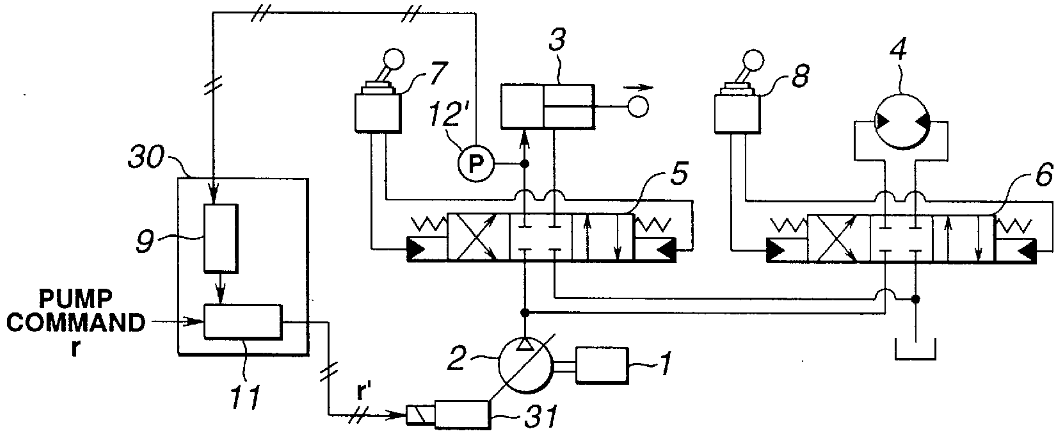
FIG. 9 is a diagram showing the constitution of a control device not equipped with a suppression quantity specifying portion.
Figure 10:
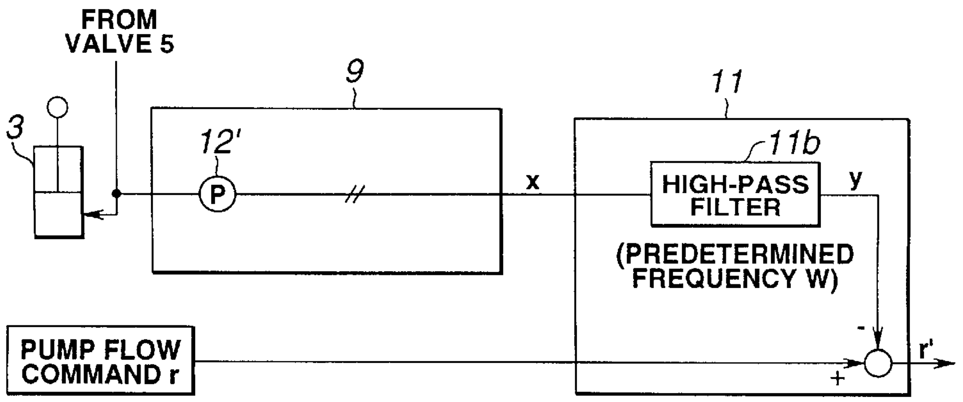
FIG. 10 is a diagram showing an aspect for detecting hydraulic actuator load pressure as a quantity of state.
Figure 11A:
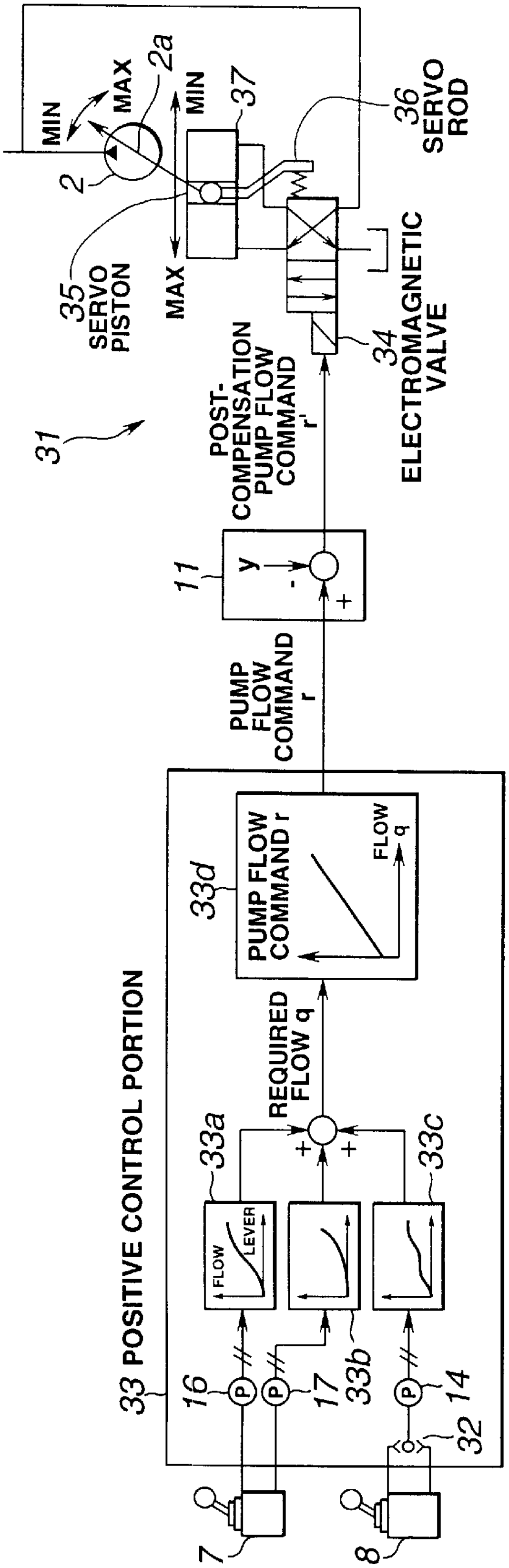
FIGS. 11(*a*)–(*d*) are diagrams showing various aspects, which apply the present invention to a positive control hydraulic pump control system.
Figure 11B:
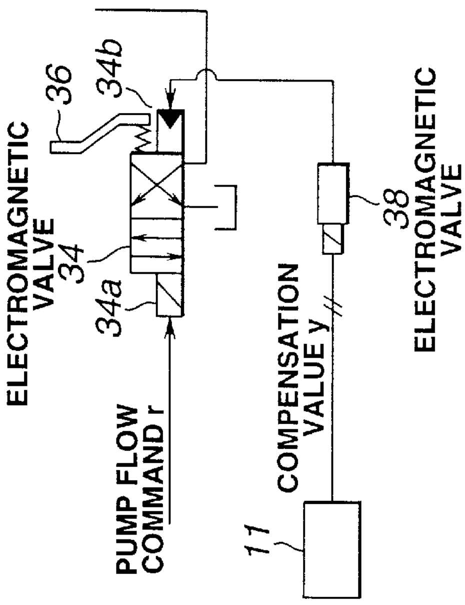
Figure 11C:
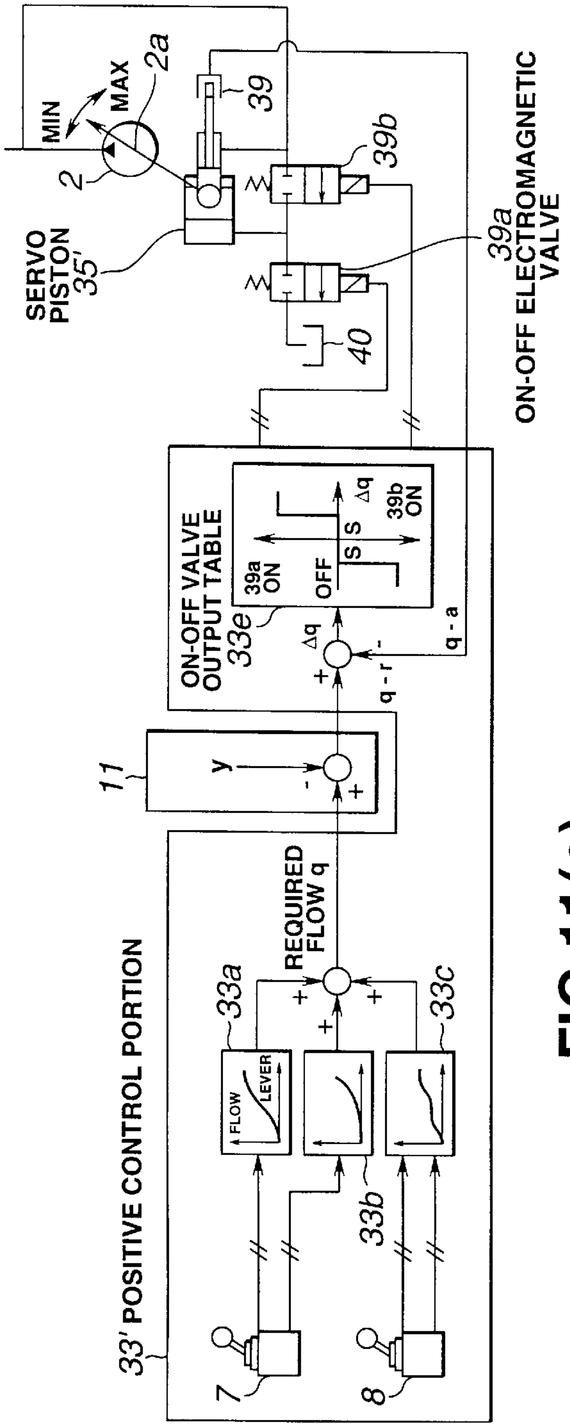
Figure 11D:
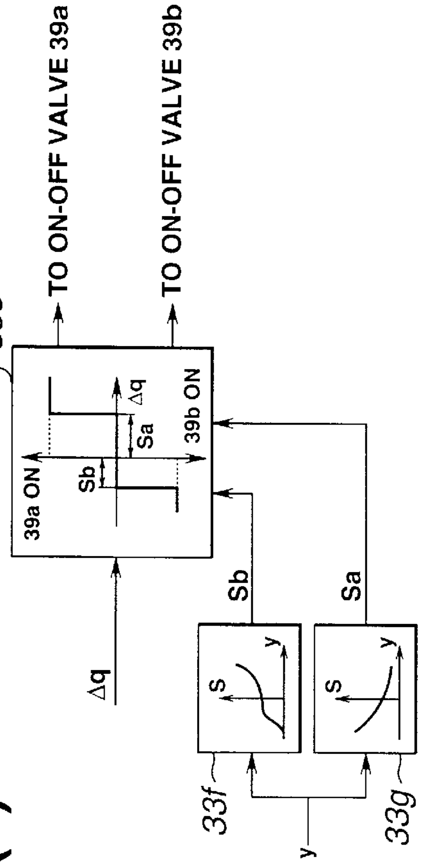
Figure 12A:
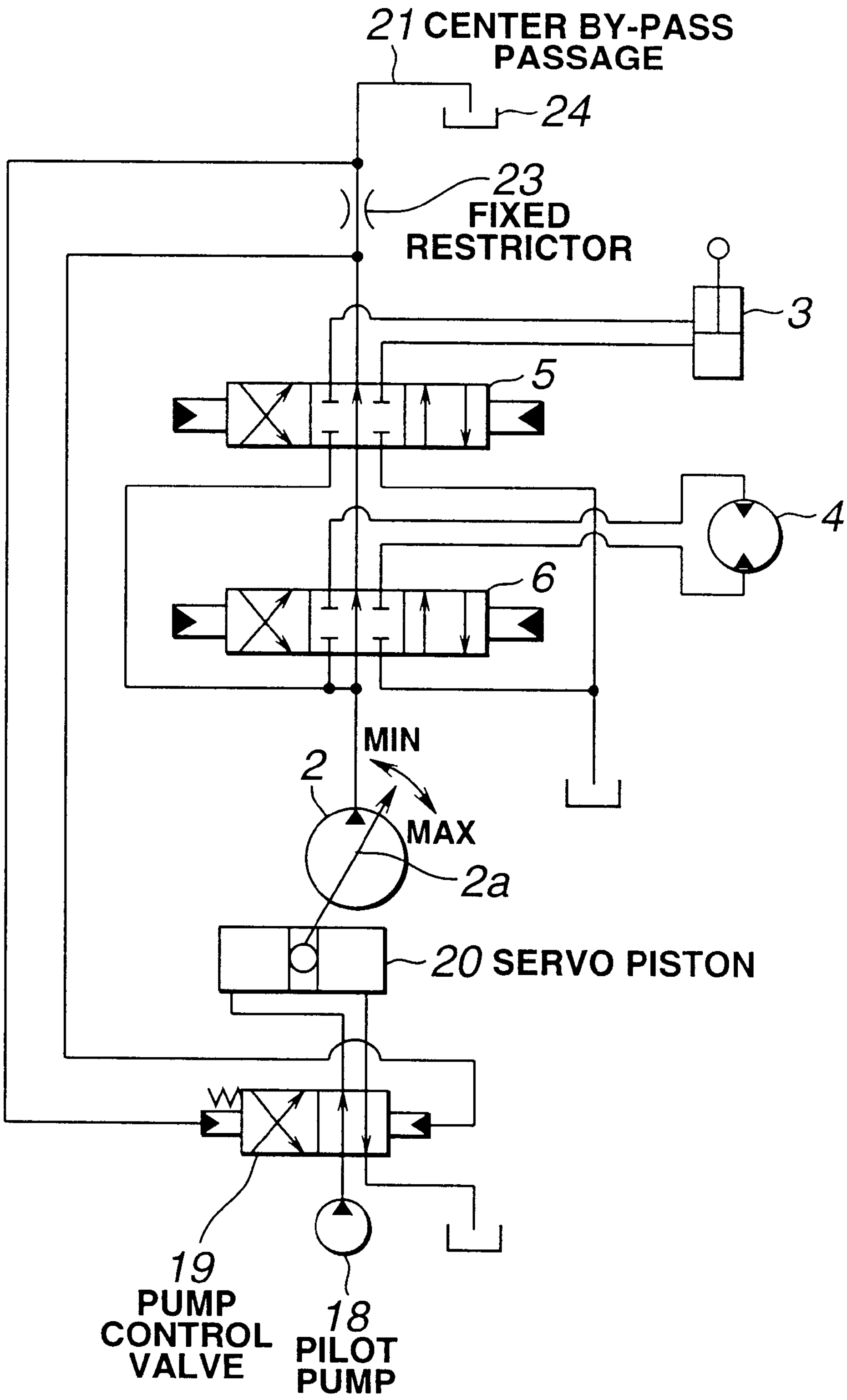
FIGS. 12(*a*)–(*d*) are diagrams showing various aspects, which apply the present invention to a negative control hydraulic pump control system.
Figure 12B:
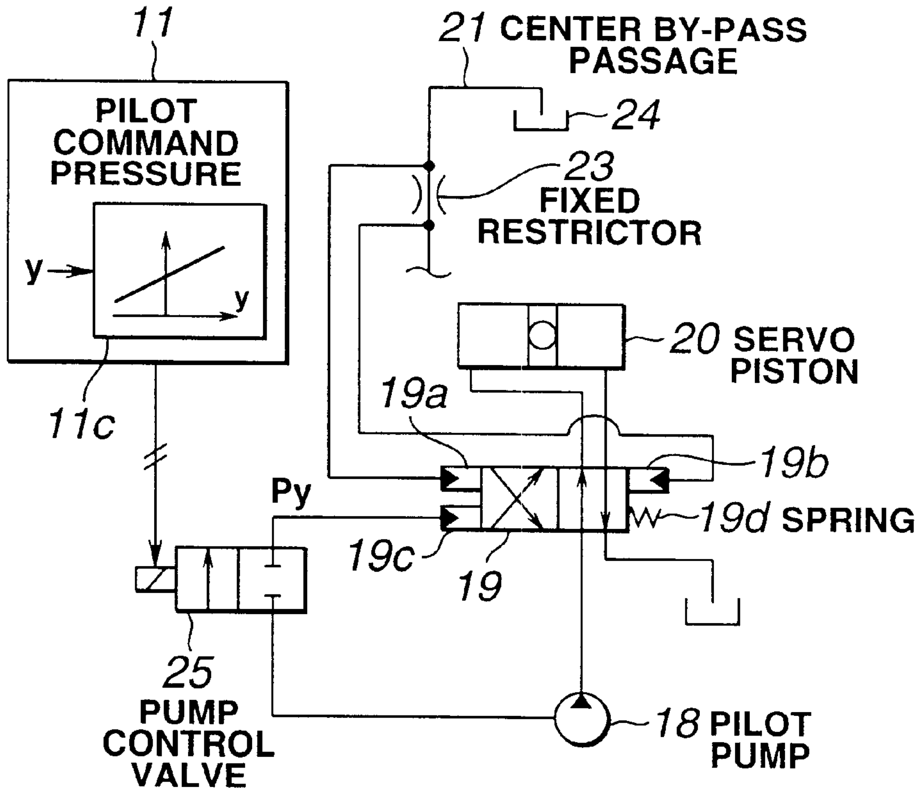
Figure 12C:
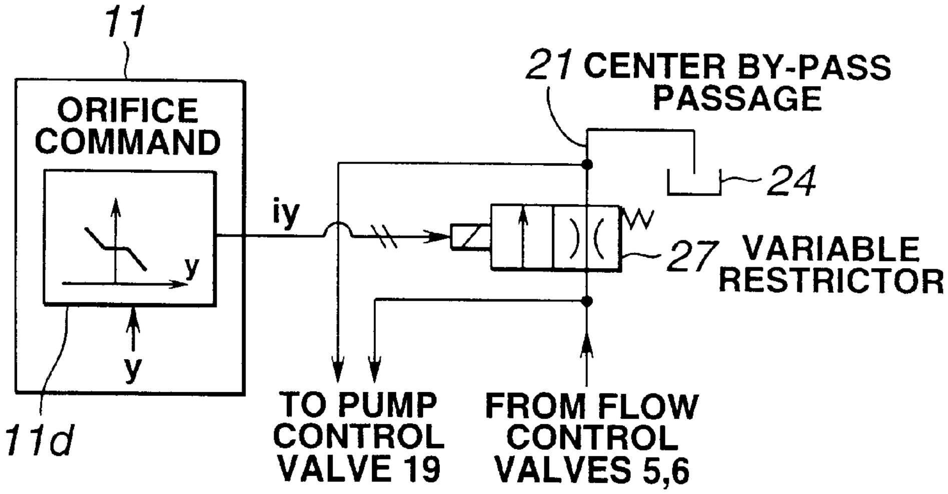
Figure 12D:
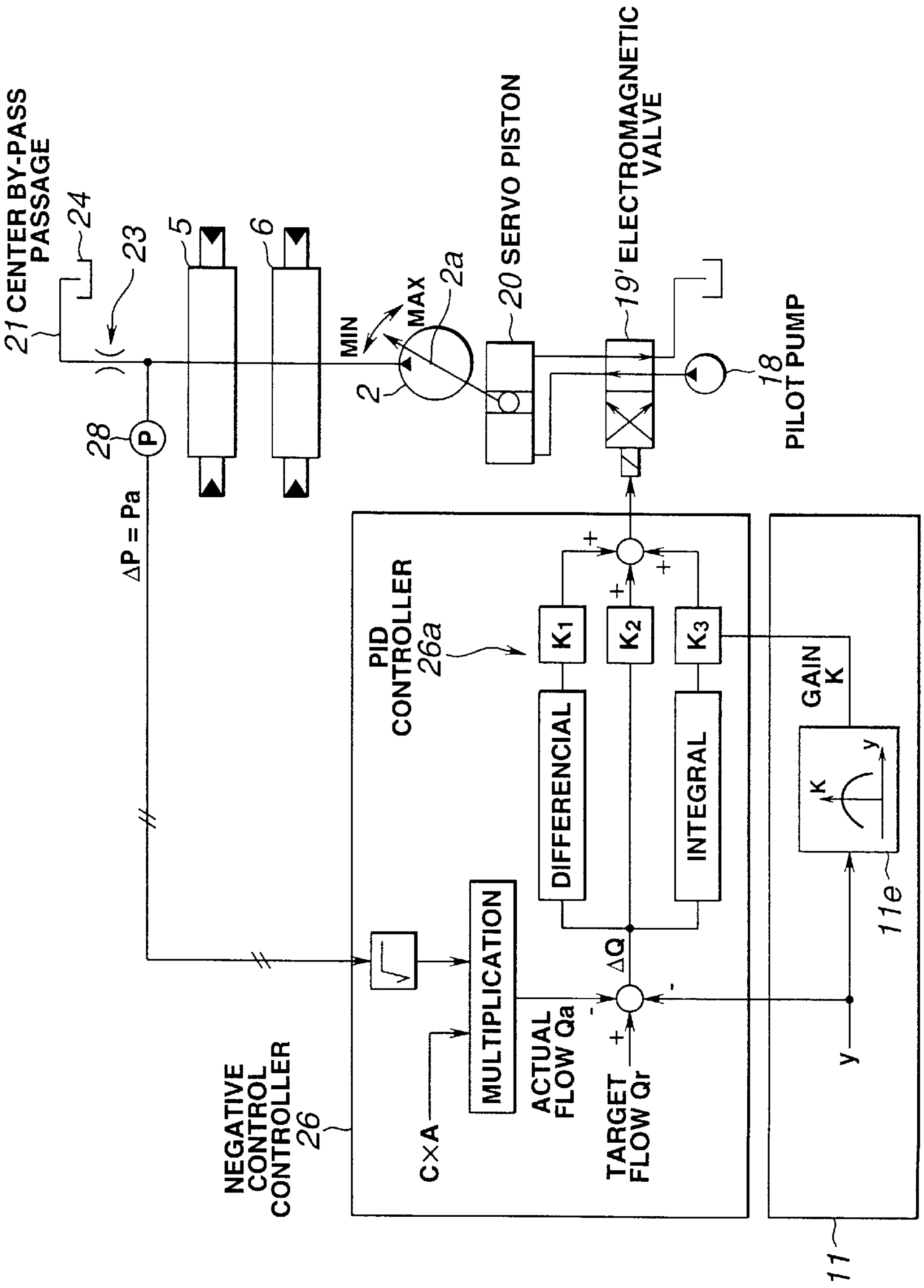
Figure 13A:
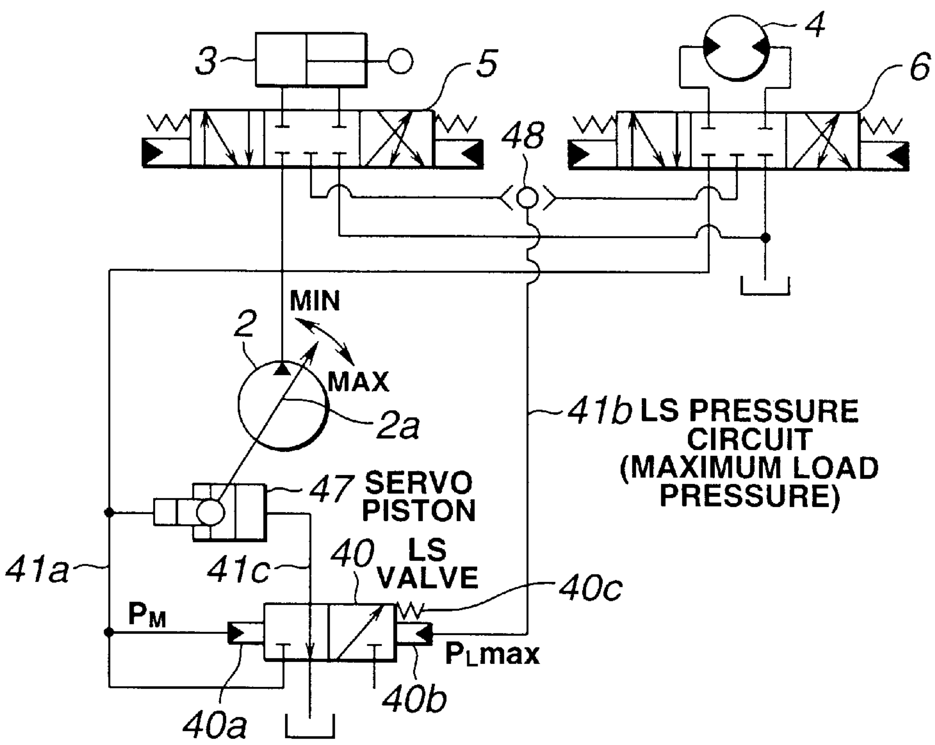
FIGS. 13(*a*)–(*e*) are diagrams showing various aspects, which apply the present invention to a load sensing control hydraulic pump control system.
Figure 13B:
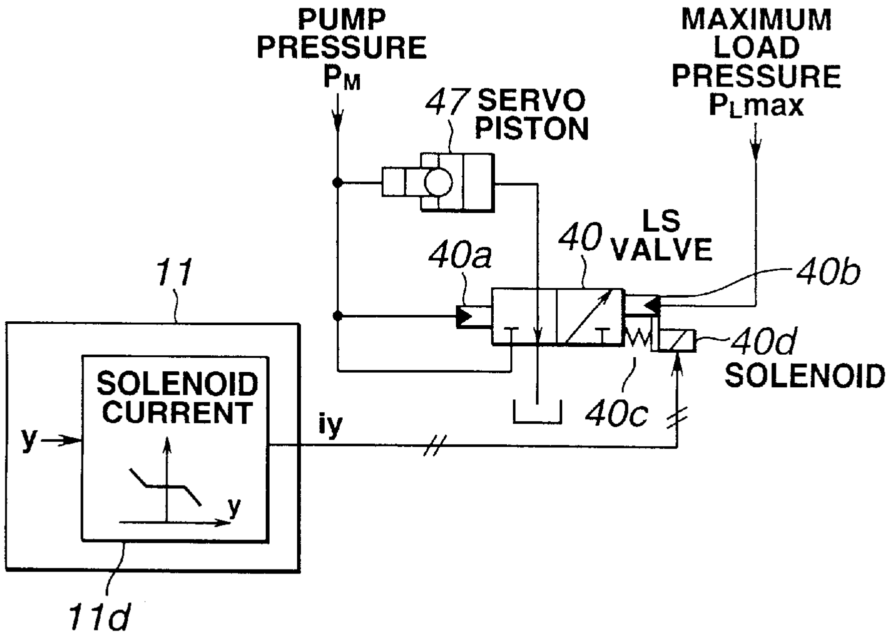
Figure 13C:
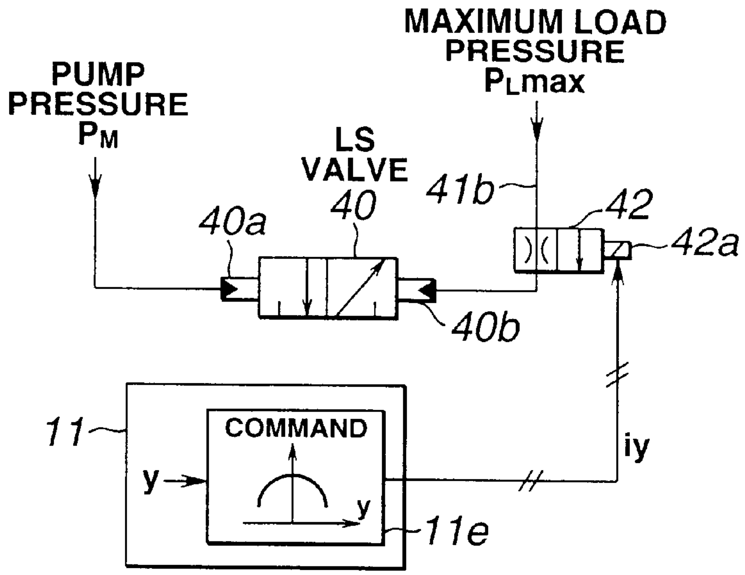
Figure 13D:
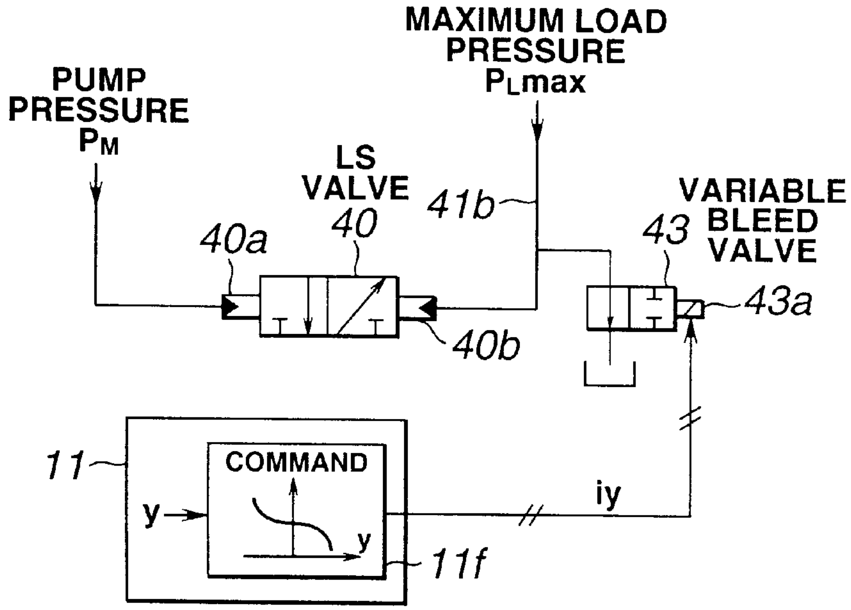
Figure 13E:
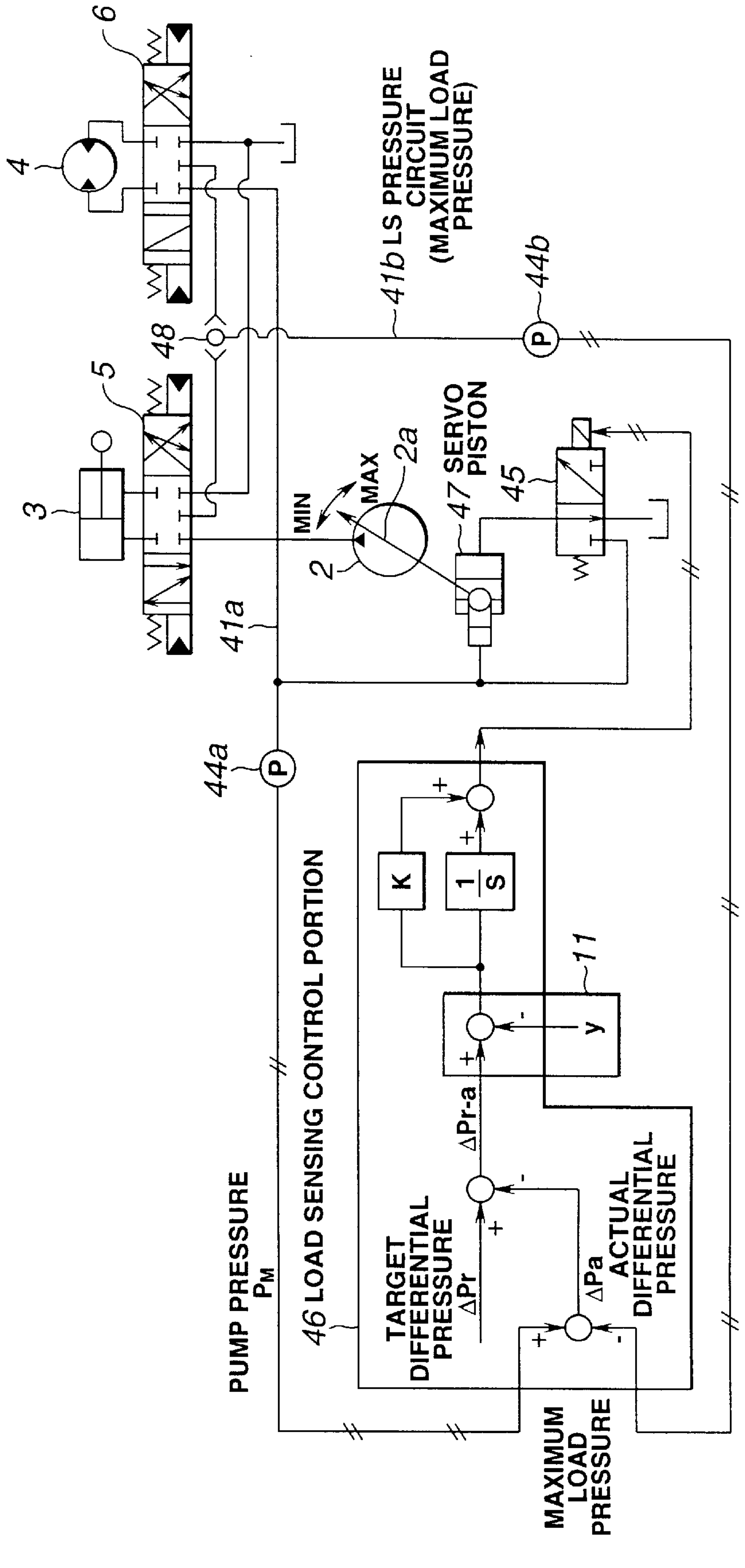
Figure 14A:
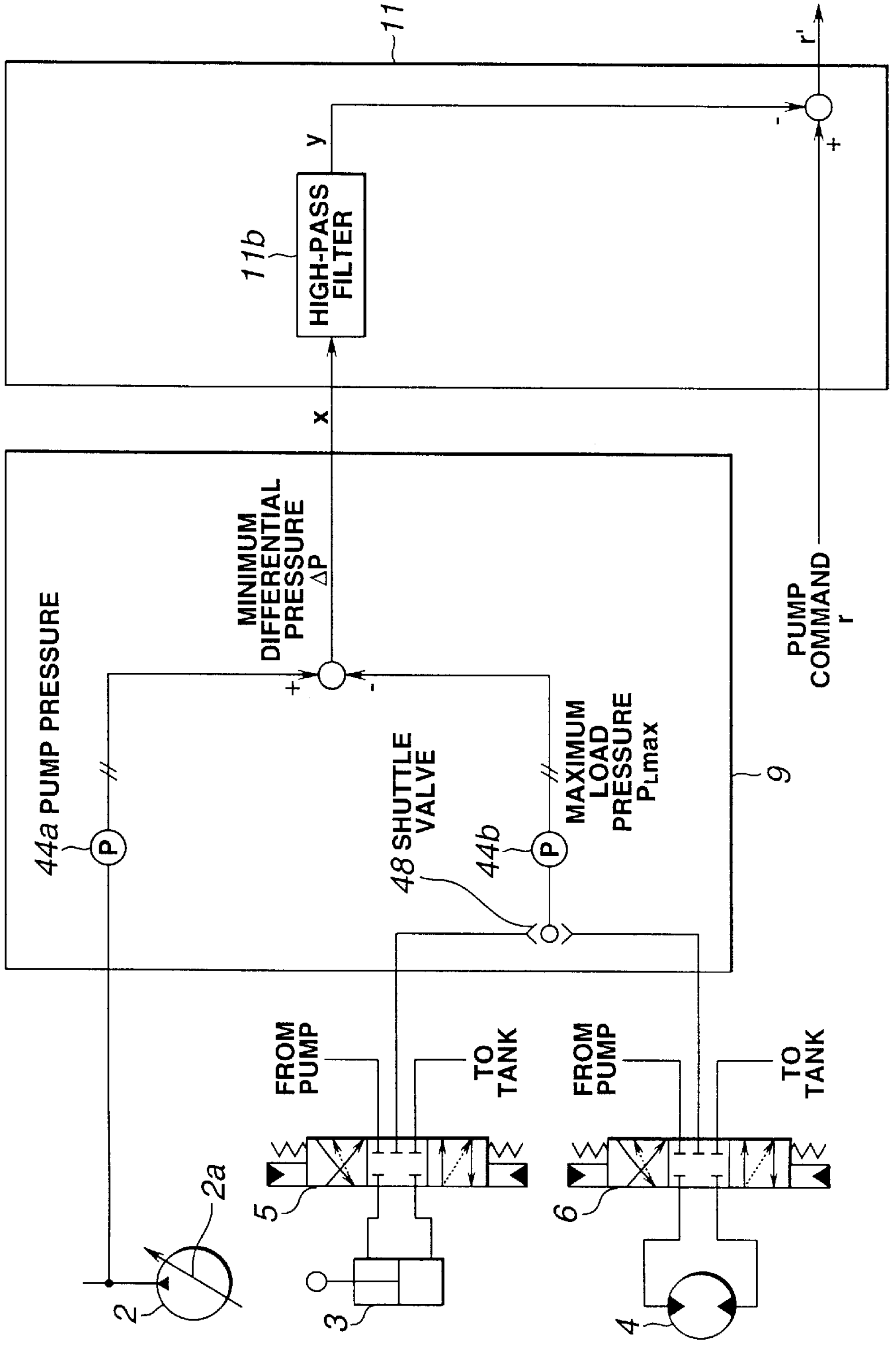
FIGS. 14(*a*)–(*d*) are diagrams showing various aspects for detecting differential pressure as a quantity of state.
Figure 14B:
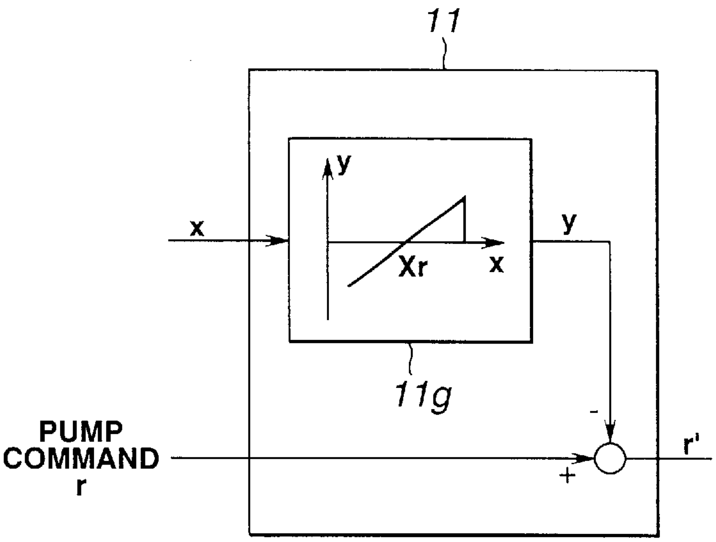
Figure 14C:
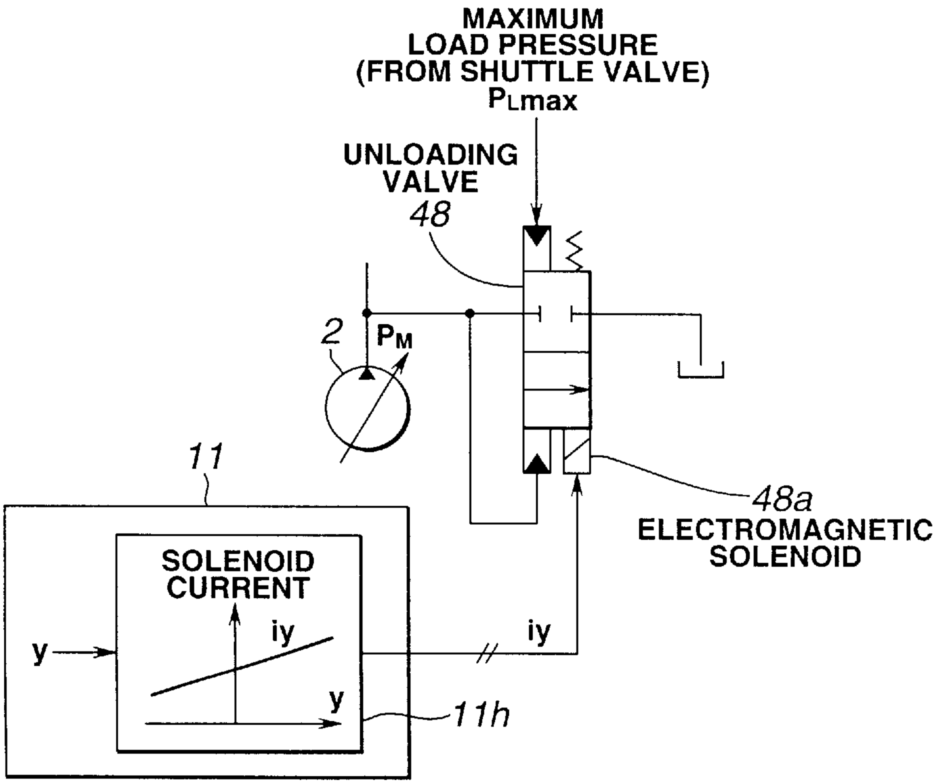
Figure 14D:
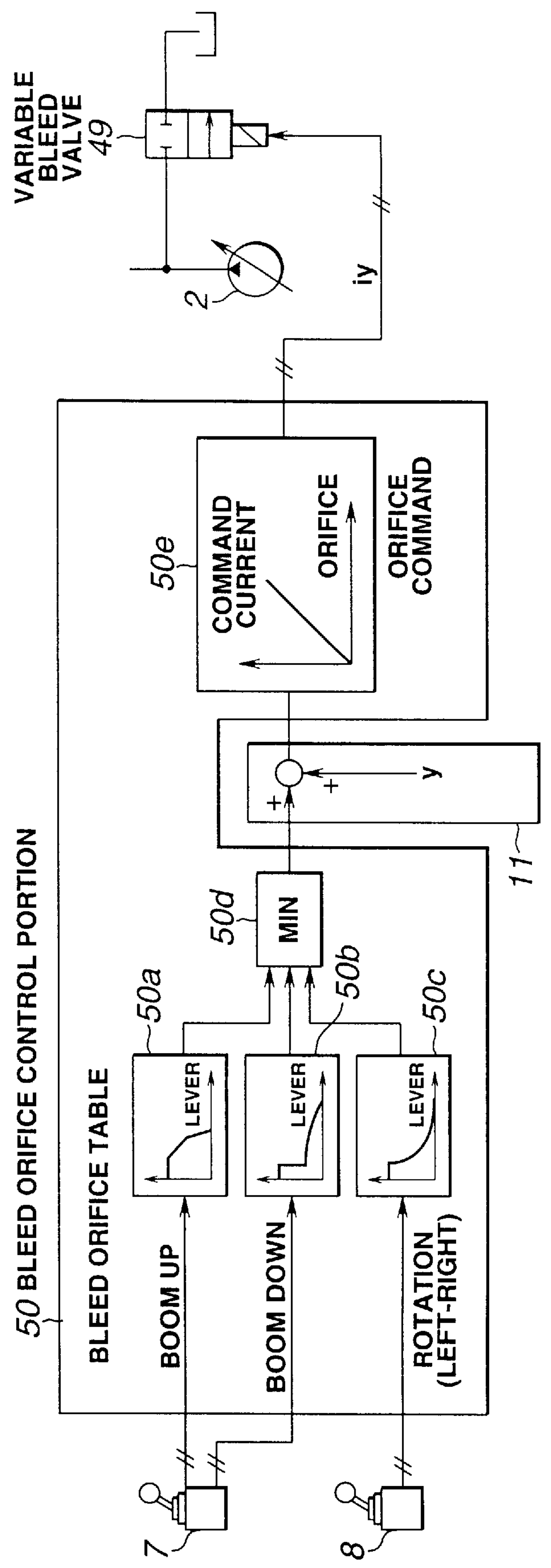
Figure 15A:
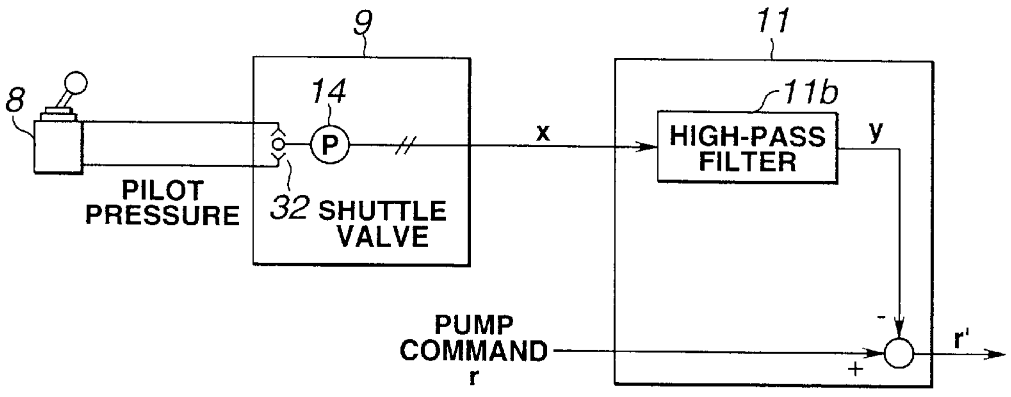
FIGS. 15(*a*)–(*e*) are diagrams showing various aspects for detecting operation lever operation quantity as a quantity of state.
Figure 15B:
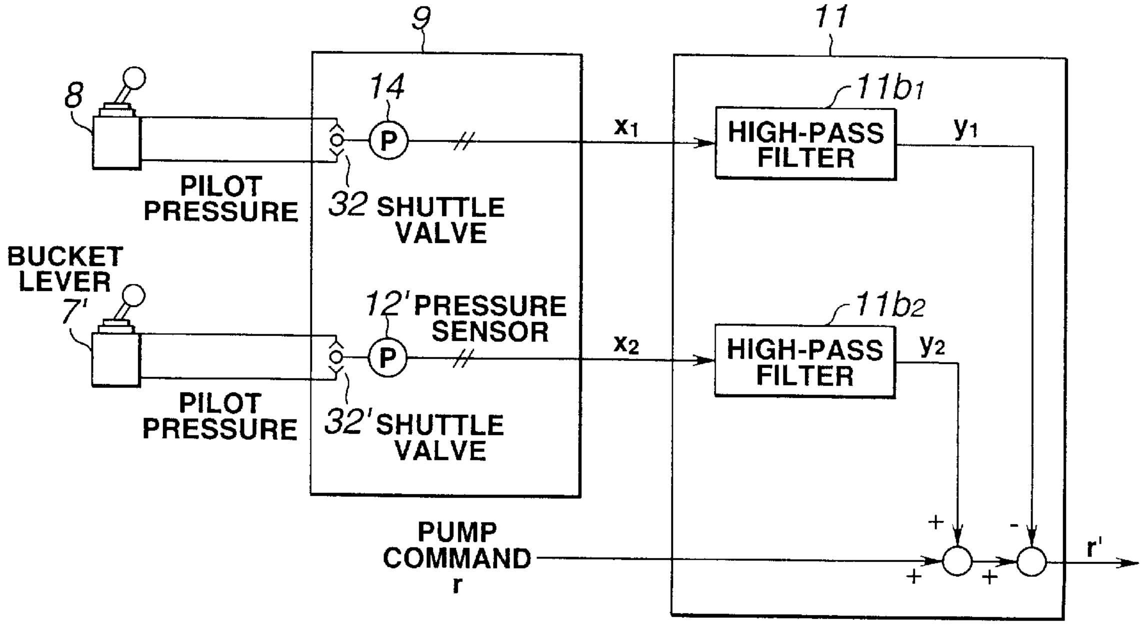
Figure 15C:
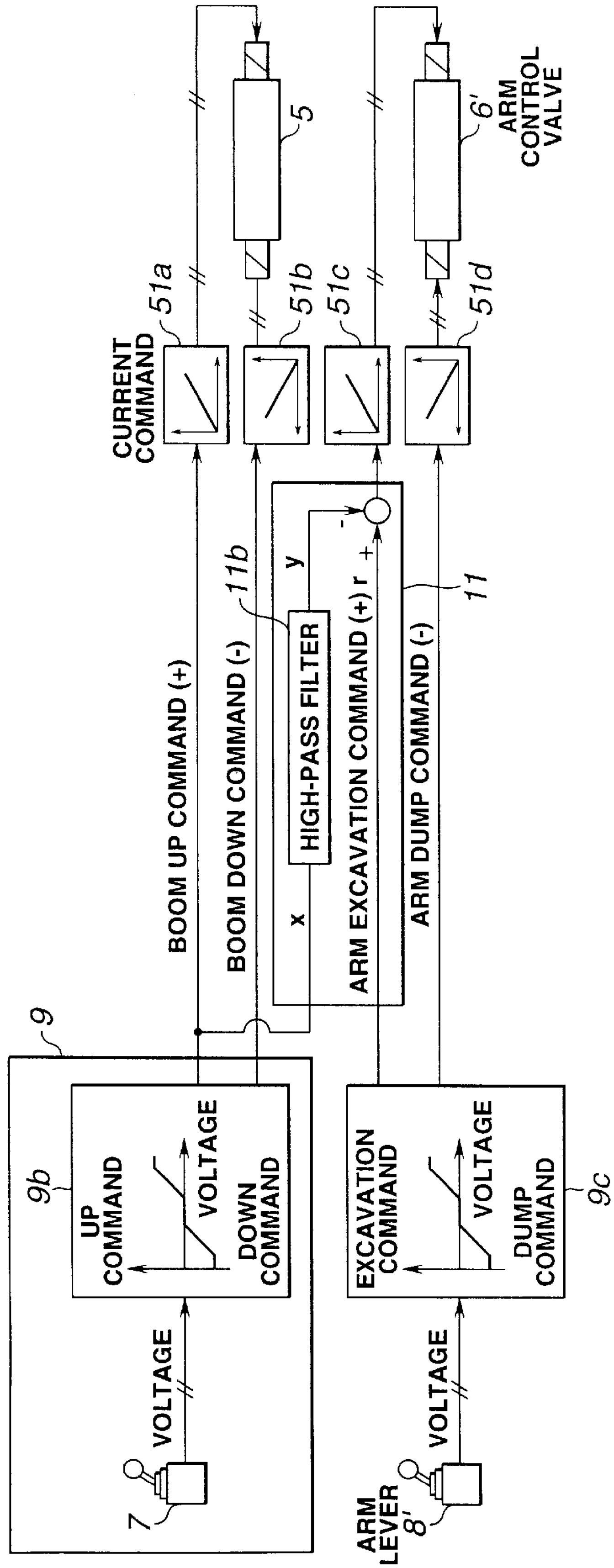
Figure 15D:
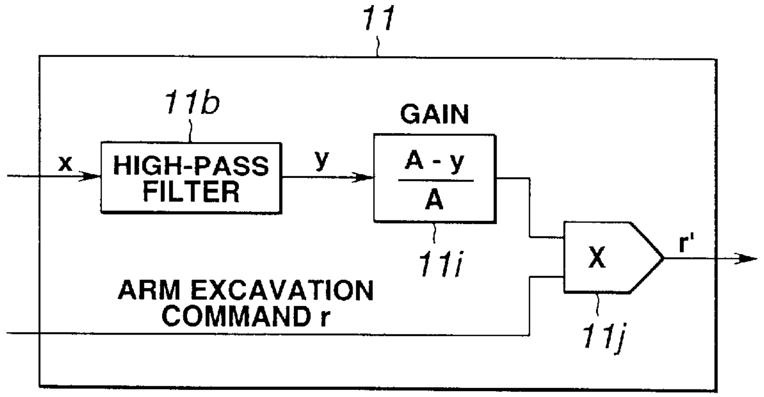
Figure 15E:
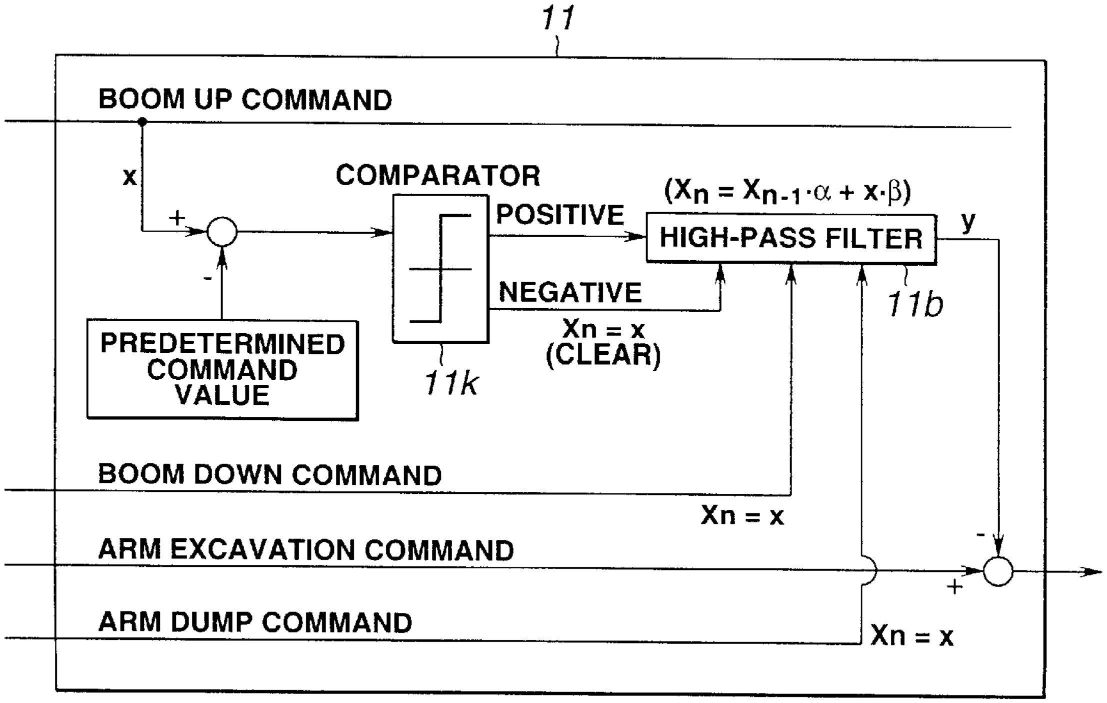

This second aspect differs from the above-described first aspect in that pressure sensors 14, 15 for detecting operation lever operation quantity, suppression quantity specifying portion 10, and coefficient operating portion 11*a* in the response suppressing portion 11 can be omitted as shown in FIG. 9 and FIG. 10.

The nature of control will be described hereinbelow with reference to FIG. 10.

That is, as shown in FIG. 10, in this second aspect, the pressure of the pressure oil, which flows into the bottom chamber side of the boom hydraulic cylinder 3, in other words, the boom-up side load pressure PL when the boom is operated in the up direction side, is detected by a pressure sensor 12', and this pressure PL is outputted as a quantity of state x from the quantity of state detecting portion 9 to the high-pass filter 11*b* of the response suppressing portion 11.

In the high-pass filter 11*b*, a high frequency fluctuation component of greater than a stipulated-in-advance threshold value fc is extracted from among the signals of the boom-up side load pressure x detected by the quantity of state detecting portion 9.

The high frequency fluctuation component of the boom-up side load pressure x obtained by the high-pass filter 11*b* is subtracted from the flow command value r for the hydraulic pump 2, and a compensated flow command value r' is outputted to the hydraulic pump 2 (swash plate drive mechanism portion 31).

In this manner, since the high frequency fluctuation component of the boom-up side load pressure x is subtracted from the flow command value r, when the quantity of state x (load pressure fluctuation signal) increases, the flow command r is compensated in a direction, which reduces the hydraulic pump 2 discharge quantity q so as to suppress the increase thereof. And when the quantity of state x (load pressure fluctuation signal) decreases, the flow command r is compensated in a direction, which increases the hydraulic pump 2 discharge quantity q so as to suppress the decrease thereof.

By so doing, the response of an output signal relative to a hydraulic pump 2 input signal is suppressed.

The change in the suppression quantity in accordance with a working state will be described here.

Now, when raising the boom, it is assumed that the hydraulic cylinder 4 will not operate unless the retaining pressure is greater than around, for example, 100 $kg/cm^2$, and that the pump discharge pressure PM of the hydraulic pump 2 is around 40 $kg/cm^2$ in the lever neutral position.

When driving an actuator for a boom-up or other large inertia operation, while it is desirable that pump response be smooth from the standpoint of preventing vibration, if pump response is constantly made smooth, it takes a long time for pump pressure to increase from the low state (40 $kg/cm^2$) in the above-mentioned level neutral position, to the boom retaining pressure (100 $kg/cm^2$) or higher, and as a consequence, wasted time occurs between lever operation and start of movement. During this time, the operator will manipulate the lever more fully than usual, giving rise to the need for an operation that returns the lever after the boom belatedly starts moving. The problem that arises as a consequence of this is boom vibration.

In this aspect of the embodiment, the aim is to prevent wasted pump pressure rise time at boom startup, and to make the response of the pump smooth during boom operation.

In this aspect, the response of the pump itself is made sufficiently high. Since pressure oil does not flow to the boom cylinder 3 from the time the boom lever is operated when pump pressure is 40 kg/cm$^2$, until pump pressure rises to the boom retaining pressure of over 100 kg/cm$^2$, the detection signal of the boom pressure sensor 12' does not change. In this state, a fluctuation component Y outputted from the high-pass filter 11*b* is zero, and so pump response is not suppressed (no wasted time). Conversely, when pump pressures becomes greater than boom retaining pressure, and pressure oil flows into the boom cylinder 3, the detection signal of the above-mentioned boom pressure sensor 12' changes, and the pressure PL of the pressure oil, which flows into the boom hydraulic cylinder 3 at this time has numerous high frequency fluctuating portions, which correspond to the magnitude of the load. Consequently, the high frequency fluctuation components y outputted by the high-pass filter 11*b* exist in abundance, the flow command r is compensated in accordance with these high frequency fluctuation components y, and a compensated flow command r', from which the high frequency fluctuation components y have been removed is outputted to the swash plate drive mechanism portion 31.

Accordingly, the response of an output signal relative to an input signal of the hydraulic pump 2 is largely suppressed, and the boom hydraulic cylinder 3 is no longer quick to imitate the operation of the operation lever 7. Consequently, the boom is operated slowly after the boom hydraulic cylinder 3 begins being driven.

In other words, according to this aspect, since the hydraulic pump 2 responds rapidly from the time the pump pressure PM is low state until it exceeds boom retaining pressure, and the boom is operated slowly after the boom hydraulic cylinder 3 begins being driven, lever operability is enhanced, and even an unskilled operator can readily operate.

In the above description, since the cylinder outflow side pressure is practically zero, by making smooth a change in pressure on the cylinder inflow side (detection side), the force, or acceleration acting on the cylinder becomes smooth, facilitating smooth operation startup.

Furthermore, in this aspect, the assumed case is one in which boom-up side load pressure is detected as the quantity of state x, but rotation hydraulic motor 4 load pressure (rotation pressure) can be detected as the quantity of state x.

Now then, as described above, there are three modes in the control system of the hydraulic pump 2: positive control, negative control, and load sensing control. An example of a constitution suitable for each control system will be described hereinbelow. Furthermore, either of the above-described first aspect, or second aspect may be applied in the aspects described hereinbelow. The quantity of state detecting portion 9, and suppression quantity specifying portion 10 are omitted from the figures.

In a positive control hydraulic control system, as shown in FIG. 11(*a*), a positive controlling portion 33 is provided, a flow command r is outputted from this positive controlling portion 33 to the swash plate drive mechanism portion 31 of the hydraulic pump 2, and inputted to the response suppressing portion 11.

That is, the pilot pressure Pp indicating the operation quantity of each operation lever 7, 8 is detected by pressure sensors 16 (sensor for detecting operation quantity on the boom upward direction operation side), 17 (sensor for detecting operation quantity on the boom downward direction operation side), 14, and a required flow corresponding to the pilot pressure Pp indicated by the detected operation quantity is determined from the corresponding relationship between lever operation quantity Pp stored in memory tables 33*a*, 33*b*, 33*c*, and the required flow. And then, an operation, which treats a flow, which is the sum total of required flows read out from memory tables 33*a*, 33*b*, 33*c*, as the required flow q for the hydraulic pump 2, is performed. Next, a pump flow command value q corresponding to the current required flow is read out from memory table 33*d*, in which the corresponding relationship between the required flow q and the flow command r for the hydraulic pump 2 is stored, and the pump flow command r thereof is outputted to the response suppressing portion 11. In the response suppressing portion 11, an operation is performed on the compensated flow command r' based on the inputted pump flow command r, and a fluctuation component y which is a high frequency fluctuation component operated on separately, and the operated compensated flow command r' is outputted to the swash plate drive mechanism portion 31.

The swash plate drive mechanism portion 31 constitutes an electromagnetic proportional control valve 34 driven in accordance with a compensated flow command r' being added to a solenoid; a cylinder 37, through which hydraulic pump 2 discharge pressure oil is guided in accordance with the valve position of the electromagnetic proportional control valve 34; a servo piston 35, which changes the position (inclined rotation angle) of the swash plate 2*a* of the hydraulic pump 2 in accordance with being pushed by pressure oil guided by this cylinder 37; and a servo rod, which is connected to this servo piston 35, and which, in accordance with the position of this piston 35, applies force to a spring that acts on the side of the above-mentioned electromagnetic proportional control valve 34 opposite the compensated flow command r' action side.

When the compensated flow command r' is small, the thrust of the solenoid of the electromagnetic proportional control valve 34 is small, and in accordance with the electromagnetic proportional control valve 34 being moved to the left side by the spring force, the pressure fluid passing through this electromagnetic proportional control valve 34 is guided to the left chamber of the piston inside the cylinder 37. In accordance therewith, the servo piston 35 is driven in the right direction (MIN direction), the servo rod is simultaneously moved to the right as well, and the force of the spring acting on the electromagnetic proportional control valve 34 weakens.

By so doing, the servo piston 35 is driven to the right (MIN) side until the above-mentioned spring force (location of the servo piston 35) is in balance with the thrust of the above-mentioned solenoid. Thus, the swash plate 2*a* of the hydraulic pump 2 is maintained in a swash plate position (small displacement q) corresponding to the compensated flow command r' (small flow command).

Similarly, when the compensated flow command r' is large, the thrust of the solenoid of the electromagnetic proportional control valve 34 is large, and overpowers the spring force acting on the electromagnetic proportional control valve 34, and in accordance with the electromagnetic proportional control valve 34 being moved to the right side, the pressure fluid passing through this electromagnetic proportional control valve 34 is guided to the right chamber of the piston inside the cylinder 37. In accordance therewith, the servo piston 35 is driven in the left direction (MAX direction), the servo rod is simultaneously moved to the left as well, and the force of the spring acting on the electromagnetic proportional control valve 34 strengthens.

By so doing, the servo piston 35 is driven to the left (MAX) side until the above-mentioned spring force (location of the servo piston 35) is in balance with the thrust of the above-mentioned solenoid. Thus, the swash plate 2*a* of the hydraulic pump 2 is maintained in a swash plate position (large displacement q) corresponding to the compensated flow command r' (large flow command).

As described above, the hydraulic pump 2 swash plate 2*a* (servo piston) is positioned proportional to a compensated flow command r' (solenoid thrust) corresponding to the required flow q of an operation lever 7, 8, and pressure oil of a discharge quantity proportional to the swash plate position is discharged from the hydraulic pump 2.

According to this aspect of the embodiment, the pump flow command r is compensated in a direction that prevents a change relative to the load pressure PL of hydraulic actuator 3 or 4 in the response suppressing portion 11, that is, the pump flow command r is subtracted in the direction in which the value r is reduced when the load pressure fluctuation component is on the plus side, and increased when the load pressure fluctuation component is on the minus side. Consequently, when the above-mentioned load pressure PL attempts to rise, the pump discharge quantity is reduced by decreasing the pump flow command r', as a result of which, the pump discharge pressure PM declines, the inflow quantity to hydraulic actuator 3 or 4 drops, and the rise of the above-mentioned load pressure PL is suppressed. Similarly, when the load pressure PL attempts to drop, an effect is achieved, wherein the decrease in this load pressure PL is suppressed.

In FIG. 11(*a*), a compensated flow command value r' is obtained by subtracting a fluctuation component y from a pump flow command r in the response suppressing portion 11, and the solenoid of the electromagnetic proportional control valve 34 is driven in accordance with this compensated flow command r', but, as in the example of a different constitution shown in FIG. 11(*b*), in addition to adding a pre-compensation pump flow command r to the solenoid 34*a* of electromagnetic proportional control valve 34, a fluctuation component y produced by the response suppressing portion 11 can be converted one time to a pilot pressure Pp in an electromagnetic proportional control valve 38, and this pilot pressure Pp can be added to the input port on the opposite side of the solenoid 34*a* of electromagnetic proportional control valve 34. In other words, the same response suppression control as FIG. 11(*a*) is performed by causing a pilot pressure Pp corresponding to a fluctuation component y, which is a compensation quantity, to act from the input port on the opposite side of the solenoid 34*s* so as to cancel the thrust of the solenoid 34*a*, which corresponds to a pre-compensation flow command r.

Further, the above description assumes a lever of a hydraulic system (PPC), in which a pilot pressure from a pilot pump is reduced to a pilot pressure Pp, which corresponds to an operation quantity, in accordance with a lever-equipped pressure reducing valve as operation levers 7, 8, and this pilot pressure Pp is supplied to each flow control valve 5, 6 via a pilot line, but, of course, operation levers 7, 8 can also be electrical-type levers, which output an electrical signal specifying a voltage proportional to operation quantity. In this case, unlike a hydraulic-type lever, the provision of a pressure sensor for detecting pilot pressure Pp can be omitted.

FIG. 11(*c*) shows an example of a constitution when electrical-type levers are utilized as operation levers 7. 8.

Required flow q can be determined by directly inputting voltage outputted from operation levers 7, 8 to memory tables 33*a*, 33*b*, 33*c* in the positive controlling portion 33'.

The example constitution shown in FIG. 11(*c*) depicts an aspect for when the servo piston drive method differs from that in the example constitution shown in FIG. 11(*a*).

That is, in FIG. 11(*c*), in place of one pump electromagnetic proportional control valve 34, two ON-OFF electromagnetic control valves 39*a*, 39*b* are provided, and these valves are driven and controlled in accordance with PWM control. In the servo piston 35', there is provided a swash plate position sensor 39, which detects the discharge quantity q_a actually discharged from the hydraulic pump 2, by detecting the position of the piston 35', that is, the swash plate position, and this discharge quantity q_a is inputted to the positive controlling portion 33' as a feedback signal.

In the positive controlling portion 33', a fluctuation component y is subtracting from the above-mentioned obtained required flow q, and a compensated discharge quantity q_r, which compensates for the required flow q, is determined. This becomes the target discharge quantity of the pump 2. Accordingly, the deviation Δq between this target discharge quantity q_r and the actual discharge quantity q_a, which is the feedback quantity detected by the swash plate position sensor 39, is determined, an ON-OFF output value corresponding to this deviation Δq is read out from the stored contents of an ON-OFF valve output table 33*e*, and outputted to the corresponding ON-OFF electromagnetic control valve, either 39*a* or 39*b*.

Now, when the compensated discharge quantity q_r, which is the target value, is larger than the actual discharge quantity q_a, the discharge quantity deviation Δq constitutes a positive value, and when the magnitude of this deviation Δq exceeds a predetermined dead zone width s, an ON command, which sets to the ON state only ON-OFF electromagnetic control valve 39*a* is outputted to this electromagnetic control valve 39*a* from the ON-OFF valve output table 33*e*.

Consequently, the ON-OFF electromagnetic control valve 39*a* is turned ON, and in accordance therewith, a circuit, which unloads the pressure oil of the large-diameter chamber (left side) of the servo piston 35' to a tank 40, is opened, the servo piston 35' is driven to the left side, and the hydraulic pump 2 swash plate 2*a* is moved to the right (MAX) side.

In accordance with the swash plate 2*a* being driven to the right side here, since the actual discharge quantity q_a detected by the swash plate position sensor 39 increases, the deviation Δq between the compensated discharge quantity q_r, which is the target value, and the actual discharge quantity q_a decreases. By increasing the discharge quantity of the hydraulic pump 2 in this way, the target value compensated discharge quantity q_r finally becomes identical to the actual discharge quantity q_a.

And then, when the deviation Δq between the compensated discharge quantity q_r, which is the target value, and the actual discharge quantity q_a decreases, and finally shifts to the negative, an ON command, which sets to the ON state only ON-OFF electromagnetic control valve 39*b*, is outputted to this electromagnetic control valve 39*b* from the above-mentioned ON-OFF valve output table 33*e*.

Consequently, the ON-OFF electromagnetic control valve 39*b* is turned ON, and in accordance therewith, a circuit, which connects the pressure oil of the small-diameter chamber (right side) of the servo piston 35' to the pressure oil of the large-diameter chamber (left side) of same, is opened, the servo piston 35' is driven to the right side in accordance with the difference in diameters, and the hydraulic pump 2 swash plate 2*a* is moved to the left (MIN) side. Consequently, similar to when the swash plate 2*a* was moved to the right (MAX) side, the deviation Δq decreases, and the target value compensated discharge quantity q__r finally becomes identical to the actual discharge quantity q__a.

In accordance with repeating the above-described operation, the pump discharge quantity (servo piston position) q__a is maintained at the compensated discharge quantity q__r, which is the target value.

According to the aspect of the embodiment shown in FIG. 11(*c*), the required flow q is compensated in a direction that prevents a change relative to the load pressure PL of hydraulic actuator 3 or 4 in the response suppressing portion 11, that is, the required flow q is subtracted in the direction in which the value q is reduced when the load pressure fluctuation component is on the plus side, and increased when the load pressure fluctuation component is on the minus side. Consequently, when the above-mentioned load pressure PL attempts to rise, the pump discharge quantity is reduced by the decrease of the compensated discharge quantity q__r, as a result of which, the pump discharge pressure PM declines, the inflow quantity to hydraulic actuator 3 or 4 drops, and the rise of the above-mentioned load pressure PL is suppressed. Similarly, when the load pressure PL attempts to drop, an effect is achieved, wherein the decrease in this load pressure PL is suppressed.

Further, in FIG. 11(*c*), of the contents stored in the ON-OFF valve output table 33*e*, the dead zone width s is fixed, but as shown in FIG. 11(*d*), the dead zone width s can be changed in accordance with the magnitude of the fluctuation component y. That is, in the dead zone memory table 33*f* of FIG. 11(*d*), as the fluctuation component y becomes larger, a value sb that allows the dead zone width sb of the side that turns the ON-OFF electromagnetic control valve 39*b* ON to become larger, is read out, and in accordance therewith, the dead zone width sb of the ON-OFF valve output table 33*e* is changed. Similarly, in dead zone memory table 33*g*, as the fluctuation component y becomes larger, a value sa that allows the dead zone width sa of the side that turns the ON-OFF electromagnetic control valve 39*b* ON to become smaller, is read out, and in accordance therewith, the dead zone width sa of the ON-OFF valve output table 33*e* is changed. By so doing, control that delays the rise of the hydraulic pump 2 swash plate 2*a*, and hastens the return side, is made possible.

Next, an example constitution of a negative control hydraulic control system is described with reference to FIG. 12.

FIG. 12(*a*) is a diagram showing the basic constitution of a negative control hydraulic control system.

As shown in this figure, negative control performs control, wherein a flow, which is discharged to a tank 24 from a center by-pass passage 21, which connects flow control valves 5, 6 in tandem, is detected in accordance with differential pressure before and after a fixed restrictor 23, and when differential pressure decreases, pilot pressure oil from a pilot pump 18 is guided to the right chamber of a servo piston 20 in accordance with the pump control valve 19 being driven to the right, driving the piston 20 to the left (swash plate MAX side) and increasing the discharge quantity q of the pump 2, and similarly, when the differential pressure before and after the fixed restrictor 23 increases, in accordance with the pump control valve 19 being driven to the left, the piston 20 is driven to the right (swash plate MIN side), and the discharge quantity q of the pump 2 decreases. In accordance therewith, the fixed restrictor 23 fore-aft differential pressure is maintained constant, and the flow discharged to the tank 24 is maintained constant.

As for the passage orifice quantity of the center by-pass passage, which guides discharged pressure oil to the fixed restrictor 23, when each flow control valve 5, 6 is in the neutral position, a bleed orifice provided on each flow control valve 5, 6 is maximum, making the passage orifice quantity become maximum, and when the flow control valves 5, 6 are operated, the by-pass passage 21 orifice quantity decreases in accordance with the reduction of the bleed orifice as the spool stroke becomes larger. Consequently, of the pump 2 discharge pressure oil, the flow of pressure oil discharged to the fixed restrictor 23 decreases.

Here, because the hydraulic pump 2 operates to increase the discharge quantity q so as to augment the decrease in fixed restrictor 23 fore-aft different pressure corresponding to an increase in the spool stroke quantity of the flow control valve 5, 6, there is achieved control, wherein the flow corresponding to the spool stroke quantity of the flow control valves 5, 6 is supplied to hydraulic actuator 3, 4 via the flow control valves 5, 6.

The example constitution for suppressing hydraulic pump 2 response in the above-described negative control system is shown in FIG. 12(*b*). In FIG. 12(*b*), a portion of the constitution elements shown in FIG. 12(*a*) are omitted.

In the same FIG. 12(*b*), a pilot command pressure Py, which is proportional to a fluctuation component y, is read out from the contents stored in a pilot command pressure memory table 11*c* of the response suppressing portion 11, and this pilot command pressure Py is applied to input port 19*c* of the pump control valve 19 via an electromagnetic proportional control valve 25.

The pressure of the pressure oil of the side, where the pressure oil flows out from the fixed restrictor 23, is applied to the left-side input port 19*a* of the pump control valve 19 as pilot pressure, and the pressure of the pressure oil of the side, where the pressure oil flows into the fixed restrictor 23, is applied to the right-side input port 19*b* as pilot pressure, and spring force is applied in accordance with a spring 19*d.*

Here, pilot command pressure Py proportional to the above-mentioned fluctuation component y is applied to the left-side input port 19*c* of the pump control valve 19 as pilot pressure for suppressing the response of the hydraulic pump 2. When the value of the fluctuation component y is zero, the pilot command pressure Py is treated as equivalent to the spring force of the spring 19*d.*

Consequently, when the fluctuation component takes a positive value, in accordance with the generation of a pilot pressure Py that overpowers the spring force acting on the opposite side of the pump control valve 19, the apparent fixed restrictor 23 fore-aft differential pressure decreases, and the pump control valve 19 is driven to the right side, and when the fluctuation component takes a negative value, in accordance with the spring force acting on the pump control valve 19, the apparent fixed restrictor 23 fore-aft differential pressure increases, and the pump control valve 19 is driven to the left side. In this manner, pump 2 response is suppressed so as to cancel the change in the load pressure PL of either the hydraulic cylinder 3 or hydraulic motor 4.

Further, rather than directly controlling the action of the pump control valve 19, as shown in FIG. 12(*c*), a variable restrictor 27 can be used to suppress pump 2 response instead to the fixed restrictor 23, which picks out differential pressure.

In the same FIG. 12(*c*), a command current iy, which takes a smaller value as the fluctuation component y becomes larger, is read out from the contents stored in an opening command memory table 11*d* of the response suppressing portion 11, and this command current iy is applied to the solenoid of a variable restrictor 27.

Consequently, when the fluctuation component y takes a positive value, by making the size of the variable restrictor 27 orifice smaller, the fore-aft differential pressure becomes larger, and the pump control valve 19 is driven to the left side, decreasing the hydraulic pump 2 discharge quantity q. When the fluctuation component y takes a negative value, by making the size of variable restrictor 27 orifice larger, the fore-aft differential pressure becomes smaller, and the pump control valve 19 is driven to the right side, increasing the hydraulic pump 2 discharge quantity q. In this manner, pump 2 response is suppressed so as to cancel the change in the load pressure PL of either the hydraulic cylinder 3 or hydraulic motor 4.

FIG. 12(*d*) shows an aspect of the embodiment applied when negative control is achieved using a controller.

In a negative controlling portion 26, which is a controller, a fixed restrictor 23 fore-aft differential pressure ΔP is detected by a pressure sensor 28.

The actual flow Q__a flowing into a tank 24 can be determined from a common hydraulic circuit formula as:

$$Q\_a = cA\sqrt{\Delta P} \text{ (provided that } c \text{ is the flow coefficient, and } A \text{ is the orifice size of the restrictor)} \quad (3)$$

The pressure of the tank 24 is an almost zero state, the pressure Pa at the inlet of the restrictor 23 is treated as differential pressure ΔP, and this differential pressure ΔP is detected by a pressure sensor 28.

In the negative controlling portion 26, a target flow Q__r, which should flow to the tank 24, is set beforehand. Conversely, an actual flow Q__a is obtained in accordance with the above-mentioned Formula (3) from the differential pressure ΔP detected by the pressure sensor.

Accordingly, the deviation ΔQ between the target flow Q__r and actual flow Q__a is obtained, and a command current, which makes this deviation ΔQ zero, is applied to the solenoid of a pump control valve 19', which is an electromagnetic valve.

A PID controlling portion 26*a* is a controller, which performs widely-known PID control, and generates a command current to the pump control valve 19' by multiplying deviation ΔQ, the integral value of this deviation ΔQ, and the differential value of this deviation ΔQ, respectively, by predetermined gains K1, K2, K3, and then adding these results. Here, a command current value i for the pump control valve 19' is increased as deviation ΔQ becomes larger, and the command current value i is adjusted so that deviation ΔQ corresponding to the integral item of deviation ΔQ eventually becomes zero.

Conversely, in the response suppressing portion 11, a fluctuation component y is determined as a fluctuation component of the load pressure PL of either the hydraulic cylinder 3 or the hydraulic motor 4, and this fluctuation component y is subtracted from the above-mentioned target flow Q__r. Furthermore, the fluctuation component y can also be applied to the actual flow Q__a. Further, the gain K3 of the integral element of the PID controlling portion 26*a* is adjusted in accordance with gain K3 read out from memory table 11*e,* in which that gain K3 of an integral element becomes smaller as the absolute value of the fluctuation component y becomes larger.

In this manner, pump 2 response is suppressed so as to cancel the change in the load pressure PL of either the hydraulic cylinder 3 or hydraulic motor 4.

Next, an example constitution applied to a load sensing hydraulic pump control system is described with reference to FIGS. 13(*a*) to 13(*e*).

FIG. 13(*a*) shows a basic hydraulic circuit of a load sensing hydraulic pump control system.

That is, the pressure oil that passes through each load pressure oil output port of flow control valves 5, 6 is transferred to a shuttle valve 48, and the pressure that is the highest of the various hydraulic cylinder 5, 6 load pressures PL from the shuttle valve 48, that is, the pressure oil that exhibits the maximum load pressure PLmax flows out.

The swash plate 2*a* of the hydraulic pump 2 is driven and controlled in accordance with a servo piston 47, which drives the hydraulic pump 2 swash plate 2*a,* and an LS valve (load sensing valve) 40, which acts on the pressure oil in this servo piston 47.

A pilot pressure signal, which indicates the discharge pressure PM of the hydraulic pump 2, is inputted via a pilot line 41*a* to an input port 40*a* on the left side of the drawing of the LS valve 40. Conversely, a pilot pressure signal, which indicates the maximum load pressure PLmax of hydraulic cylinders 5, 6 is inputted to an input port 40*b* on the right side of the LS valve 40 via a pilot line 41*b,* which is the LS pressure circuit from the shuttle valve 48. Further, spring force is applied to the right side of the LS valve 40 in accordance with a spring 40*c.*

The servo piston 47, which is the swash plate drive mechanism, and the LS valve 40 change the swash plate 2*a* of a variable capacity-type hydraulic pump 2 so that the differential pressure ΔP (=PM−PLmax) of these inputted pressures PM, PLmax is maintained at a differential pressure setting value ΔPLS corresponding to spring force.

That is, when the differential pressure PM−PLmax is smaller than the setting value ΔPLS, that is, when the maximum load pressure PLmax becomes large, the LS valve 40 is pushed to the left side, and in accordance therewith, the servo piston 47 is driven to the left, and the hydraulic pump 2 swash plate 2*a* is moved to the maximum inclined rotation angle MAX side. In accordance therewith, hydraulic pump 2 displacement q increases, and the flow discharged from the hydraulic pump 2 increases. Conversely, when the hydraulic pump 2 discharge pressure PM increases in accordance with the increase in the discharge quantity of the hydraulic pump 2, the force pushing the LS valve 40 to the right increases, the servo piston 47 is driven to the right, and the hydraulic pump 2 swash plate 2*a* is moved to the minimum inclined rotation angle MIN side. In the end, the hydraulic pump 2 swash plate 2*a* is controlled so that the force, which applies a differential pressure setting value ΔPLS in accordance with spring force to a maximum load pressure PLmax, is in balance with the hydraulic pump 2 discharge pressure PM.

FIG. 13(*b*) shows an aspect of the embodiment, which compensates the apparent differential pressure of the pump pressure PM, and the maximum load pressure PL, and suppresses the hydraulic pump 2 response by adding a response suppressing portion 11 to the basic constitution of FIG. 13(*a*).

In the same FIG. 13(*b*), a command current iy, which takes a value that gets smaller as the fluctuation component y becomes larger, is read out from the stored contents of a memory table 11*d* of a response suppressing portion 11, and this command current iy is applied to a solenoid 40*d* provided in LS valve 40.

This electromagnetic solenoid 40*d* generates pushing force relative to the spring 40*c* of the right side of LS valve 40. Accordingly, when the command current iy is outputted from the response suppressing portion 11, a thrust proportional to the magnitude of this command current iy is generated by the solenoid 40*d,* and in accordance therewith, the spring force of the spring 40*c* changes, and the differential pressure setting value ΔPLS is changed. Furthermore, the spring force in accordance with the spring 40*c* in FIG. 13(*a*) is generated in accordance with the spring 40*c* in FIG. 13(*b*) in accordance with a command current iy when the fluctuation component y is zero.

Accordingly, when a fluctuation component of the fluctuation component y takes a positive value, since the command current iy becomes small, and the thrust generated by the solenoid 40*d* weakens, the spring force of the spring 40*c* becomes small, and the apparent differential pressure setting value ΔPLS becomes small. In accordance therewith, the hydraulic pump 2 discharge quantity decreases, and pump discharge pressure PM becomes small. Conversely, when a fluctuation component of the fluctuation component y takes a negative value, since the command current iy becomes large, and the thrust generated by the solenoid 40*d* strengthens, the spring force of the spring 40*c* becomes large, and the apparent differential pressure setting value ΔPLS becomes large. In accordance therewith, the hydraulic pump 2 discharge quantity increases, and pump discharge pressure PM becomes large. By so doing, the change in the maximum load pressure PLmax, which acts from the right side of the LS valve 40, can be canceled, and hydraulic pump 2 response can be suppressed.

Furthermore, instead of thrust being exerted on the spring 40*c* in accordance with the above-mentioned solenoid 40*d*, hydraulic pump 2 response can be suppressed in the same way by applying pilot pressure Py from the opposite direction (left side) of the LS valve 40 spring 40*c*.

Further, as shown in FIG. 13(*c*), hydraulic pump 2 response can similarly be suppressed by providing a variable restrictor 42 part way along the LS pressure circuit 41*b*, which guides maximum load pressure PLmax to the LS valve 40, and controlling the size of the orifice of this variable restrictor 42.

In the same FIG. 13(*c*), a command current iy, which takes a value that gets smaller as the absolute value of a fluctuation quantity of a fluctuation component y becomes larger (makes the orifice size of the variable restrictor 42 smaller), is read out from the stored contents of memory table 11*e* of the response suppressing portion 11, and this command current iy is applied to a solenoid 42*a* of the variable restrictor 42.

In this manner, the change in the LS valve 40 can be suppressed, and consequently, the hydraulic pump 2 response can be suppressed by causing a change which makes the orifice size of a restrictor 42 smaller as the absolute value of a fluctuation component of load pressure PL becomes larger, making the change on the maximum load pressure PLmax guided to the LS valve 40 smaller.

Furthermore, in FIG. 13(*c*), the variable restrictor 42 is provided on the LS pressure circuit 41*b*, but the same control can be performed by providing a variable restrictor 42 on the line 41*c* between the LS valve 40 and the servo piston 47 (Refer to FIG. 13(*a*)).

Further, as shown in FIG. 13(*d*), hydraulic pump 2 response can be suppressed in the same manner by providing a variable bleed valve 43, which bleeds off to a tank the pressure oil on the LS pressure circuit 41b, which guides maximum load pressure PLmax to the LS valve 40, and controlling the orifice size of this variable bleed valve 43.

In the same FIG. 13(*d*), a command current iy, which takes a value that gets smaller as the fluctuation component y becomes larger (makes the orifice size of the variable bleed valve 43 larger), is read out from the stored contents of memory table 11*f* of the response suppressing portion 11, and this command current iy is applied to a solenoid 42*a* of the variable bleed valve 43.

In this manner, the change of the maximum load pressure PLmax guided to the LS valve 40 can be suppressed, and consequently, the hydraulic pump 2 response can be suppressed by making the orifice size of a variable bleed valve 43 larger as the fluctuation component y becomes larger, and making the maximum load pressure PLmax guided to the LS valve 40 smaller.

FIG. 13(*e*) shows an aspect of the embodiment applied when achieving load sensing control using a controller.

The discharge pressure PM of the hydraulic pump 2, which is detected by a pressure sensor 44*a*, is inputted to a load sensing controlling portion 46, which is a controller, and furthermore, a maximum load pressure PLmax detected by a pressure sensor 44*b* is inputted to the load sensing controlling portion 46.

In the load sensing controlling portion 46, a target differential pressure ΔPr (differential pressure setting value ΔPLS) is set beforehand. Conversely, an actual differential pressure ΔPa (=PM−PLmax) is determined from the detected values of each pressure sensor 44*a*, 44*b*.

Accordingly, the deviation ΔPr-a between the target differential pressure ΔPr and the actual differential pressure ΔPa is determined. Conversely, in the response suppressing portion 11, a fluctuation component y is determined as a fluctuation component of the load pressure PL of either the hydraulic cylinder 3 or the hydraulic motor 4, and this fluctuation component y is subtracted from the above-mentioned deviation ΔPr-a. And then, a command current, which sets to zero a deviation ΔPr-a that has had this fluctuation component y removed, is applied to a solenoid of a control valve 45, which is an electromagnetic valve.

By so doing, the pump 2 response is suppressed so as to cancel a load pressure PL change of either the hydraulic cylinder 3 or the hydraulic motor 4.

Cases that apply to each of the positive control, negative control and load sensing control hydraulic pump control systems will be explained by referring to FIG. 11, FIG. 12 and FIG. 13 above.

In the descriptions of FIG. 11, FIG. 12 and FIG. 13 above, hydraulic pump 2 response is suppressed by applying to the hydraulic pump 2 a command, which carries out compensation in accordance with the fluctuation component itself, that is, a command, which gives rise to a change corresponding to a plus quantity, minus quantity of a pressure fluctuation component y, but a command to the hydraulic pump 2 can also be compensated in accordance with a gradient of y (differential value of the pressure fluctuation component y), rather than the pressure fluctuation component y itself. In other words, the command to the hydraulic pump 2 can be changed in accordance with the increase quantity, decrease quantity of a pressure fluctuation component y. According to control such as this, suppression, which predicts the change in pressure fluctuation, becomes possible, and hydraulic pump 2 response suppression can be controlled in a feed forward manner.

Further, in FIG. 11, FIG. 12 and FIG. 13, a variety of response suppression procedures were described, but hydraulic pump 2 response can also be suppressed by providing a variable restrictor on a line, via which pressure oil either flows into or flows out of a servo piston 35, 35', 20, 47, and suppressing the speed of the pressure oil acting on the servo piston (piston operating speed) in accordance with reducing the orifice size of this variable restrictor.

In the aspects of the embodiment described above, the descriptions assume the load pressure PL of principally either a hydraulic cylinder 3 or hydraulic motor 4, as the quantity of state x, which is detected by the quantity of state detecting portion 9, but as shown in FIG. 14, a differential pressure ΔP between the hydraulic pump discharge pressure PM, and the maximum load pressure PLmax of an in-operation hydraulic actuator 3, 4 (hereinafter referred to as the minimum differential pressure) can also be detected as the quantity of state x, and hydraulic pump 2 response is suppressed on the basis thereof.

That is, as shown in the same FIG. 14(*a*), the pressure oil that passes through each load pressure extraction port of the flow control valves 5, 6 is transferred to the shuttle valve 48, and the pressure oil, which exhibits the highest pressure of the various load pressures PL of the hydraulic cylinders 5, 6, that is, the maximum load pressure PLmax, flows out of the shuttle valve 48. The maximum load pressure PLmax is detected by pressure sensor 44*b*. The hydraulic pump 2 discharge pressure PM is detected in accordance with pressure sensor 44*a*.

In the quantity of state detecting portion 9, the minimum differential pressure ΔP between the hydraulic pump discharge pressure PM, and the maximum load pressure PLmax of an in-operation hydraulic actuator 3, 4 is detected as the quantity of state x, and this quantity of state x is outputted to the response suppressing portion 11.

In the response suppressing portion 11, the same as was described in FIG. 2 and so forth, a high frequency fluctuation component y of the minimum differential pressure x is outputted from a high-pass filter 11*b,* and subtracted from the flow command r to the hydraulic pump 2, and a compensated flow command value r' is outputted to the hydraulic pump 2 ( swash plate drive mechanism portion 31). As a result thereof, hydraulic pump 2 response is suppressed.

Here, the effect of when hydraulic pump 2 response is suppressed by letting the above-mentioned minimum differential pressure ΔP be the quantity of state x will be described.

As is clear from the above-mentioned Formula (3) as well, the flow Q of the pressure oil, which becomes the maximum load pressure PLmax, and which flows into either hydraulic actuator 3 or 4, is proportional to the square root $\sqrt{\Delta P}$ of the (operator level operation quantity-determined) restrictor orifice size A of flow control valves 5, 6, and the above-mentioned minimum differential pressure ΔP, which is the fore-aft differential pressure of flow control valves 4, 5. Therefore, a fluctuation of the minimum differential pressure ΔP can give rise to a speed fluctuation (a flow Q fluctuation) of a hydraulic actuator 3, 4 that is contrary to the intentions of the operator.

Accordingly, the above-mentioned response suppressing portion 11 suppresses the hydraulic pump 2 response so that when the minimum differential pressure ΔP, which is the quantity of state x, increases, the hydraulic pump 2 flow q is reduced, the hydraulic pump 2 discharge pressure PM drops, and the minimum differential pressure ΔP is reduced, and when the quantity of state x minimum differential pressure ΔP decreases, the hydraulic pump 2 flow q is increased, the hydraulic pump 2 discharge pressure PM rises, and the minimum differential pressure ΔP is increased. In other words, an effect is achieved, wherein the minimum differential pressure ΔP either remains constant at all times, or the changes thereto are smooth, minimum differential pressure ΔP fluctuation, which occur in accordance with load and other fluctuations, is suppressed, and in accordance therewith, hydraulic actuator 3, 4 speed fluctuations, which run counter to the operator's intentions, cease to occur. A hydraulic actuator can be operated exactly according to operator level operation quantity.

Furthermore, in FIG. 14(*a*), similar to the description given for FIG. 2, a high frequency threshold value fc for extracting a high frequency component y from a quantity of state x can be changed correspondent to a working state in accordance with the suppression quantity specifying portion 10, and the extent of suppression of minimum differential pressure ΔP change can be optimally set to match up with a working state.

Further, as shown in FIG. 14(*b*), in place of the above-mentioned high-pass filter 11*b,* there can be provided a function table 11*g,* in which the value of y changes from negative to positive the larger the minimum differential pressure x becomes, and furthermore, the value of y become zero at the target minimum differential pressure xr, and a fluctuation component y corresponding to a quantity of state x can be read out from this function table 11*g,* and a compensated flow command value r', which results from subtracting this read-out fluctuation component y from the pump flow command r, can be outputted to the hydraulic pump 2. As a result thereof, the pump flow command r is compensated by the deviation relative to the target differential pressure xr, enabling the reduction of the fixed deviation relative to the target minimum differential pressure.

In FIG. 14(*a*), (*b*), control is being performed so as to compensate the flow command r to the hydraulic pump 2, but the fluctuation of the minimum differential pressure ΔP can be similarly suppressed by controlling a control valve, which unloads discharge pressure oil of the hydraulic pump 2 to a tank.

In the aspect of the embodiment shown in FIG. 14(*c*), when the minimum differential pressure ΔP between the hydraulic pump 2 discharge pressure PM, and the maximum load pressure PLmax exceeds a set value, an unloading valve 48, which unloads discharge pressure oil of the hydraulic pump 2 to a tank, is provided. An electromagnetic solenoid 48*a* is provided on the side acted upon by the pump discharge pressure PM of this unloading valve 48.

In the response suppressing portion 11, there is provided a function table 11*h,* in which the command current iy to the electromagnetic solenoid 48*a* increases as the high frequency fluctuation component y outputted from the high-pass filter 11*b* becomes larger.

Accordingly, a command current iy corresponding to a fluctuation component y is read out from the above-mentioned function table 11*h,* and when this command current iy is applied to the solenoid 48*a* of the unloading valve 48, a solenoid thrust proportional to the command current iy is generated, the orifice size of the unloading valve 48 becomes larger in correspondence with this solenoid thrust, and the minimum differential pressure ΔP decreases.

As a result thereof, when a fluctuation component y of a minimum differential pressure x becomes larger on the plus side, as the command current iy becomes larger, the solenoid thrust becomes larger, the orifice size of the unloading valve 48 becomes larger, and the minimum differential pressure ΔP is reduced. Conversely, when a fluctuation component y of a minimum differential pressure x becomes larger on the minus side, as the command current iy becomes smaller, the solenoid thrust becomes smaller, the orifice size of the unloading valve 48 becomes smaller, and the minimum differential pressure ΔP is increased. By so doing, the response of the change of the minimum differential pressure ΔP is suppressed.

An aspect of the embodiment when a variable bleed valve 49 is provided in place of the above-mentioned unloading valve 48 for unloading to a tank the hydraulic pump 2 discharge pressure oil in accordance with level operation quantity is described with reference to FIG. 14(*d*).

The orifice size of the variable bleed valve 49 shown in FIG. 14(*d*) becomes larger as the command current iy applied to the solenoid increases, making the bleed off flow larger. This command current iy takes a value that becomes smaller as the operation quantity of operation levers 7, 8 become larger.

That is, in the bleed orifice controlling portion 50, electrical signals specifying the respective operation quantities of operation levers 7, 8, which are electrical-type levers, are inputted. Here, a memory table 50*a*, 50*b*, 50*c* is established for each of boom-up operation quantity, boom-down operation quantity, and rotation (rotate right, rotate left) operation quantity. In each of these memory tables 50*a*, 50*b*, 50*c*, there is stored the corresponding relationship between operation quantity and orifice size by which the size of the orifice of the variable bleed valve 49 becomes smaller as operation quantity increases from the neutral position to the full lever position. And the smallest orifice size of those read out from each memory table 50*a*, 50*b*, 50*c*, is selected by the minimum value selecting portion 50*d*. Accordingly, in the response suppressing portion 11, the orifice size outputted from this minimum value selecting portion 50*d* is added to the high frequency fluctuation component y of the minimum differential pressure ΔP, and the orifice command is obtained. A command current iy proportional to an orifice command is stored in memory table 50*e*. Accordingly, a command current iy corresponding to an orifice command, wherein a fluctuation component y is added to an orifice size in accordance with level operation quantity, is outputted to the solenoid of the variable bleed valve 49.

As a result thereof, when the minimum differential pressure ΔP increases, and the fluctuation component y becomes larger on the plus side, because the size of the variable bleed valve 49 orifice becomes larger as the command current iy becomes larger, the hydraulic pump 2 discharge pressure PM decreases, and the minimum differential pressure ΔP becomes smaller. Conversely, when the minimum differential pressure ΔP decreases, and the fluctuation component y becomes larger on the minus side, because the size of the variable bleed valve 49 orifice becomes smaller as the command current iy becomes smaller, the hydraulic pump 2 discharge pressure PM increases, and the minimum differential pressure ΔP becomes larger. Further, as the operation quantity of the operation lever 7, 8 becomes larger, the command current iy becomes smaller, the size of the variable bleed valve 49 orifice becomes smaller, the hydraulic pump 2 discharge pressure PM increases, and the minimum differential pressure ΔP becomes larger. Accordingly, the response of the change of the minimum differential pressure ΔP can be suppressed, and furthermore, suppression corresponding to operation lever 7, 8 operation quantity is suppressed.

Next, an aspect of the embodiment, which uses a quantity of state detecting portion 9 to detect as a quantity of state x the operation quantity of an operation lever, and suppresses the response of the hydraulic pump 2 on the basis thereof is described with reference to FIG. 15.

In general, a hydraulic actuator, which drives an inertial body, such as a revolving superstructure and an undercarriage, is unable to commence movement right away even when a control level is operated rapidly. The consequent problem is that hydraulic pump 2 discharge pressure rapidly rises, and in accordance with this rapid rise in pump pressure PM, the work machine suddenly operates following a lag.

Accordingly, there is a need for responsiveness, which does not allow a rapid rise of hydraulic pump discharge pressure PM even when an operation lever for operating an inertial body is suddenly manipulated in a rough manner.

FIG. 15(*a*) is an aspect of the embodiment, which solves for this problem.

As shown in the same FIG. 15(*a*), in a quantity of state detecting portion 9, a pilot pressure Pp indicating the operation quantity of rotation operation lever 8 passes through a shuttle valve 32, and is detected by a pressure sensor 14, and is outputted to a response suppressing portion 11 as a quantity of state x, similar to FIG. 8(*b*).

In the response suppressing portion 11, the same as was described using FIG. 2 and so forth, a high frequency fluctuation component y of a quantity of state x is outputted from a high-pass filter 11*b*, this fluctuation component y is subtracted from a flow command r relative to the hydraulic pump 2, and is outputted to the hydraulic pump 2 (swash plate drive mechanism portion 31) as a compensated flow command value r'. As a result thereof, the response of the hydraulic pump 2 is suppressed.

Here, by way of describing the effect of when the response of the hydraulic pump 2 is suppressed by making the operation quantity Pp of the rotation operation lever 8 a quantity of state x, when the rotation operation lever 8 is suddenly manipulated, because the quantity of state x increases, the fluctuation component y increases. Here, in accordance with setting the fluctuation component to be extracted by a high-pass filter 11*b* to a low frequency component of around 2–3 Hz or more, a larger fluctuation component y is outputted only when fast lever operation in excess thereof is performed. Consequently, prior to the rise of hydraulic pump 2 discharge pressure, the pump flow command r' decreases, suppressing the rise of transient pump discharge pressure PM. That is, it is possible to achieve responsiveness, which does not allow a rapid rise of hydraulic pump discharge pressure PM even when an operation lever for operating an inertial body, like a revolving superstructure, is suddenly manipulated in a rough manner. Furthermore, in the aspect of the embodiment shown in FIG. 15(*a*), only revolving work response is suppressed, and the work of other work machines is unaffected. Therefore, work in accordance with other work machines, which do not require response suppression, for example, bucket sifting work, can be performed with good efficiency.

The above-mentioned bucket sifting work is work, in which the operation lever is oscillated in two directions, and the shock therefrom is used either to pass dirt inside the bucket through a sifter, or to finely scatter same, or to remove dirt adhering to the bucket, and the shock force resulting from the rapid manipulation of the operation lever must be applied to the bucket. Therefore, response suppression is not needed, rather, responsiveness needs to be heightened instead.

FIG. 15(*b*) shows an aspect of the embodiment, which responds to this requirement.

As shown in the same FIG. 15(*b*), in the response suppressing portion 11, just as in FIG. 15(*a*), a high frequency fluctuation component y1 of a quantity of state x1 of the rotation operation lever 8 is outputted from a high-pass filter 11*b*, this fluctuation component y1 is subtracted from a flow command r relative to the hydraulic pump 2, and is outputted to the hydraulic pump 2 (swash plate drive mechanism portion 31) as a compensated flow command value r'. Therefore, the response of the hydraulic pump 2 relative to the operation of the rotation operation lever 8 is suppressed.

Conversely, in the quantity of state detecting portion 9, a pilot pressure Pp indicating the operation quantity of a bucket operation lever 7' for operating the bucket passes through a shuttle valve 32', is detected by a pressure sensor 12', and is outputted to the response suppressing portion 11 as a quantity of state x2. In the response suppressing portion 11, a high frequency fluctuation component y2 of the quantity of state x2 of the bucket operation lever 7' is outputted from a high-pass filter 11*b*2, this fluctuation component y2 is added to a flow command r relative to the hydraulic pump 2, and is outputted to the hydraulic pump 2 (swash plate drive mechanism portion 31) as a compensated flow command value r'. Therefore, the response of the hydraulic pump 2 relative to the operation of the bucket operation lever 7' is strengthened. As a result thereof, a shock force corresponding to the rapid operation of the bucket operation lever 7' can be applied to the bucket, enhancing the efficiency of bucket sifting work.

In the above aspect of the embodiment, the hydraulic pump 2 is assumed to be the response suppression target apparatus, but as shown in FIG. 15(*c*), the flow control valve can also be the response suppression target apparatus.

When performing rough combing work for leveling the surface of the ground to make it roughly horizontal, there is a need to move the bucket edge almost horizontally by operating the boom operation lever 7 to the up side while the arm is in a fully extended state, and simultaneously performing a full lever operation of the arm operation lever 8' to the excavating (retracting) side.

However, the problem was that if the lever was operated, and the pump swash plate increased from a state in which the lever was in the neutral position, and the pump discharge quantity was the minimum value MIN, when the load on the bucket edge was small, the arm, which constitutes the side which descends of its own weight, suddenly dropped, most of the pump discharge pressure oil flowed into the arm, and without pump pressure being able to rise sufficiently, there was an instant when the boom did not raise up, and the locus of the bucket edge shifted considerably downward. Therefore, to move the bucket edge to the desired locus required skill in operating the arm operation lever 8'. The aspect of the embodiment shown in FIG. 15(*c*) is an aspect, which solves for this problem.

In the aspect of the same FIG. 15(*c*), when the boom and arm are simultaneously operated using full lever movements, the response of the arm flow control valve 6' is suppressed correspondent to the boom-up operation of the boom operation lever 7.

As shown in the same FIG. 15(*c*), in the quantity of state detecting portion 9, a flow control valve orifice command corresponding to the output voltage of the boom operation lever 7, and arm operation lever 8', which are electrical levers, is obtained from respective memory tables 9*b*, 9*c*. In the response suppressing portion 11, a high frequency fluctuation component y of a boom-up orifice command x is outputted from a high-pass filter 11*b*, this fluctuation component y is subtracted from the arm-excavation orifice command r, and outputted to the arm flow control valve 6' as a compensated orifice command r'. In other words, the compensated orifice command r' is converted to a current command in a converting portion 51*c*, and applied to a solenoid in the arm-excavation side of the arm flow control valve 6'. Furthermore, other orifice commands are also converted to current commands in converting portions 51*a*, 51*b*, 51*d*, and applied to respective solenoids in the boom flow control valve 5, and to the solenoid on the arm-dump side of the arm flow control valve 6'.

Consequently, an increase in the size of the orifice of the arm flow control valve 6' will be delayed in accordance with the operating speed of the boom-up side of the boom operation lever 7, and the drawing into the arm of excessive discharge pressure oil at pump swash plate rise is prevented, and the sudden collapse of the bucket edge is suppressed. Furthermore, when the boom and arm are being operated slowly, the enlargement of the arm orifice is not suppressed, but because a sufficient pump swash plate rise (flow increase) at this time serves the purpose, the above-mentioned problem of the boom not raising up (pump pressure decrease) does not occur. Therefore, the sudden descent of the arm, which constitutes the side which descends of its own weight, and the considerable downward shift of the locus of the bucket edge relative to arbitrary operation no longer occur, and skill in operating the arm operation lever 8' to carry the bucket edge to the desired locus is no longer needed.

Furthermore, the response suppressing portion 11 shown in FIG. 15(*c*) can also be constituted as shown in FIG. 15(*d*).

In FIG. 15(*d*), in place of processing, which subtracts a fluctuation component y from an arm excavation command r, there is performed processing, wherein gain, which constitutes (A−y)/A (provided that A>y>0), wherein A is a predetermined constant, is determined by a gain operating portion 11*i*, and this gain is multiplied in a multiplying portion 11*j* by an arm excavation orifice command r.

Further, the response suppressing portion 11 shown in FIG. 15(*c*) can also be constituted as shown in FIG. 15(*e*). FIG. 15(*e*) is an aspect of the embodiment, which suppresses the response of the arm flow control valve 6' only at the start of rough combing work.

That is, a value, which results from subtracting only a predetermined value (half lever or greater fluctuation component) from a boom-up orifice command x, is outputted to a comparator 11*k*, and when the value is positive (x is a fluctuation component greater than half lever), a low frequency component X(n) is computed in accordance with the above-mentioned Formula (1), and a high frequency component Y is computed in accordance with the above-mentioned Formula (2). Conversely, when the value in the comparator 11*k* is negative (x is a fluctuation component smaller than a half lever), the low frequency component X(n) in the above-mentioned Formula (1) is set in the current boom-up orifice command x (clear to zero). Further, when the boom operation lever 7 is operated in the boom-down direction, and when the arm operation lever 8' is operated in the arm-dump direction, the low frequency component X(n) in the above-mentioned Formula (1) is set in the current boom-up orifice command x (clear to zero).

By so doing, a fluctuation component y is computed when a quantity of state x constitutes a quantity, which exceeds a predetermined magnitude from a boom operation quantity, for example, a half lever or greater fluctuation component, and furthermore, when the arm is not operated to the excavation side, and when the boom is not operated to the raise side, the fluctuation component y is cleared to zero by initializing the low frequency component Xn using the current detection value x, the response of the arm flow control valve 6' is suppressed only at the start of rough combing work, and arm collapse is suppressed. Furthermore, in accordance with either subtracting or multiplying the above-mentioned computation relative only to an arm excavation command of greater than half lever, maximum orifice can also be limited only at full arm operation.

Next, an aspect of the embodiment constituted using a hydraulic control system equipped with a pressure compensation valve so as to enable the suppression of arm collapse at the same rough combing work is described with reference to FIG. 16.

To alleviate the so-called load dependency of the drive velocity of a hydraulic actuator when operation levers are being operated in combination, there is the above-mentioned technology called load sensing control. In this load sensing control system, as shown in FIG. 16(*a*), a valve, called a pressure compensation valve 52, 53, 54, 55 is provided between a flow control valve 5, 6' and a hydraulic cylinder 3, 4', and the differential pressure of pressures before and after a valve of pressure oil, which passes through a flow control valve 5, 6' is compensated so that it constitutes the same value with regard to either drive shaft (arm, boom). In other words, in the above-described general hydraulic circuit formula $Q=cA\sqrt{\Delta P}$ (wherein c is the flow coefficient, and A is the restrictor orifice size), by making the differential pressure ΔP the same for both drive shafts, a flow Q proportional to an operator-ordered drive command value (orifice command A) is achieved.

Further, the discharge pressure of the hydraulic pump 2 is subjected to load sensing control so that the discharge pressure of the hydraulic pump 2 constitutes a pressure, in which the above-mentioned fore-aft differential pressure is added to the maximum value of the load pressure of an in-operation hydraulic cylinder 3, 4', and in accordance therewith, a change in velocity (load dependency) is suppressed in accordance with the difference of the load pressures of each hydraulic cylinder 3, 4' during combined operation.

Figure 16A:
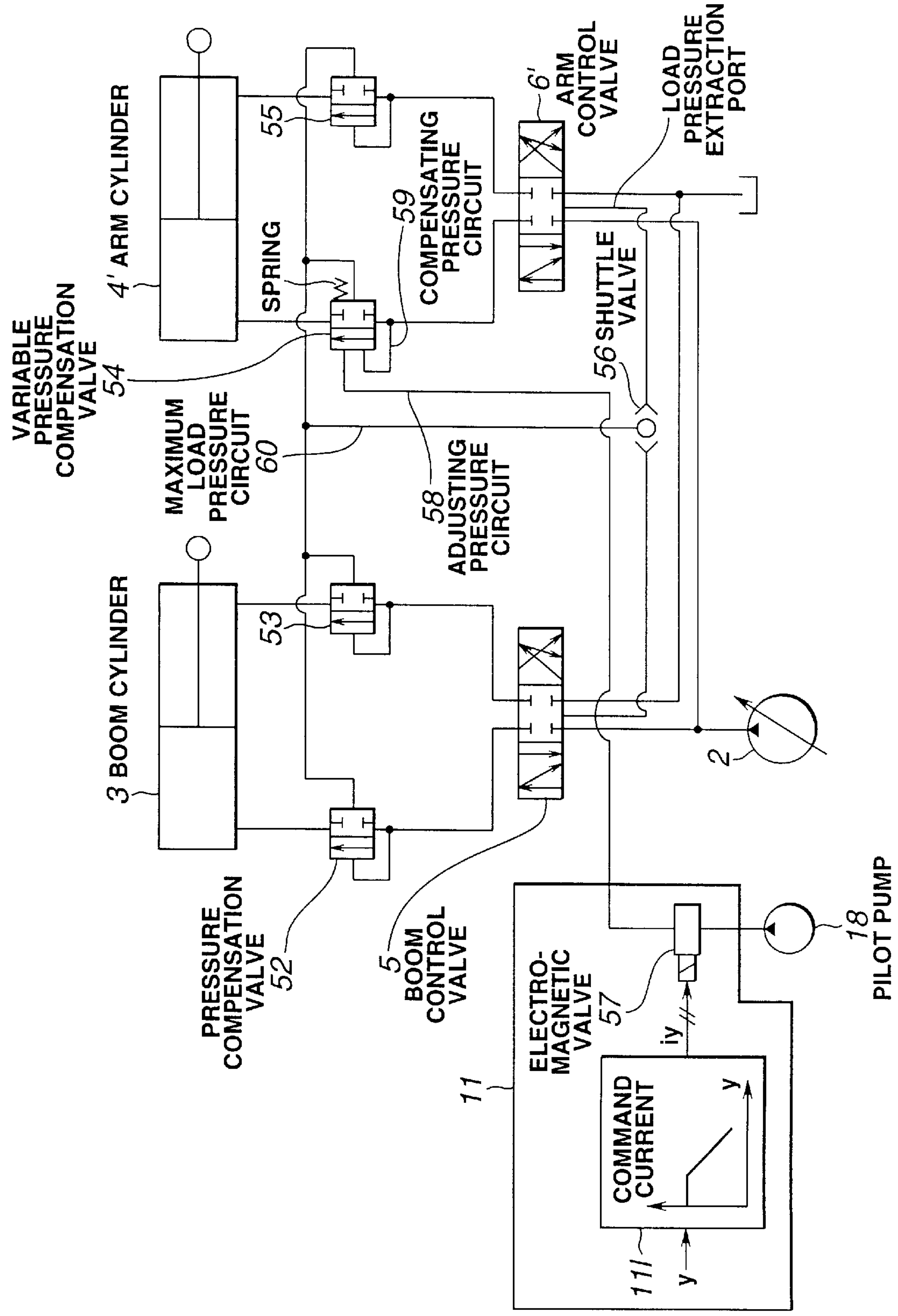
FIGS. 16(*a*)–(*c*) are diagrams showing various aspects, which treat a pressure compensation valve as a response suppression target apparatus.
Figure 16B:
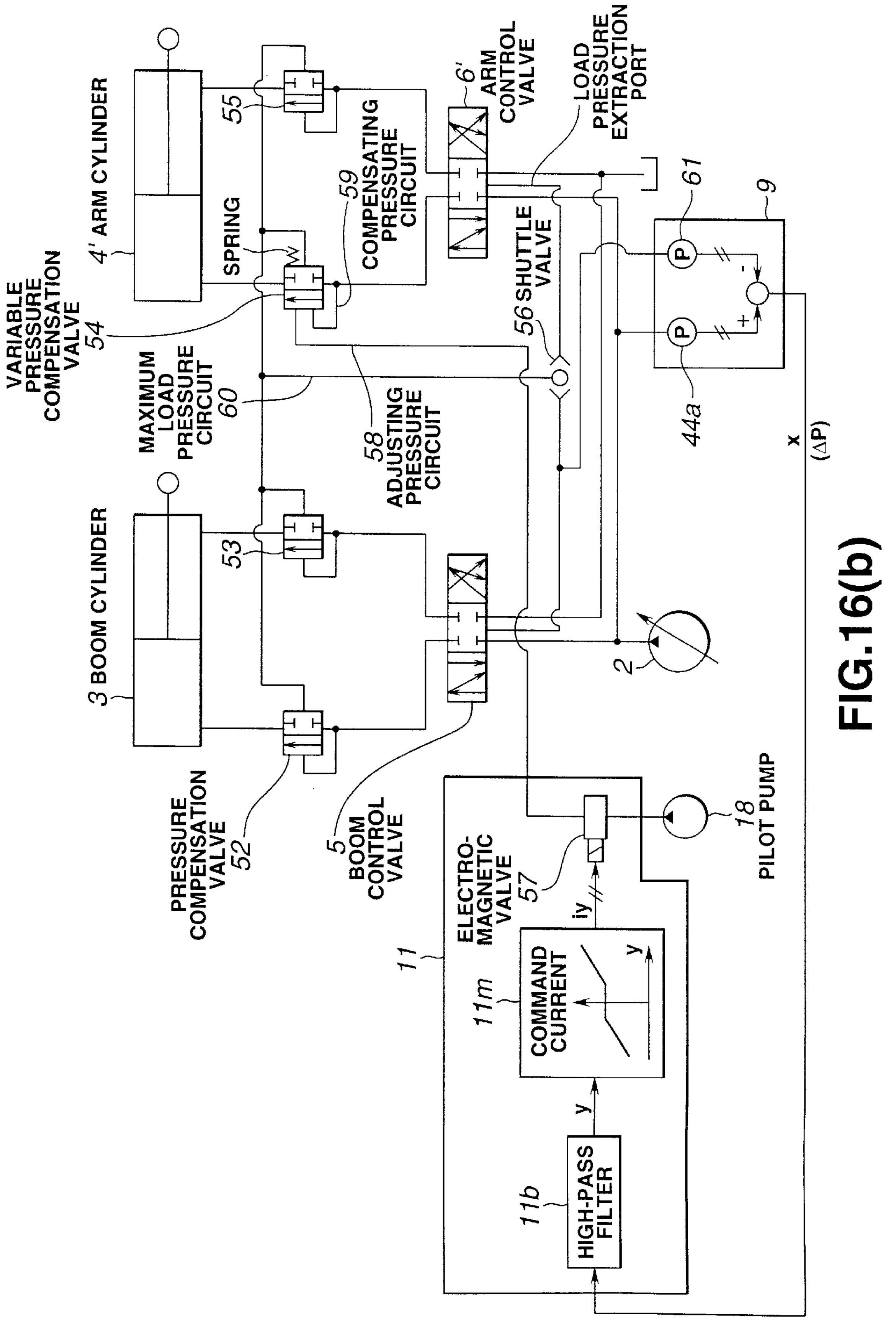
Figure 16C:
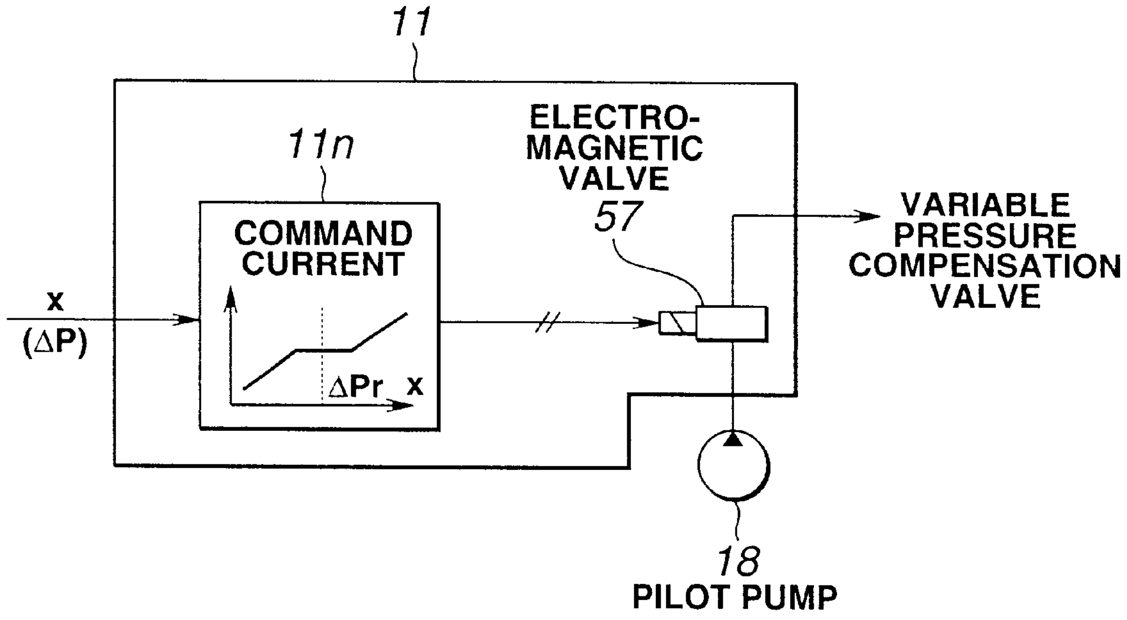
Figure 17A:
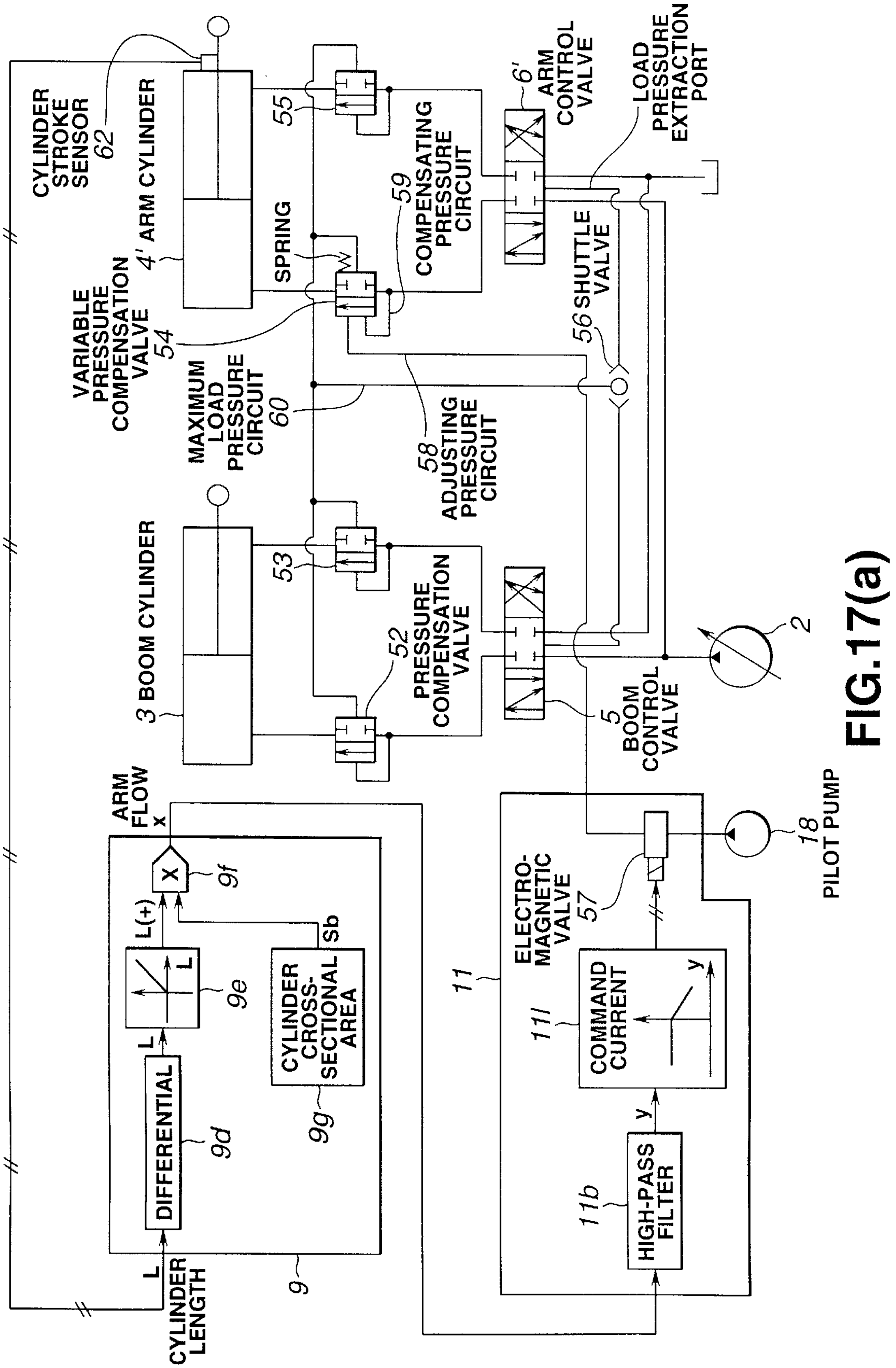
FIGS. 17(*a*)–(*d*) are diagrams showing various aspects, which treat a pressure compensation valve as a response suppression target apparatus.
Figure 17B:
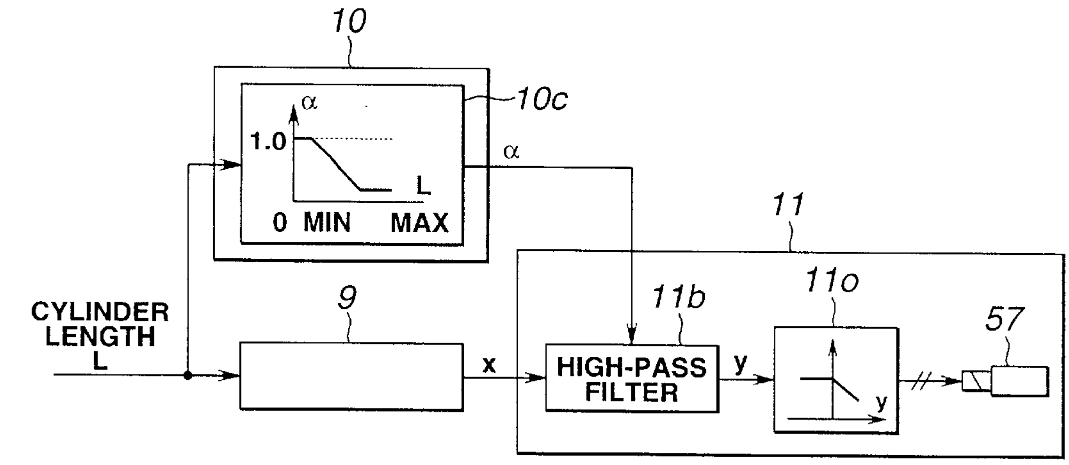
Figure 17C:
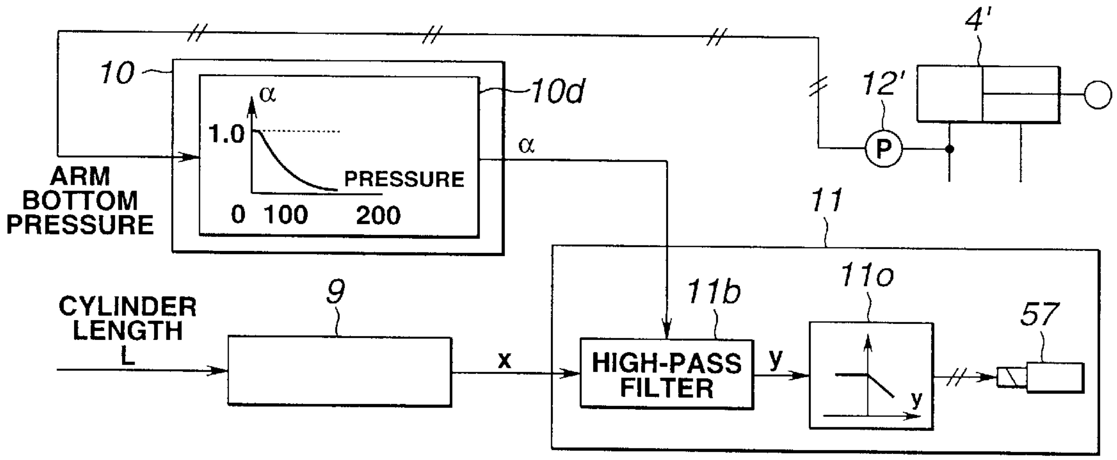
Figure 17D:
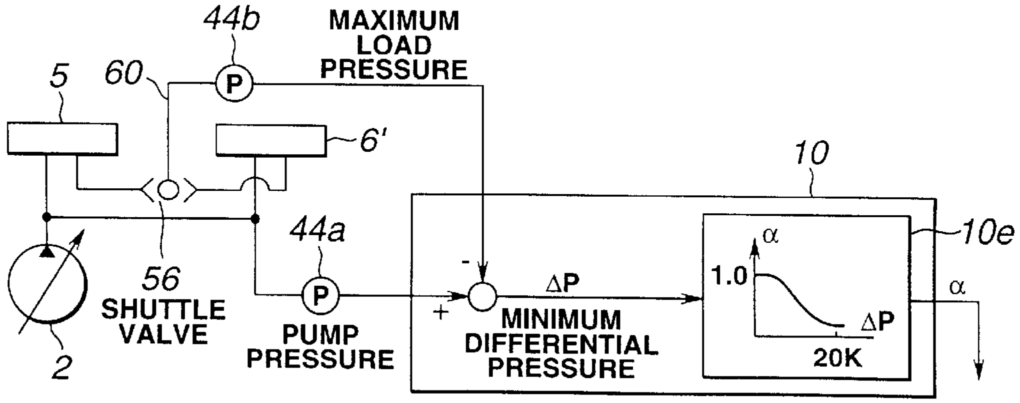
Figure 18A:
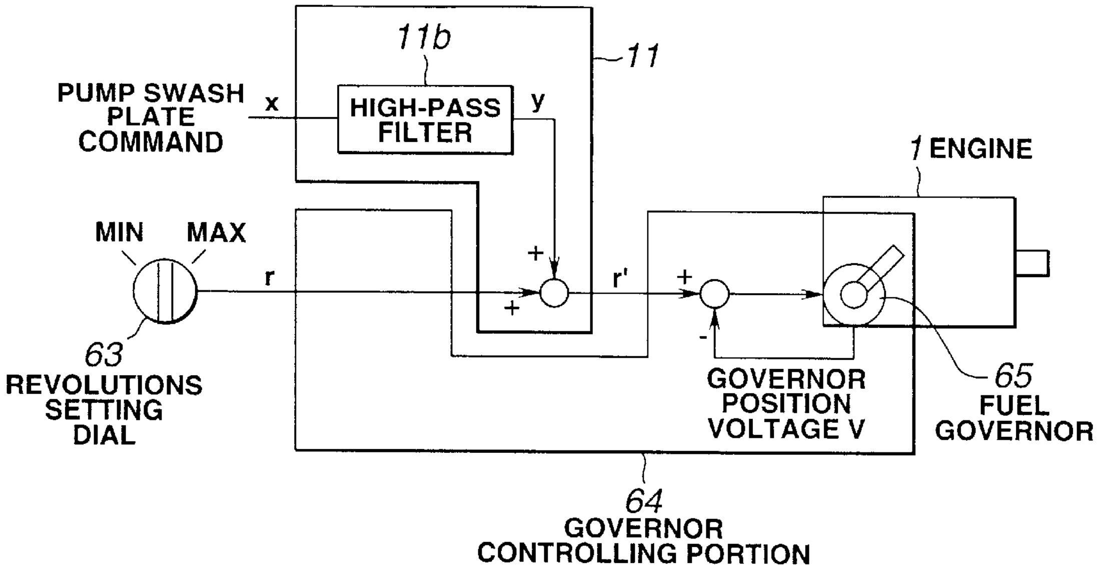
FIGS. 18(*a*)–(*e*) are diagrams showing various aspects, which treat either an engine or a hydraulic pump as a response suppression target apparatus.
Figure 18B:
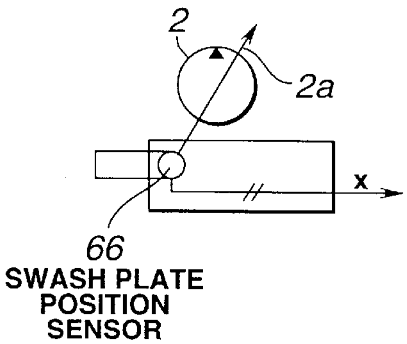
Figure 18C:
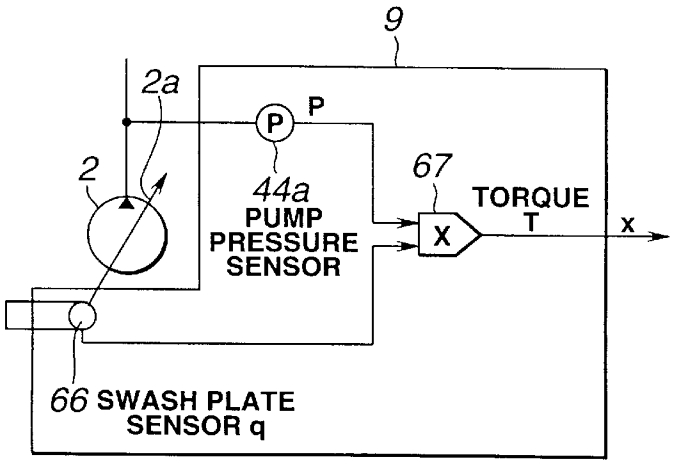
Figure 18D:
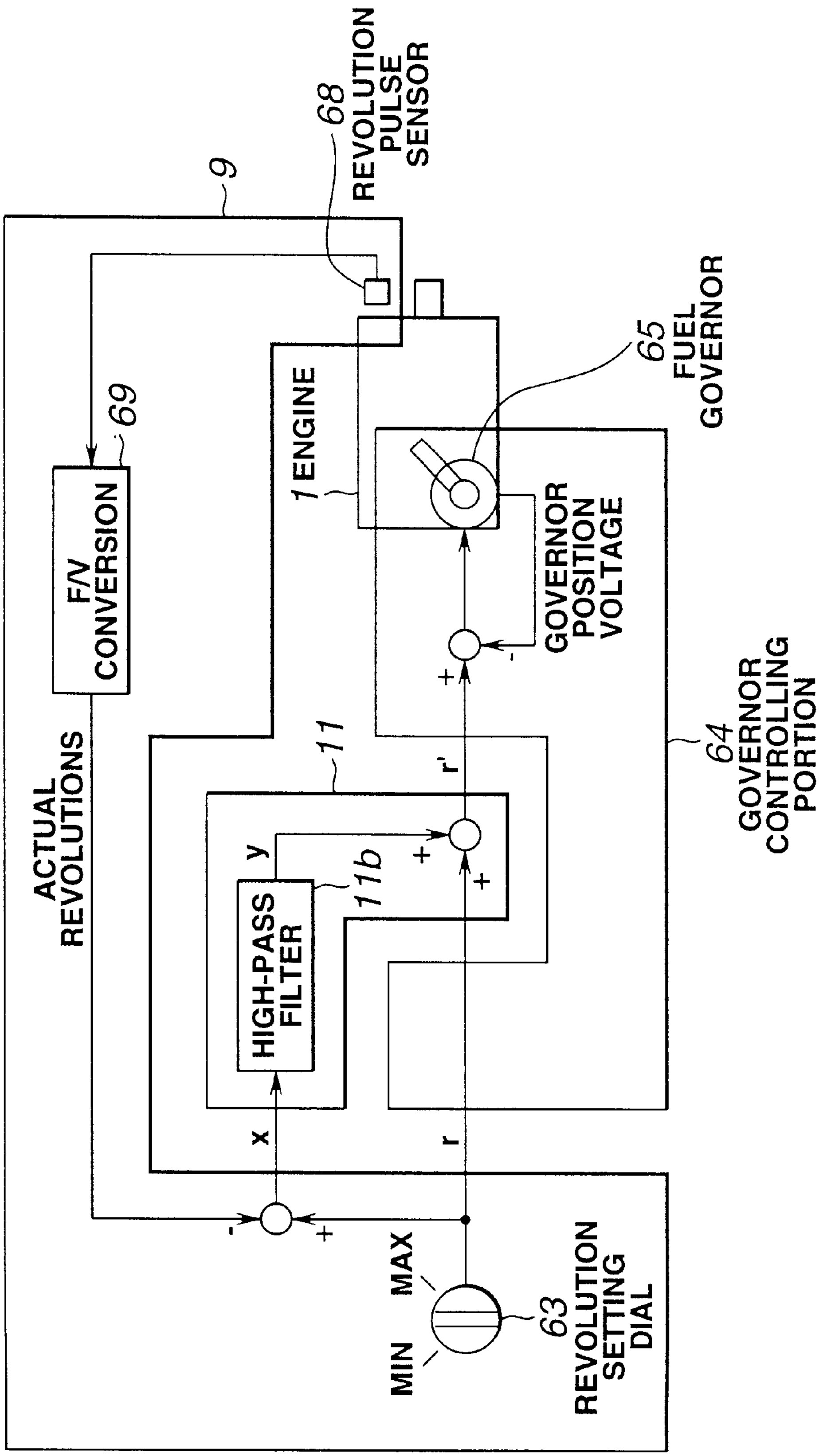
Figure 18E:
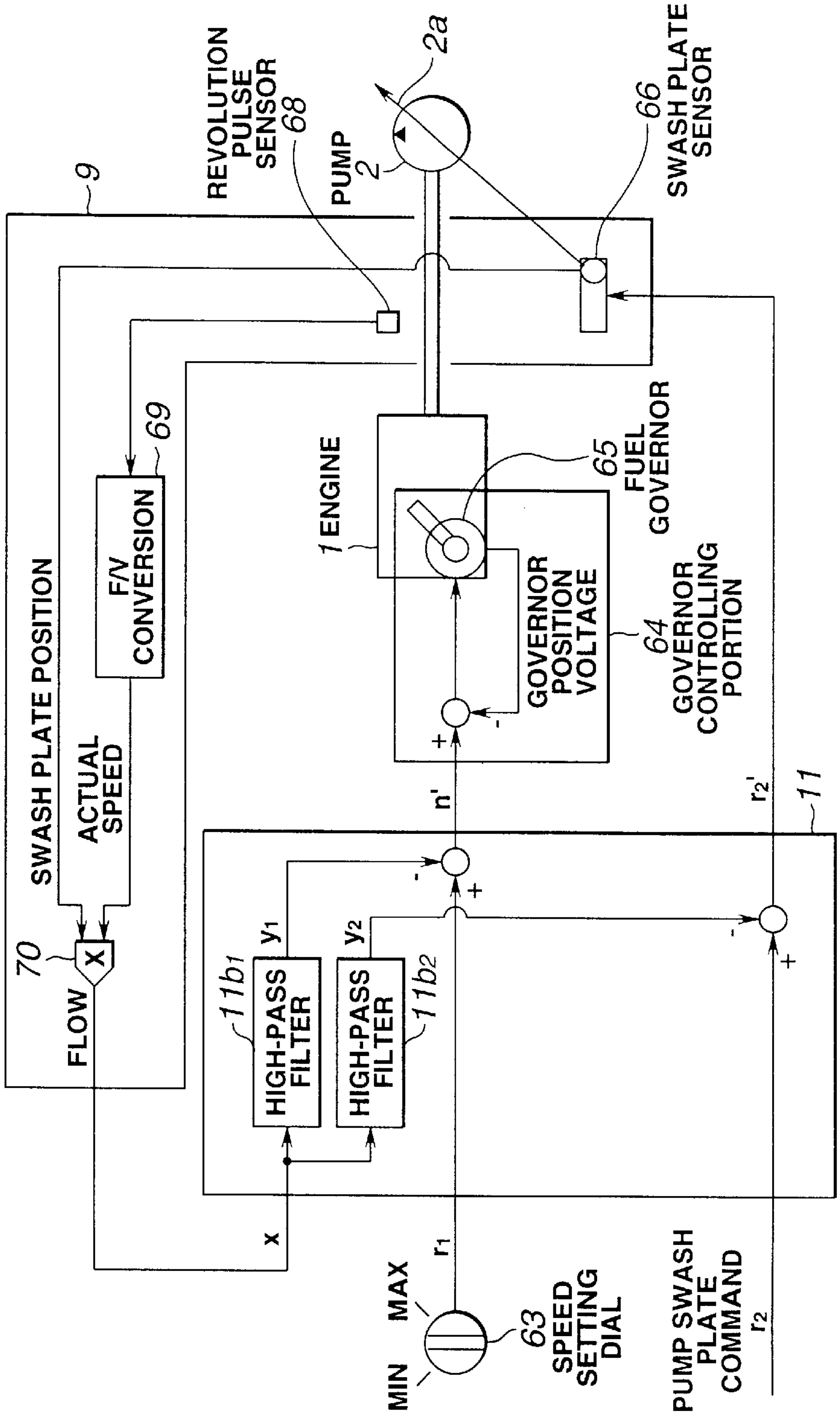
Figure 19A:
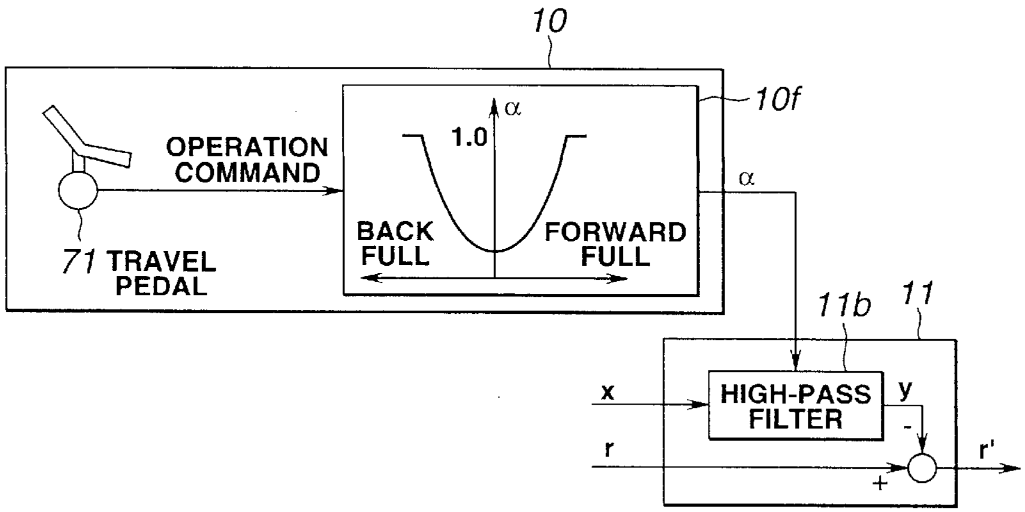
FIGS. 19(*a*)–(*g*) are diagrams showing various aspects, which treat an engine as a response suppression target apparatus.
Figure 19B:
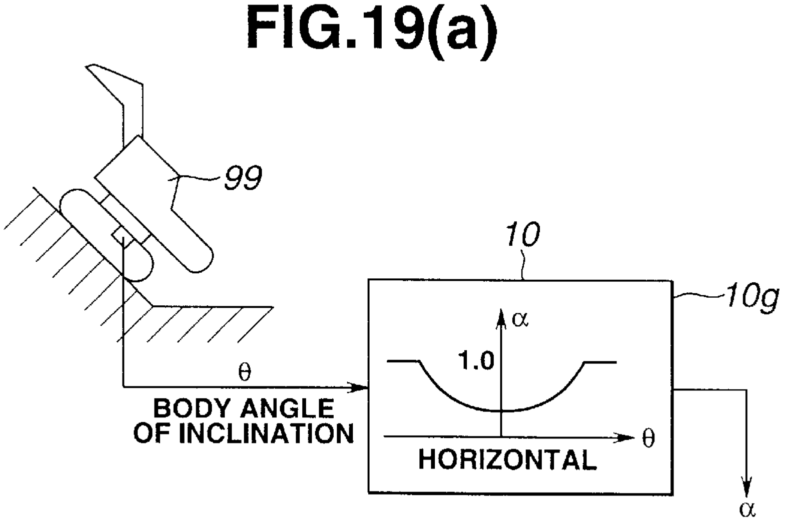
Figure 19C:
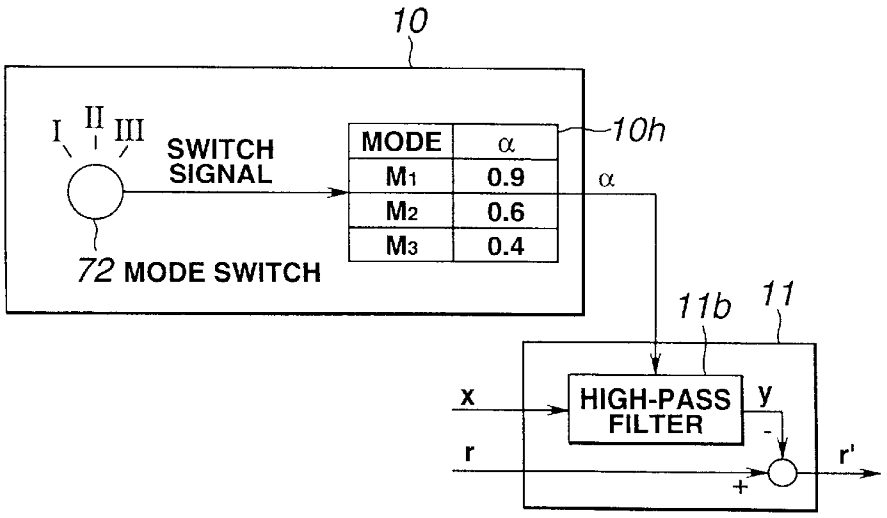
Figure 19D:
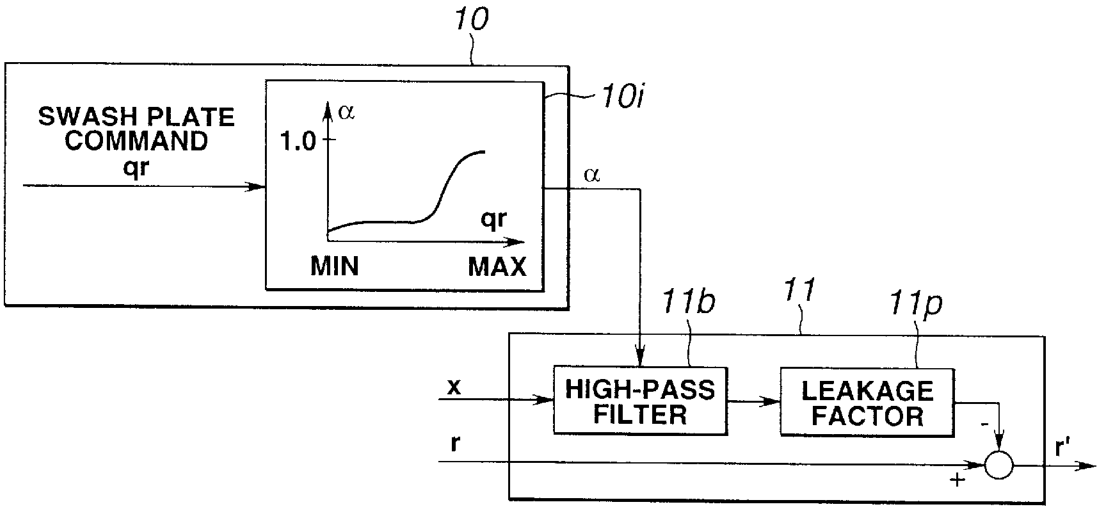
Figure 19E:
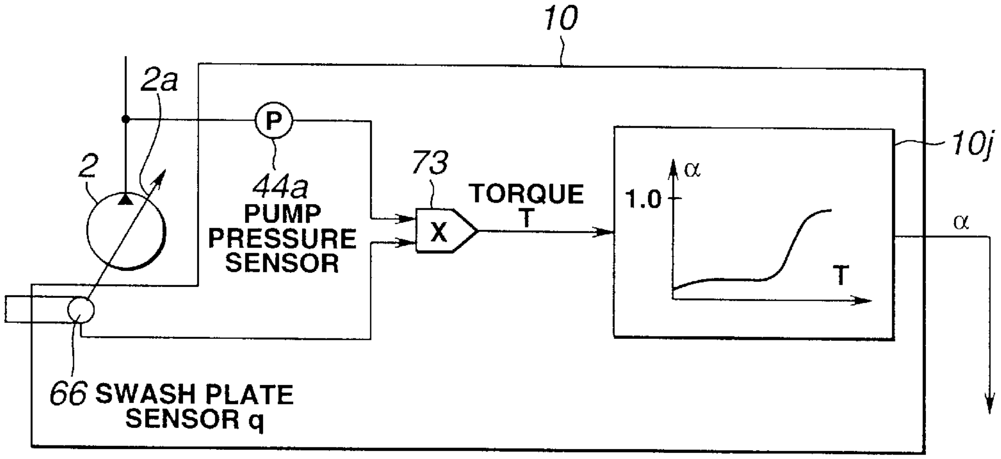
Figure 19F:
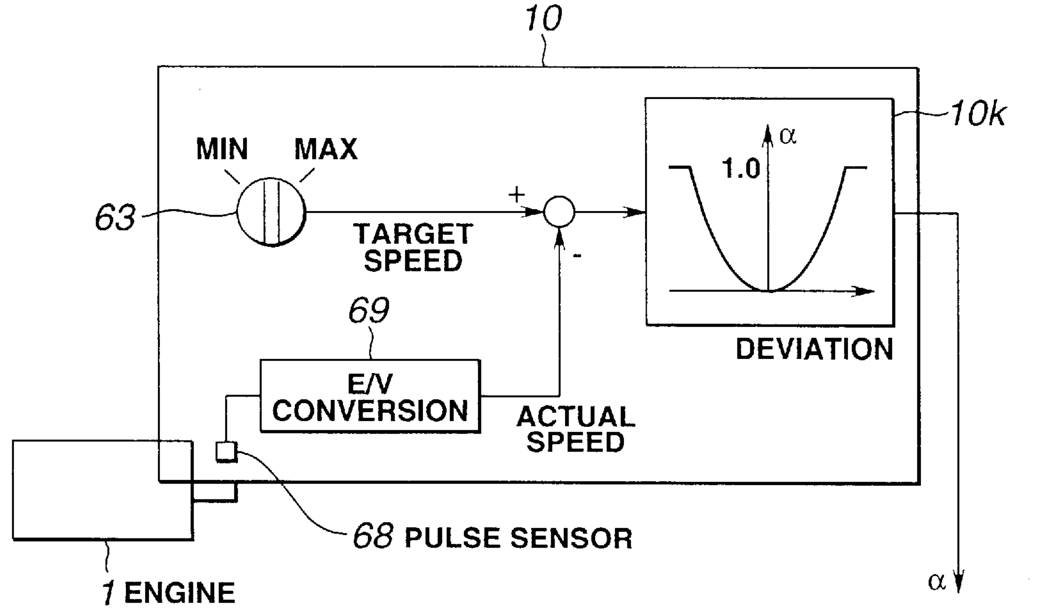
Figure 19G:
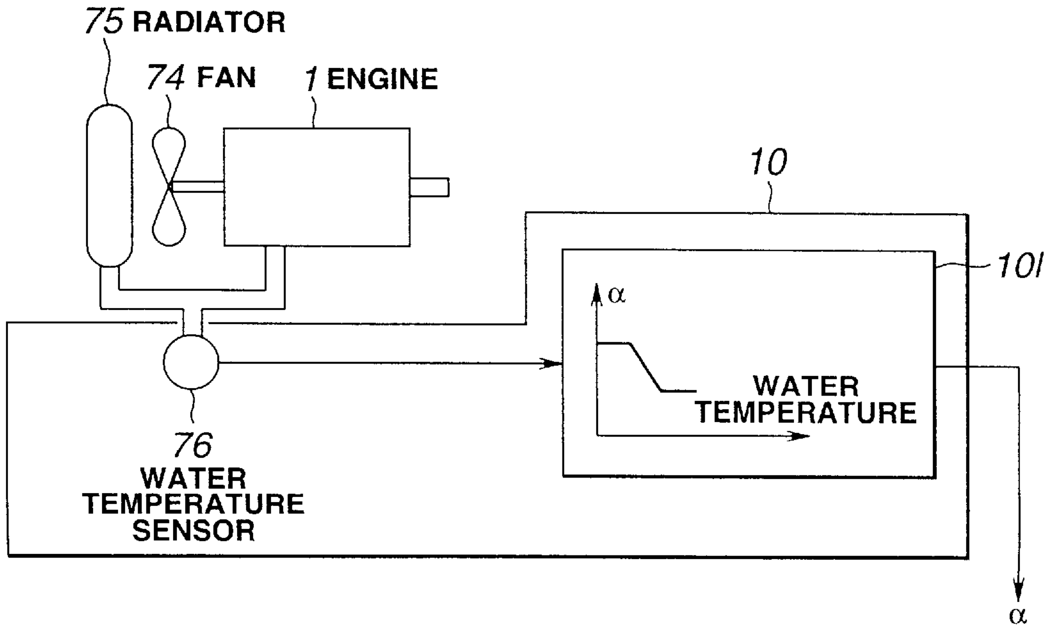

In this aspect of the embodiment of FIG. 16(*a*), in place of suppressing the arm flow control valve, an effect similar to the aspect of FIG. 15 is achieved by suppressing a pressure compensation valve 54 of the arm side, and adjusting a target differential pressure. In FIG. 16(*a*), a boom-up operation quantity (boom-up orifice command) of the boom operation lever 7 is treated as a quantity of state x, an arm pressure compensation valve 54 is established as the response suppression target apparatus.

The flow, which flows into a hydraulic actuator, as shown in the above-mentioned Formula (3), is proportional, respectively, to a control valve restrictor orifice size A determined in accordance with operator lever operation quantity, and the square root $\sqrt{\Delta P}$ of the difference in pressure before and after a restrictor of a control valve that the operator cannot control. Therefore, during rough combing work, hypothetically, even if the operator manipulated the levers so that the orifice size of the flow control valves 5, 6' of the boom and arm would become the same, when the arm load pressure PL is extremely lower than the boom load pressure, more pump discharge pressure oil flows to the arm side, and the bucket edge suddenly drops. This arm collapse phenomenon does not occur if arm pressure compensation is 100% effective, but, on the contrary, when arm pressure compensation is 100% effective, the locus of the bucket edge during combing work, when the levers that operate the boom and arm are manipulated through the full range of movement thereof, constitutes a circular arc shape, preventing the ground from being leveled horizontally. Consequently, in actuality, arm pressure compensation is slightly weakened, and set to load-bearing (so the bucket edge moves more horizontally without the bucket edge being raised off the ground by boom-up). In combing work, wherein the operation lever is operated slowly in the fine control region, since the hydraulic pump discharge quantity is sufficient for lever operation, there is no excessive influx of pressure oil to the arm side, and since the operator manually controls lever operation quantity to coincide with the movement of the bucket edge, no problems in particular arise even if pressure compensation is not fully effective. Accordingly, in FIG. 16(*a*), the above-mentioned problem is solved by making pressure compensation fully effective only at the start of rough combing work, wherein the operation lever is rapidly manipulated.

In the same FIG. 16(*a*), a load pressure extraction port is provided in flow control valves 5, 6', respectively, and in accordance therewith, the respective load pressures of hydraulic cylinders 3, 4' are detected. Pressure oil, which passes through a load pressure extraction port is transferred to a shuttle valve 56, and the pressure oil that exhibits the highest pressure of the respective load pressures of the hydraulic cylinders 3, 4', in other words, the maximum load pressure PLmax, is run off from the shuttle valve 56 to a maximum load pressure circuit (line) 60.

In general, in the pressure compensation valves 52–55, compensation pressure is moved so as to balance with (so as to become the same as) maximum load pressure PLmax by making the above-mentioned maximum load pressure PLmax act from one side (right side) via a maximum load pressure circuit 60, and making pressure (compensation pressure) between a flow control valve and a pressure compensation valve act from the opposite side (left side) via a compensation pressure circuit (line) 59.

The pressure compensation valve 54 of the arm excavation side, which is the response suppression target apparatus, constitutes a variable pressure compensation valve.

The above-mentioned maximum load pressure PLmax and spring force are applied from one side (right side) of the variable pressure compensation valve 54. Further, from the opposite side (left side) of the variable pressure compensation valve 54, the above-mentioned compensation pressure, and a pilot pressure, which is an adjustment pressure corresponding to a command current iy outputted from the response suppressing portion 11, are applied via an adjustment pressure circuit (line) 58. As described hereinbelow, a command current iy is generated from the response suppressing portion 11, and applied to a solenoid of an electromagnetic proportional control valve 57. In the electromagnetic proportional control valve 57, pilot pressure oil discharged from a pilot pump 18 is inputted, and the pilot pressure of this pilot pressure oil is reduced to an adjustment pressure corresponding to the command current iy, and applied to the left side of the variable pressure compensation valve 54.

Here, when the state is such that adjustment pressure outputted from the electromagnetic proportional control valve 57 is in balance with the spring force, the orifice of the variable pressure compensation valve 54 is balanced at a position, where a balance is achieved between to-be-compensated pressure (compensation pressure) between the arm control valve 6' and the pressure compensation valve 54, which acts from the left side, and maximum load pressure PLmax, which acts from the right side, and compensation pressure rises until the compensation pressure is the same pressure as maximum load pressure PLmax (in this case, load pressure PL of the boom-up side).

Accordingly, fore-aft differential pressure ΔP of the restrictor of the arm flow control valve 6' constitutes the differential pressure between hydraulic pump 2 discharge pressure PM and maximum load pressure PLmax, and in accordance therewith, the fore-aft differential pressure ΔP is compensated to a differential pressure that is the same as the fore-aft differential pressure of boom flow control valve 5, which constitutes the maximum load pressure PLmax. In other words, in accordance with the differential pressure ΔP becoming the same for the respective flow control valves 5, 6' in the above-mentioned Formula (3), a flow Q proportional to an operator-ordered operation quantity (orifice size A) can be supplied to the respective hydraulic cylinders 3, 4'.

Here, when the adjustment pressure outputted from the electromagnetic proportional control valve 57 becomes larger than the a state of balance with the spring force, the orifice quantity of the variable pressure compensation valve 54 becomes larger in accordance with the magnitude of this adjustment pressure, and the compensation pressure between the pressure compensation valve 54 and flow control valve 6' balances at a pressure that is lower than the maximum load pressure PLmax. As a result thereof, the fore-aft differential pressure ΔP of the arm flow control valve 6' becomes large, and the degree of pressure compensation becomes small. In other words, the arm operating velocity rises.

In a memory table 111 of the response suppressing portion 11, there is stored the corresponding relationship of y and iy, by which the command current iy to the electromagnetic proportional control valve 57 becomes smaller as the fluctuation component y becomes larger. Similar to FIG. 15(*c*), the fluctuation component y is obtained by making the control signal of the boom operation lever 7 the quantity of state x. Therefore, when a rapid boom-up operation is performed (when y is big), the command current iy read out from memory table 111 is small, and since the adjustment pressure that acts on the variable pressure compensation valve 54 becomes smaller than usual, the degree of pressure compensation in accordance with the variable pressure compensation valve 54 is increased. Conversely, in the case of normal operation, in which a rapid boom-up operation is not performed (when y is small), the command current iy read out from memory table 111 is large, and since the adjustment pressure that acts on the variable pressure compensation valve 54 becomes large, the degree of pressure compensation in accordance with the variable pressure compensation valve 54 is decreased.

As described above, when performing a normal boom-up operation, arm pressure compensation is slightly weakened, and arm pressure compensation is strengthened (the fore-aft differential pressure of the arm flow control valve 6' is reduced) only at the start of combing work when a rapid boom-up operation is performed, an excess of hydraulic pump discharge pressure oil flows to the arm side at the start of combing work, solving for the problem of the bucket edge suddenly collapsing.

The above-described arm collapse phenomenon at combing work occurs as a result of a drop in hydraulic pump discharge pressure (in some cases, dropping to less than the load pressure PL of the boom-up side). Therefore, in the quantity of state detecting portion 9, in place of detecting the operation quantity of the boom operation lever 7 as the quantity of state x, the combing work arm collapse phenomenon can be similarly done away with by detecting the differential pressure ΔP between the pump discharge pressure PM and the boom load pressure PL (or the maximum load pressure PLmax) as the quantity of state x.

In the quantity of state detecting portion 9 of FIG. 16(*b*), hydraulic pump 2 discharge pressure PM is detected by a pressure sensor 44*a,* and furthermore, the load pressure PL of the boom-up side is detected by a pressure sensor 61, and the differential pressure ΔP between the pump discharge pressure PM and the boom-up load pressure PL is detected as the quantity of state x.

The differential pressure ΔP-specifying quantity of state x is inputted into the response suppressing portion 11, and in this response suppressing portion 11, a fluctuation component y of the detection differential pressure x is outputted from a high-pass filter 11*b*. Here, in a memory table 11*m*, is stored the corresponding relationship of a fluctuation component y and a command current iy, wherein a command current iy to the electromagnetic proportional control valve 57 becomes smaller the more a fluctuation component y moves to the minus side (the differential pressure ΔP moves to the reduction side).

Accordingly, as the differential pressure ΔP between the pump discharge pressure PM and the boom-up load pressure PL increases, the adjustment pressure relative to the arm variable pressure compensation valve 54 increases, and in accordance therewith, the degree of arm pressure compensation is moderated. Conversely, as the above-mentioned differential pressure ΔP decreases, the adjustment pressure relative to the variable pressure compensation valve 54 decreases, and in accordance therewith, the degree of arm pressure compensation is strengthened.

By so doing, because the degree of arm pressure compensation (influx quantity of pressure oil to the arm) is suppressed so that the differential pressure ΔP between the pump discharge pressure PM and load pressure PL of the boom-up side becomes constant, the collapse of the bucket edge at the start of rough combing work is prevented.

In this aspect of the embodiment shown in FIG. 16(*b*), the degree of pressure compensation of the arm excavation side is changed in accordance with a change in the differential pressure ΔP between the pump discharge pressure PM and the boom-up load pressure PL, and in a state, wherein the arm is not being used for excavation (state in which pressure oil does not flow into the arm excavation side), others are not affected even when the pressure compensation of the arm excavation side is adjusted. Further, in a state, wherein the boom is not being raised, the fluctuation component of the boom-up side differential pressure ΔP becomes zero. Accordingly, there is an action, which performs control, which suppresses the degree of arm pressure compensation only when a boom-up operation, and an arm excavation operation are performed at the same time.

Further, the response suppressing portion 11 shown in FIG. 16(*b*) can also be constituted as shown in FIG. 16(*c*). In FIG. 16(*c*), similar to FIG. 14(*b*) described above, in place of the above-mentioned high-pass filter 11*b,* there is provided a (target differential pressure is ΔP) function table 11*n,* which changes so that a value of the command current iy becomes larger as the differential pressure x (ΔP) becomes larger, and a command current iy corresponding to a quantity of state x is read out from this function table 11*n,* this read-out command current iy is outputted to an electromagnetic proportional control valve 57, and the differential pressure ΔP is made to coincide with the target differential pressure ΔP. In this aspect of the embodiment, a command current iy relative to the electromagnetic proportional control valve 57 can be obtained directly from the differential pressure x (ΔP), without computing the fluctuation component y of the differential pressure x (ΔP) in accordance with a high-pass filter 11*b*.

Furthermore, in FIG. 16, the description assumed a hydraulic circuit, which was provided with pressure compensation valves 52–55 between the hydraulic cylinders 3, 4' and flow control valves 5, 6', but the aspect of the embodiment can be similarly applied to a hydraulic circuit equipped with pressure compensation valves 52–55 between the flow control valves 5, 6' and the hydraulic pump 2.

Further, the aspect was described with the objective of setting the locus of the bucket edge to a desired locus at rough combing work, but it is also possible to have an embodiment for other work, for example, an embodiment, which suppresses the degree of pressure compensation on the rotation side in accordance with either the boom-up side operation quantity of the boom operation lever 7, or the differential pressure ΔP between the pump discharge pressure PM and load pressure PL of the boom-up side, with the objective of setting to a desired locus the rising locus of the bucket edge at the start of rotation, which occurs at hoist rotation work in accordance with full lever boom-up and rotation operations.

For example, when raising the bucket from beneath ground level while simultaneously performing a boom-up operation and a rapid rotation operation, by changing the adjustment pressure to the variable pressure compensation valve provided on the rotation side, and suppressing the acceleration of the revolving superstructure (or promoting the influx of pressure oil to the boom), the rotation operation does not commence until the boom has been raised higher. In accordance therewith, the bucket does not collide with the excavated sides even when the levers are manipulated in a rough manner, and hoist rotation can be performed safely.

Next, an aspect of the embodiment, which enables the same effect to be achieved in the quantity of state detecting portion 9 by detecting the flow of pressure oil flowing into a hydraulic actuator as the quantity of state x instead of the above-mentioned differential pressure ΔP will be described with reference to FIG. 17.

In the aspect of the embodiment shown in FIG. 17(*a*), there is provided a stroke sensor 62, which detects the stroke length L of an arm hydraulic cylinder 4'. The detected stroke length L of this stroke sensor 62 is inputted to the quantity of state detecting portion 9, and the differential value dL/dt of this stroke length L is computed in a differential computing portion 9*d*. In a selecting portion 9*e*, this differential value dL/dt (+) is selected when the differential value dL/dt is a positive value, in other words, only when the arm is moved in the excavation direction. And then, by multiplying in a multiplying portion 9*f* the bottom side cross-sectional area Sb of the hydraulic cylinder 4' by the positive differential value dL/dt (+) selected by this selecting portion 9*e*, the pressure oil flow Sb·dL/dt (+) to the arm excavation side (flow that flows into the bottom side of the arm hydraulic cylinder 4' per unit time) is detected as the quantity of state x, and outputted to the response suppressing portion 11.

In the response suppressing portion 11, a fluctuation component y of the quantity of state x is obtained via a high-pass filter 11*b*. In a memory table 111 of the response suppressing portion 11, there is stored the corresponding relationship between a fluctuation component y and a command current iy, similar to FIG. 16(*a*). The fluctuation component y of the quantity of state x constitutes zero when the arm is in a static state, or while the arm is operating at a constant velocity, and furthermore, takes a large value when the arm suddenly accelerates (drops) in the excavation side as at the start of rough combing work.

Accordingly, in accordance with the adjustment pressure to the variable pressure compensation valve 54 becoming smaller as the fluctuation component y becomes larger at the start of rough combing work, the degree of pressure compensation becomes stronger, and the influx of excessive pressure oil to the arm side is prevented.

Furthermore, as shown in FIG. 17(*b*), a suppression quantity specifying portion 10 can be provided, and the suppression quantity can be changed in accordance with a detected stroke length signal L of the cylinder stroke sensor 62.

The detected stroke length signal L of the cylinder stroke sensor 62 is inputted to the suppression quantity specifying portion 10 shown in FIG. 17(*b*). In memory table 10*c*, there is stored the corresponding relationship, wherein the frequency threshold value change coefficient α (0<α<1, refer to Formula (1)) of the high-pass filter 11*b* becomes smaller as the stroke length L becomes larger, in other words, a corresponding relationship, wherein the fluctuation component y becomes smaller the more the arm is operated on the excavation side. A frequency threshold value change coefficient α corresponding to a detected stroke length L is obtained from memory table 10*c*, and inputted to the response suppressing portion 11. In the response suppressing portion 11, a command current iy is outputted to the electromagnetic proportional control valve 57 via the high-pass filter 11*b*, and memory table 11*o*, which is the same as memory table 111.

Rough combing work constitutes movement, wherein the rod of the arm hydraulic cylinder 4' is fully extended, and the arm is retracted toward the equipment (large detected stroke length L) from a state, in which the rod of the arm hydraulic cylinder 4' was fully contracted, and the arm was fully extended (small detected stroke length L). Accordingly, by the frequency threshold value change coefficient α constituting 1 at the start of combing work, when the cylinder stroke length L is small, a large suppression quantity is achieved, and furthermore, by the frequency threshold value change coefficient α approaching 0 as the cylinder stroke length L becomes larger, a small suppression quantity (fluctuation component y constitutes a mere noise level high frequency component) is achieved, and a large suppression effect is achieved only when needed at the start of rough combing work.

Furthermore, as shown in FIG. 17(*c*), in the suppression quantity specifying portion 10, the suppression quantity can be changed in accordance with the load pressure PL of the arm excavation side.

In the same FIG. 17(*c*), there is provided a pressure sensor 12', which detects the load pressure PL of the bottom side (arm excavation side) of the arm hydraulic cylinder 4'. An arm excavation load pressure signal PL detected by the pressure sensor 12' is inputted to the suppression quantity specifying portion 10. In memory table 10*d*, there is stored the corresponding relationship, wherein the frequency threshold value change coefficient α (0<α<1, refer to Formula (1)) of the high-pass filter 11*b* becomes smaller as the load pressure PL becomes larger, in other words, a corresponding relationship, wherein the fluctuation component y becomes smaller as the arm excavation side load pressure PL becomes larger. A frequency threshold value change coefficient α corresponding to a detected load pressure PL is obtained from memory table 10*d*, and inputted to the response suppressing portion 11. In the response suppressing portion 11, a command current iy is outputted to the electromagnetic proportional control valve 57 via the high-pass filter 11*b*, and memory table 11*o*, which is the same as memory table 111.

The reason the locus of the bucket edge shifts from the desired locus in rough combing work is because, in accordance with the rapid operation of the arm operation lever 8' from a state, in which load was not being applied to the arm hydraulic cylinder 4', the arm suddenly drops of its own weight. Whereas arm bottom pressure is around 200 $kg/cm^2$ during normal excavation work, it constitutes a low pressure of around 0–50 $kg/cm^2$ in the state of the start of combing work, when the arm drops of its own weight.

Accordingly, by the frequency threshold value change coefficient α constituting 1 at the start of combing work, when the arm excavation load pressure PL is small, a large suppression quantity is achieved, and furthermore, by the frequency threshold value change coefficient α approaching 0 as the arm excavation load pressure PL becomes larger, a small suppression quantity (fluctuation component y constitutes a mere noise level high frequency component) is achieved, and a large suppression effect is achieved only when needed at the start of rough combing work.

Further, when the arm suddenly drops at the start of combing work, practically all of the hydraulic pump 2 discharge pressure oil is drawn into the arm side alone, hindering the flow of pressure oil to other hydraulic actuators, for example, to the boom-up side of the boom during simultaneous operation. The hydraulic pump 2 discharge pressure itself also decreases at this time, and in certain cases, becomes less than boom-up retaining pressure. Accordingly, the start of combing work can be detected in accordance with detecting the decrease in either the hydraulic pump 2 discharge pressure PM, or the differential pressure ΔP between the this pump discharge pressure PM, and the load pressure PL of the hydraulic actuator.

In the same FIG. 17(*d*), the detected pump discharge pressure PM of pressure sensor 44*a,* and the detected maximum load pressure PLmax of pressure sensor 44*b* (constitutes the load pressure PL of the boom-up side at rough combing work) are inputted to the suppression quantity specifying portion 10, and a minimum differential pressure ΔP, which is the differential pressure thereof, is obtained. In memory table 10 *e,* there is stored a corresponding relationship, wherein the frequency threshold value change coefficient α ($0<\alpha<1$, refer to Formula (1)) of the high-pass filter 11*b* becomes smaller as the minimum differential pressure ΔP becomes larger, in other words, a corresponding relationship, wherein the fluctuation component y becomes smaller as the minimum differential pressure ΔP becomes larger. A frequency threshold value change coefficient α corresponding to the current minimum differential pressure ΔP is obtained from memory table 10 *e,* and inputted to the response suppressing portion 11. In the response suppressing portion 11, a command current iy is outputted to the electromagnetic proportional control valve 57 the same as in the response suppressing portion 11 of either FIG. 17(*a*), or (*b*), (*c*).

Accordingly, by the frequency threshold value change coefficient α constituting 1 at the start of combing work, when hydraulic pump 2 discharge pressure oil flows in excess into a specific hydraulic actuator (arm hydraulic cylinder 4'), and the minimum differential pressure ΔP (between the pump discharge pressure and the maximum load pressure) decreases, a large suppression quantity is achieved. In other words, the fluctuation component y becomes larger, and the command to the pressure compensation valve 54 is compensated in the direction, in which the influx of excessive pressure oil into a specific hydraulic actuator (arm hydraulic cylinder 4') is suppressed. Conversely, by the frequency threshold value change coefficient α approaching 0 as the minimum differential pressure ΔP becomes larger, a small suppression quantity (fluctuation component y constitutes a mere noise level high frequency component) is achieved, and a large suppression effect is achieved only when needed at the start of rough combing work.

Furthermore, in place of using the pressure compensation valve 54 to prevent the influx of excess pressure oil into the arm side in the constitutions shown in FIG. 17(*a*)–(*d*), as described in FIG. 15(*c*)–(*e*), the influx of excess pressure oil into the arm side can also be prevented in accordance with throttling the orifice of the arm flow control valve 6'.

Next, an aspect of the embodiment, which treats an engine 1 as the response suppression target apparatus, and suppresses the response of engine speed is described with reference to FIG. 18.

A swash plate command (displacement) q for the hydraulic pump 2 is inputted as the quantity of state x to the same response suppressing portion 11 of the FIG. 18(*a*). Meanwhile, the target speed of the engine 1 is set by a speed setting dial 63, and the engine target speed set by this speed setting dial 63 is inputted to the response suppressing portion 11 as a speed command r.

In a high-pass filter 11*b* of the response suppressing portion 11, a fluctuation component y of the pump swash plate command x is computed. And then, this fluctuation component y of the pump swash plate command x is added to the above-mentioned speed command r, and the result thereof is outputted to a governor controlling portion 64 as a compensated speed command r'.

The governor controlling portion 64 is a controller, which drives and controls a fuel governor 65, and, by using the governor drive position as a feedback signal, outputs a drive control signal to an electromagnetic solenoid, which drives the fuel governor 65, so that a compensated speed command r', which is the target value, is achieved, and performs control so that the speed of the engine 1 constitutes a number of revolutions that accord with the compensated speed command r'. Furthermore, the drive position of the fuel governor 65 is detected as the output voltage of a potentiometer.

In this case, the engine speed command r is increased in accordance with the fluctuation component y of a pump swash plate command x.

Here, when the hydraulic pump 2 discharge quantity suddenly increases, the load on the engine 1 increases, and engine speed drops, and furthermore, when the hydraulic pump 2 discharge quantity suddenly decreases, the load on the engine 1 is reduced, and engine speed rapidly rises. However, the results of performing the control shown in FIG. 18(*a*) are that the engine speed command r automatically increases in accordance with the hydraulic pump 2 discharge quantity q prior to engine speed dropping, and the drop in engine speed resulting from a load increase is suppressed, and furthermore, the engine speed command r automatically decreases in accordance with the hydraulic pump 2 discharge quantity q prior to engine speed rising, and the rise in engine speed resulting from a load reduction is suppressed. Further, since a command r is compensated so as to suppress a sudden rise or drop in engine speed, there is also achieved an effect, by which it is possible to prevent the black engine exhaust smoke generated by sudden changes in the speed of conventional engines.

In the aspect of the embodiment shown in FIG. 18(*a*), the swash plate command q for the hydraulic pump 2 is treated as the quantity of state x, but as shown in FIG. 18(*b*), a swash plate position sensor 66, which detects the position (swash plate inclined rotation angle) of the swash plate 2*a* of the hydraulic pump 2, can be provided, and a detected swash plate position of this swash plate position sensor 66 can be used as the quantity of state x.

In the aspect of the embodiment shown in FIG. 18(*b*), because an actual swash plate position rather than a swash plate command is detected as the quantity of state x, control for increasing and decreasing engine speed becomes slightly delayed, but drop and rise changes in engine speed are suppressed the same as in the aspect of the embodiment shown in FIG. 18(*a*).

Further, as shown in FIG. 18(*c*), the torque T (hydraulic pump 2 absorbed torque T), which acts on the hydraulic pump 2, can also be used as the quantity of state x.

In the aspect of the embodiment shown in FIG. 18(*c*), pump discharge pressure PM, detected by a pump discharge pressure sensor 44*a,* and the swash plate position q, that is, the pump displacement q (cc/rev) detected by a swash plate position sensor 66, are multiplied in a multiplying portion 67, and the torque T(=PM×q), which acts on the hydraulic pump 2, is obtained as the product thereof. And then, by using this pump absorbed torque T as a quantity of state x, a fluctuation component y is obtained in the response suppressing portion 11.

As a result thereof, the same as the aspects of the embodiment shown in FIGS. 18(*a*), (*b*), the drop in engine speed when the absorbed torque T of the hydraulic pump 2 suddenly increases is reduced by an increase in the engine speed command r, and furthermore, the rise in engine speed when the absorbed torque T of the hydraulic pump 2 suddenly decreases is reduced by a decrease in the engine speed command r. In other words, engine speed fluctuations are suppressed. In this aspect of the embodiment, rather than detecting engine speed, control is performed to suppress changes in engine speed.

In the aspect of the embodiment shown in FIG. 18(*d*), there is shown an aspect, which suppresses a change in engine speed by using the deviation between engine 1 target speed r and actual engine speed Ne as the quantity of state x.

That is, in the aspect of the embodiment shown in FIG. 18(*d*), a rotation pulse sensor 68 is provided as a speed sensor, which detects the actual number of revolutions Ne of the engine 1. The detection signal of the rotation pulse sensor 68 is extracted via an F/V converter 69 as the actual engine speed Ne, and the deviation between engine target speed r, and actual engine speed Ne is determined in a quantity of state detecting portion 9, and the speed deviation thereof is detected as the quantity of state x.

Thereafter, the same control as that of FIG. 18(*a*) is performed, and changes in engine speed are suppressed.

Furthermore, in the above-described aspect of the embodiment, the assumption is a case, wherein the engine target speed command r changes, but when engine target speed is constant, the actual engine speed Ne can also be used as a quantity of state x.

Next, an aspect of the embodiment shown in FIG. 18(*e*) will be described.

A variety of attachments can be mounted at the end of the arm of a hydraulic shovel. Among the attachments, there are those which require that a constant flow be discharged at all times from the hydraulic pump 2. For example, for a hydraulic shovel of lifting magnet specifications, a magnetic magnet can be mounted as an attachment. In this case, a hydraulic motor for the end attachment is rotated by pressure oil discharged from the hydraulic pump 2, and by converting rotations to electricity, an attraction force is generated by the magnetic magnet. In accordance therewith, it is possible to attract and gather together only the metallic parts from among industrial waste. In such a lifting magnet specification vehicle, when the discharge flow of the hydraulic pump 2 fluctuates, the voltage (or current) generated in accordance with the above-mentioned hydraulic motor fluctuates, causing a drop in the attraction force of the magnetic magnet. Consequently, there is the danger that the parts being suspended by the magnetic magnet will fall.

Further, even when a breaker is mounted as an attachment, there is a need to maintain a constant striking force, and to enhance work efficiency by supplying a constant flow from the hydraulic pump 2 at all times.

In this aspect of the embodiment, a change in the discharge flow of the hydraulic pump 2 is suppressed in accordance with making the engine 1 and the hydraulic pump 2 the response suppression target apparatus, and implementing control, which is tailored to the individual response characteristics of these hydraulic apparatus.

In the aspect of the embodiment shown in FIG. 18(*e*), pump displacement q (cc/rev), which is the swash plate position, is detected by a swash plate position sensor 66, and furthermore, a detection signal of a rotation pulse sensor 68 is extracted via an F/V converter 69 as the actual engine speed Ne (rev/min). By multiplying the pump displacement q (cc/rev) and actual engine speed Ne (rev/min) thereof in a multiplying portion 70 in the quantity of state detecting portion 9, an actual discharge flow QM (cc/min) of the hydraulic pump 2 is detected as the quantity of state x. Subsequently, a fluctuation component y1 of the quantity of state QM is computed in accordance with the high-pass filter 11*b*1, and subtracted from an engine target speed command r1. Then, the compensated target speed command r1' thereof is outputted to a governor controlling portion 64, and the drive position of a fuel governor 65 is controlled the same as in FIG. 18(*a*).

In the meantime, a fluctuation component y2 of the quantity of state QM is computed in accordance with the high-pass filter 11*b*2, and subtracted from a pump flow command r2. Then, the compensated flow command r2' thereof is outputted to a swash plate drive mechanism 13, and the hydraulic pump 2 swash plate 2*a* is controlled.

Here, the frequency threshold values fc of the 2 high-pass filters 11*b*1, 11*b*2 of the response suppressing portion 11 are different. In high-pass filter 11*b*1, a lower frequency threshold value fc is set, and in high-pass filter 11*b*2, a higher frequency threshold value fc is set. In general, since the responsiveness of the hydraulic pump 2 is higher than the responsiveness of the engine 1, in accordance with a fluctuation of engine 1 speed being suppressed by a low frequency domain fluctuation component y1, and furthermore, a fluctuation of the hydraulic pump 2 swash plate being suppressed by a high frequency domain fluctuation component y2, a fluctuation of engine 1 speed is suppressed so that a slow flow change is prevented, and a hydraulic pump 2 swash plate 2*a* fluctuation (a fluctuation of the per-revolution discharge quantity q) is suppressed so that a more rapid, minute flow change is prevented.

As a result thereof, the suppression of a sudden flow change not possible with engine 1 control is performed on the hydraulic pump 2 side, and by controlling the hydraulic pump 2, a situation in which the hydraulic pump 2 exceeds range of motion thereof, and steadily becomes shifted as-is from the original swash plate command r is prevented.

Furthermore, in the aspect of the embodiment shown in FIG. 18(*e*), in place of detecting the pump discharge flow QM as the quantity of state x, the rotating speed of the hydraulic motor for the lifting magnet, and the generated voltage of the lifting magnet can be detected as the quantity of state x.

Next, an aspect of the embodiment, which, when suppressing a fluctuation in engine speed, changes the suppression quantity in accordance with an operation quantity of a travel pedal will be described with reference to FIG. 19.

In the suppression quantity specifying portion 10 shown in FIG. 19(*a*), there is established a memory table 10*f,* wherein a frequency threshold value change coefficient α becomes larger (a high frequency component comprising a lower frequency is extracted) as the absolute value of an operation quantity (actuating quantity) of a travel pedal 71, which controls the operation of the undercarriage, becomes larger, and furthermore, a frequency threshold value change coefficient α becomes smaller (only a noise level high frequency component is extracted) the closer the travel pedal 71 gets to the neutral position. And then, a frequency threshold value change coefficient α corresponding to the current operation quantity of the travel pedal 71 is read out from the memory table 10*f*, and outputted to a response suppressing portion 11. In accordance therewith, by α becoming larger as the travel pedal 71 operation quantity becomes larger, the suppression quantity of an engine speed fluctuation becomes larger.

As a result thereof, control, which is linked to the operation of a specific hydraulic actuator (travel motor) is performed, so that an engine speed fluctuation is suppressed only during traveling, when load fluctuation is generally large, and furthermore, an engine speed fluctuation is not suppressed during normal work (other than traveling), when load fluctuation is small.

Now then, even in the same travel operation, a greater load is applied when climbing a slope than when traveling over flat ground, and it is necessary to further suppress engine speed fluctuation by the quantity thereof. Accordingly, as shown in FIG. 19(*b*), it is possible to establish in the suppression quantity specifying portion 10 a memory table, wherein a frequency threshold value change coefficient α becomes larger (a high frequency component comprising a lower frequency is extracted) as the absolute value of an angle of inclination θ of a vehicle 99 becomes larger, and furthermore, a frequency threshold value change coefficient α becomes smaller (only a noise level high frequency component is extracted) the closer the vehicle 99 angle of inclination θ gets to zero (horizontal).

Further, in the aspect of the embodiment shown in FIG. 19(*c*), there is provided a work mode switch 72, which selects control in accordance with the type of work. Further, a frequency threshold value change coefficient α of a value (0.9, 0.6, 0.4), which differs for each work mode M1, M2, M3 selected by the work mode switch 72 is stored in a memory table 10 *h*. Accordingly, by reading out from the memory table 10 *h* in the suppression quantity specifying portion 10 a frequency threshold value change coefficient α corresponding to the content (M1, M2, M3) of a switch signal M switch-selected by the work mode switch 72, and outputting same to a response suppressing portion 11, the suppression quantity is changed. According to this aspect of the embodiment, an engine speed fluctuation suppression quantity can be set to an optimal value that accords with a type of work.

Further, as shown in FIG. 19(*d*), the suppression quantity can also be changed in accordance with the magnitude of a swash plate command qr (or an actual swash plate position q).

In the aspect of the embodiment shown in the same FIG. 19(*d*), there is provided in the suppression quantity specifying portion 10 a memory table 10*i* of a corresponding relationship, wherein a frequency threshold value change coefficient α becomes larger as a swash plate command qr becomes larger. Accordingly, by reading out from the memory table 10 *i* in the suppression quantity specifying portion 10 a frequency threshold value change coefficient α corresponding to the current swash plate command qr, and outputting same to the response suppressing portion 11, the suppression quantity is changed. However, a delay element 11*p* is applied to a subsequent stage of the high-pass filter 11*b* of the response suppressing portion 11, and a fluctuation component y in line with a time delay is subtracted from a command r.

According to this aspect of the embodiment, because an engine speed fluctuation suppression quantity becomes larger by a frequency threshold value change coefficient α becoming larger in accordance with an increase of a swash plate command qr, engine speed fluctuation is largely suppressed at swash plate 2*a* rise, and when the swash plate 2*a* is positioned close to the maximum position MAX side, and furthermore, engine speed fluctuation suppression quantity becomes small at swash plate 2*a* return, and when the swash plate 2*a* is positioned close to the minimum value MIN side. Consequently, engine speed fluctuation is suppressed, for example, only when engine speed drops, or when engine speed rises, improving workability.

Further, when the pump discharge flow requirement suddenly increases, and the swash plate 2*a* reaches the maximum value MAX position, in other words, in a state, wherein no greater flow can be discharged from the hydraulic pump 2, since the engine speed command r rises further in accordance with a change in the quantity of state, it is possible to sensibly match the requirement of the operator to further accelerate the hydraulic actuator.

Further, since a fluctuation component y pursuant to a time delay in accordance with delay element lip is subtracted from an engine target speed command r, engine speed fluctuation is suppressed once load becomes excessive, and engine speed drops. Consequently, an operator can perceive the fact that load is excessive, and information concerning the magnitude of this load, from the change in engine sound when engine speed transitions from a dropping state to a rising state. And since engine revolutions automatically rise when load is applied, there is also achieved an effect, by which the operator feels the power of the engine.

Furthermore, the same function as that of the delay element 11*p* can be provided by setting the frequency threshold value fc of the fluctuation component y low. Further, the same function as that of the delay element 11*p* can be provided in accordance with the manner in which the frequency threshold value change coefficient α is set.

Further, as shown in FIG. 19(*e*), in place of a swash plate command qr, hydraulic pump 2 absorbed torque T can be used, and suppression quantity can be changed in accordance with magnitude of the absorbed torque T thereof.

In the aspect of the embodiment shown in the same FIG. 19(*e*), there is provided in the suppression quantity specifying portion 10 a memory table 10*j* of a corresponding relationship, wherein a frequency threshold value change coefficient α becomes larger as hydraulic pump 2 absorbed torque T becomes larger. Pump absorbed torque T (=PM·q) is obtained by multiplying the detection discharge pressure of a pump discharge pressure sensor 44*a* by the detection swash plate position q of a swash plate position sensor 66 in a multiplying portion 73 in the suppression quantity specifying portion 10. And then, a suppression quantity is changed by reading out from memory table 10*j* a frequency threshold value change coefficient α corresponding to the obtained pump absorbed torque T thereof, and outputting same to the response suppressing portion 11. As a result thereof, the same effect as the aspect of the embodiment of FIG. 19(*d*) is achieved.

Further, as shown in FIG. 19(*f*), a suppression quantity can also be changed in accordance with the magnitude of the deviation between engine target speed, and actual speed.

In the aspect of the embodiment shown in the same FIG. 19(*f*), there is provided in a suppression quantity specifying portion 10 a memory table 10*k* of a corresponding relationship, wherein a frequency threshold value change coefficient α becomes larger as the absolute value of the deviation between engine target speed and actual speed becomes larger, and furthermore, a frequency threshold value change coefficient α approaches the minimum value as the same deviation approaches zero. In the suppression quantity specifying portion 10, the deviation between an engine target speed set by a speed setting dial 63, and the actual engine speed extracted via a rotation pulse sensor 68 and F/V converter 69 is obtained. And then, a suppression quantity is changed by reading out from memory table **10*k* a frequency threshold value change coefficient α corresponding to the obtained speed deviation thereof, and outputting same to a response suppressing portion 11**.

In this manner, engine speed fluctuation suppression quantity becomes smaller by the frequency threshold value change coefficient α becoming smaller as the speed deviation approaches zero, and furthermore, engine speed fluctuation suppression quantity becomes larger by the frequency threshold value change coefficient α becoming larger as the absolute value of speed deviation becomes larger. Consequently, in accordance with engine speed fluctuation being suppressed when the actual engine speed is close to the target speed, it is possible to prevent the hunting phenomenon, by which engine speed repeatedly drops and rises in the vicinity of the target speed. In other words, the hunting phenomenon is prevented by making the speed domain, wherein the actual engine speed is in the vicinity of the target speed, a dead zone of fluctuation suppression control. Conversely, when the speed deviation is large, it becomes possible to obtain a sufficiently large value equivalent to suppression control gain (either the size of the quantity of state x, or the value of a fluctuation component y extracted in accordance with a frequency threshold value fc).

Now then, in general, in cold areas, when an engine 1 is not sufficiently warmed up, the number of revolutions drop greatly when a sudden load is applied to the engine 1, causing the engine to stall in some cases. The aspect of the embodiment shown in FIG. 19(*g*) is an aspect, which makes it possible to prevent engine stall immediately after startup in cold areas.

In the aspect of the embodiment shown in FIG. 19(*g*), there is provided a water temperature sensor 76 for detecting the temperature of the cooling water of the engine 1. Element 75 is a radiator, and element 74 is a cooling fan for blowing air on the radiator 75. And then there is provided a memory table 101 of a corresponding relationship, wherein a frequency threshold value change coefficient α becomes larger as the cooling water temperature becomes lower. A suppression quantity is changed by reading out from the memory table 101 in the suppression quantity specifying portion 10 a frequency threshold value change coefficient α corresponding to the water temperature detected by the water temperature sensor 76.

Thus, according to the above-described aspect of the embodiment, by the frequency threshold value change coefficient α becoming larger when the engine 1 cooling water temperature is a low temperature (a state, wherein there is not sufficient warm air immediately following startup), the engine speed fluctuation suppression quantity becomes large, and even if there is a slight fluctuation in engine speed, torque, the engine target speed command r is compensated in a large way in the direction, which suppresses the change thereof, making it possible to prevent the occurrence of engine stall immediately after engine startup.

Furthermore, in the aspect of the embodiment shown in FIG. 19(*g*), the engine 1 cooling water temperature is detected, but in place thereof, the oil temperature of the working oil of a hydraulic actuator, and the outside temperature can also be detected.

Further, in the aspects of the embodiment shown in FIG. 18, FIG. 19, either the engine 1 or the hydraulic pump 2 are treated as the response suppression target apparatus, and either the engine target speed factor in a direction that suppresses engine speed fluctuation, or a swash plate command relative to the hydraulic pump 2 is compensated, but it is also possible to compensate either a swash plate command relative to the hydraulic pump 2 in a direction that suppresses a sudden rise of hydraulic pump 2 absorbed torque, or a command relative to an unloading valve, bleed valve, which unloads load to a tank.

Example constitutions of a suppression quantity specifying portion 10 are also described with reference to FIG. 20, FIG. 21.

An object of the aspect of the embodiment described hereinbelow is to enable the continued performance of work by sharply suppressing the responsiveness of a response suppression target apparatus in accordance with the inputting as data of an abnormality such as a vehicle malfunction, and with data indicating an abnormality.

That is, in the past, when a malfunction occurred in a vehicle-mounted sensor, or when the engine 1 overheated, an error would be displayed on a monitor inside the operator cab, for example, and the vehicle would be automatically shut down until recovery to a normal state. Furthermore, there are also cases, wherein only a warning is generated without automatically shutting down the vehicle.

Consequently, when an abnormality occurred, work was completely suspended, causing a marked loss of work efficiency. Further, there was also the problem that work was not suspended, but rather was continued in a dangerous state, in which a warning had been generated.

Accordingly, when a malfunction or other abnormality occurs, the above-mentioned problem is solved for by suppressing the responsiveness of a specific hydraulic apparatus so that work can only be carried out slowly.

Figure 20A:
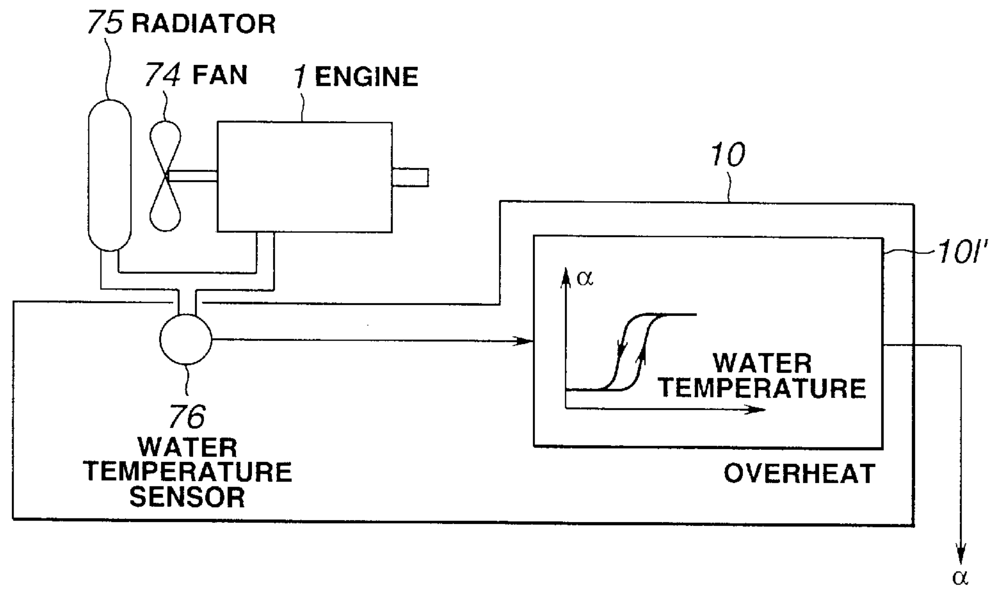
FIGS. 20(*a*)–(*c*) are diagrams showing various aspects for changing the suppression quantity of a response in accordance with data indicating an abnormality.
Figure 20B:
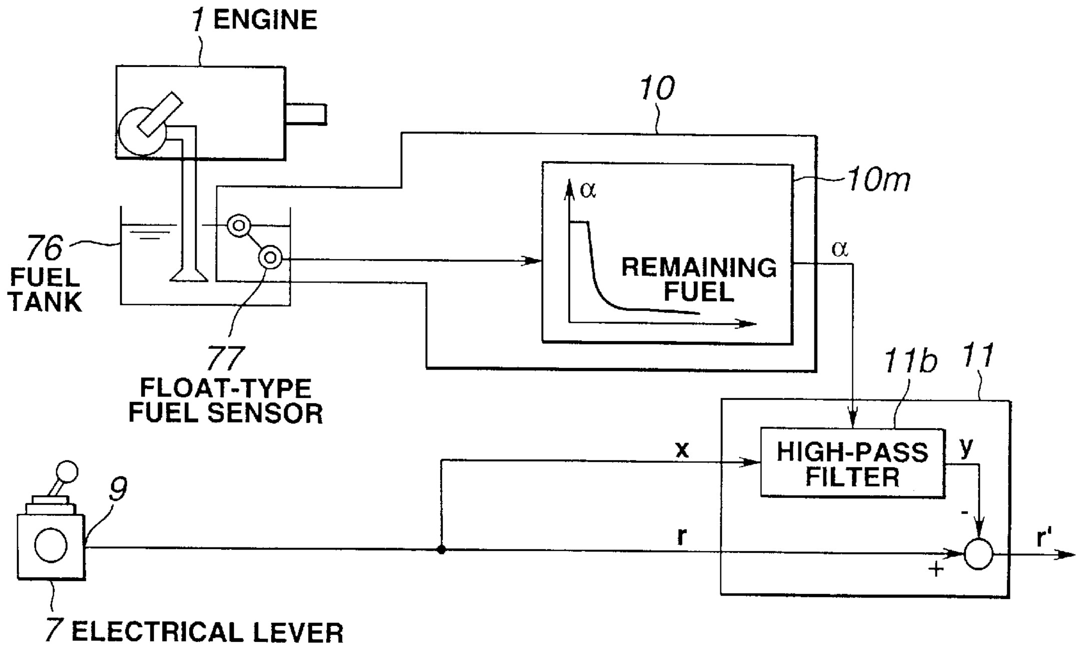
Figure 20C:
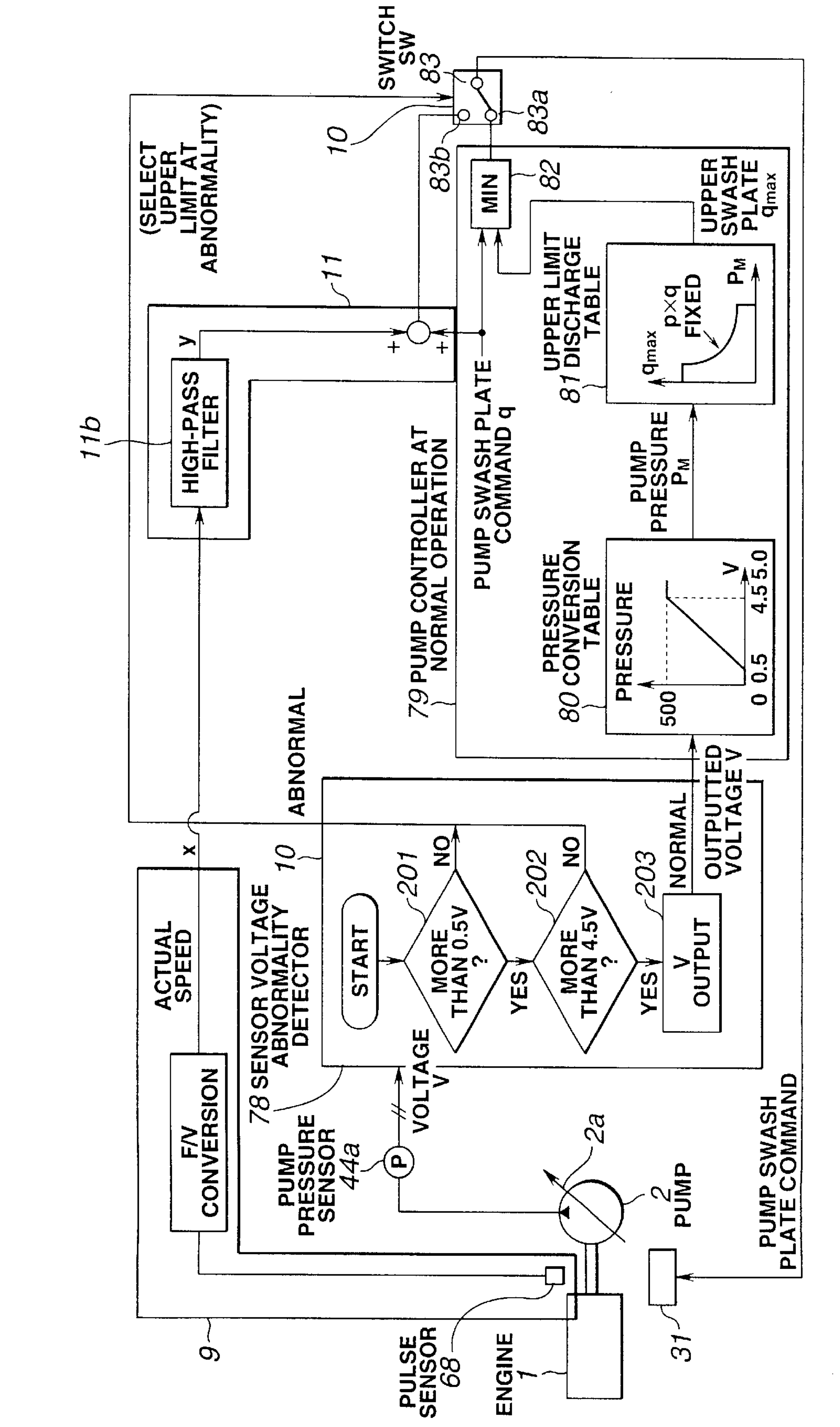

In the aspect of the embodiment shown in FIG. 20(*a*), an engine 1 overheating abnormality is detected in accordance with a water temperature sensor 76. Then there is provided a memory table 101' of a corresponding relationship, wherein a frequency threshold value change coefficient α becomes larger as the cooling water temperature increases. A suppression quantity is changed by reading out from the memory table 101' in the suppression quantity specifying portion 10 a frequency threshold value change coefficient α corresponding to the water temperature detected by the water temperature sensor 76. The response suppression target apparatus in the case thereof is an operation lever (for example, the boom operation lever 7), and the quantity of state x is the operation quantity of the operation lever. Accordingly, a fluctuation component y of operation quantity x, which passed through high-pass filter **11*b*, is subtracted from operation quantity r of the operation lever 7, which is an electrical lever, and the result thereof is outputted as a compensated operation quantity r'. The orifice of a flow control valve 5 is changed in accordance with the compensated operation quantity r' thereof, and the boom is operated by the boom hydraulic cylinder 3 being driven (Refer to FIG. 20**(*b*)).

Thus, according to the above-described aspect of the embodiment, by the frequency threshold value change coefficient α becoming larger when the engine 1 cooling water temperature is high temperature (either a state, wherein overheating occurred, or a state, wherein there is the danger that overheating will occur), the operation lever 7 control fluctuation suppression quantity becomes larger so that work can only be carried out slowly when the temperature is high.

As a result thereof, the calorific value of the engine 1 is reduced in accordance with operation being carried out slowly, and since the engine speed continues at high, cooling in accordance with the fan 74, radiator 75 progresses, and recovery from an overheated state to a normal state is achieved. Conversely, when recovery from an overheated state to a normal state is achieved (when the engine 1 cooling water temperature is a low temperature), the operation lever 7 fluctuation suppression quantity becomes smaller by the frequency threshold value change coefficient α becoming smaller, enabling normal work in accordance with operation lever 7 operation.

Furthermore, hysteresis at water temperature rise and fall can be provided in the corresponding relationship of water temperature and a stored in the memory table 101'. The value of the frequency threshold value change coefficient α can be set higher when the water temperature is falling than when water temperature is rising.

Now then, the remaining quantity of engine 1 fuel can normally be checked on a monitor panel or other graduated display. However, during continuous work, there are cases in which the operator does not notice that the remaining quantity of fuel has become zero. For a diesel engine, once fuel is gone, and the engine 1 stops, air gets into the fuel pump line, making restarting difficult. Further, problems also arise when the boom or other work machine stops in a dangerous raised position, or when the equipment cannot make it to a refueling site on its own power.

Accordingly, in FIG. 20(*b*), when the remaining fuel of the engine 1 becomes scant, the constitution is such that the above-mentioned problem is prevented from occurring by lowering the responsiveness of the operation lever 7, and notifying the operator that insufficient fuel remains by the operating feel of the operation lever 7.

In the aspect of the embodiment shown in the same FIG. 20(*b*), there is provided a float-type fuel sensor 77, which detects the remaining quantity of fuel inside the fuel tank 77*a* of the engine 1. And then, there is provided a memory table 10*m* of a corresponding relationship, wherein a frequency threshold value change coefficient α suddenly becomes large when the remaining fuel approaches zero. An operation lever 7 control fluctuation suppression quantity is changed by reading out from the memory table 10*m* in the suppression quantity specifying portion 10 a frequency threshold value change coefficient α corresponding to the remaining fuel detected by the fuel sensor 77.

In accordance therewith, by the frequency threshold value change coefficient α suddenly becoming large when the remaining quantity of fuel approaches 0, since the operation lever 7 control fluctuation suppression quantity becomes extremely large, a work machine (boom) only operates slowly in spite of the operation lever 7 being operated rapidly, making it possible for the operator to become aware from the lever operating feel thereof that insufficient fuel remains. Accordingly, it becomes possible to make efficient use of the remaining fuel to propel the equipment at low speed to a fueling site under its own power.

Now then, in construction equipment, there is performed in a swash plate drive mechanism 31 control so that hydraulic pump 2 absorbed torque T becomes constant torque (PM×q constant) based on the detection value PM of a pump discharge pressure sensor 44*a*. However, if the pump discharge pressure sensor 44*a* malfunctions, this constant torque control can no longer be performed. In this state, the hydraulic pump 2 absorption horsepower (engine speed× torque T) can increase beyond the horsepower outputted by the engine 1, and when the hydraulic pump 2 swash plate 2*a* does not return in the direction of the minimum value MIN, the engine stalls as-is.

In the aspect of the embodiment shown in FIG. 20(*c*), the constitution is such that the stalling of the engine when the pump discharge pressure sensor malfunctions is prevented from occurring.

A sensor voltage abnormality detecting portion 78 and switch 83, which are shown in the same FIG. 20(*c*), constitute a suppression quantity specifying portion 10.

Output voltage V of the pump discharge pressure sensor 44*a* is inputted to the sensor voltage abnormality detecting portion 78. In the normal voltage range, wherein the output voltage V of the pump discharge pressure sensor 44*a* is between 0.5V and 4.5V (determination YES in Steps 201, 202), the output voltage V of the pump discharge pressure sensor 44*a* is inputted as-is to a pump controlling portion 79 at normal operation (Step 203).

At normal operation, an output value PM corresponding to the output voltage V of the pump discharge pressure sensor 44*a* is read out from a pressure conversion table 80 in the pump controlling portion 79. Then, an upper limit swash plate command (upper limit discharge pressure) qmax corresponding to the pressure value PM thereof is read out from an upper limit discharge pressure table 81. The corresponding relationship between pressure PM and upper limit swash plate qmax, from which the upper limit torque of the hydraulic pump 2 is obtained, is stored in the upper limit discharge pressure table 81. And then the value, which is the smallest of the read-out upper limit swash plate qmax and pump swash plate command qr is selected and outputted by a minimum value selecting portion 82. In a normal state, switch 83 is switched to the terminal 83*a* side, and the swash plate command selected and outputted by the minimum value selecting portion 82, in other words, the smallest of the qmax, qr values, is outputted to a swash plate drive mechanism portion 31, and hydraulic pump 2 absorbed torque is made less than the upper limit torque.

Here, when the output voltage of the pump discharge pressure sensor 44*a* either becomes lower then 0.5V, or becomes higher than 4.5V as a result of a short circuit brought on by a broken wire or the like (determination of NO in Step 201, or determination of NO in Step 202), a sensor malfunction determination is made, and switch 83 switches to the terminal 83*b* side.

In a quantity of state detecting portion 9, engine speed is detected as the quantity of state x via a rotation pulse sensor 68 and F/V converter 69, and in a high-pass filter 11*b* of a response suppressing portion 11, a fluctuation component y of the engine speed x thereof is extracted, and added to the pump swash plate command r. And then, a compensated swash plate command, in which the fluctuation component y of engine speed is added to the pump swash plate command r thereof, is outputted to a swash plate drive mechanism portion 31 via the switch 83.

In accordance therewith, when hydraulic pump 2 absorbed torque exceeds engine 1 output torque, the pump swash plate command is reduced by an amount that corresponds to the engine speed drop quantity, enabling the absorbed torque of the hydraulic pump 2 to be lowered. As a result thereof, time can be bought before the engine stalls out, enabling the operator, in the meantime, to continue work by performing lever operations that relieve the load.

Next, an aspect of the embodiment, which changes a response suppression quantity in accordance with work content is described with reference to FIG. 21.

Figure 21A:
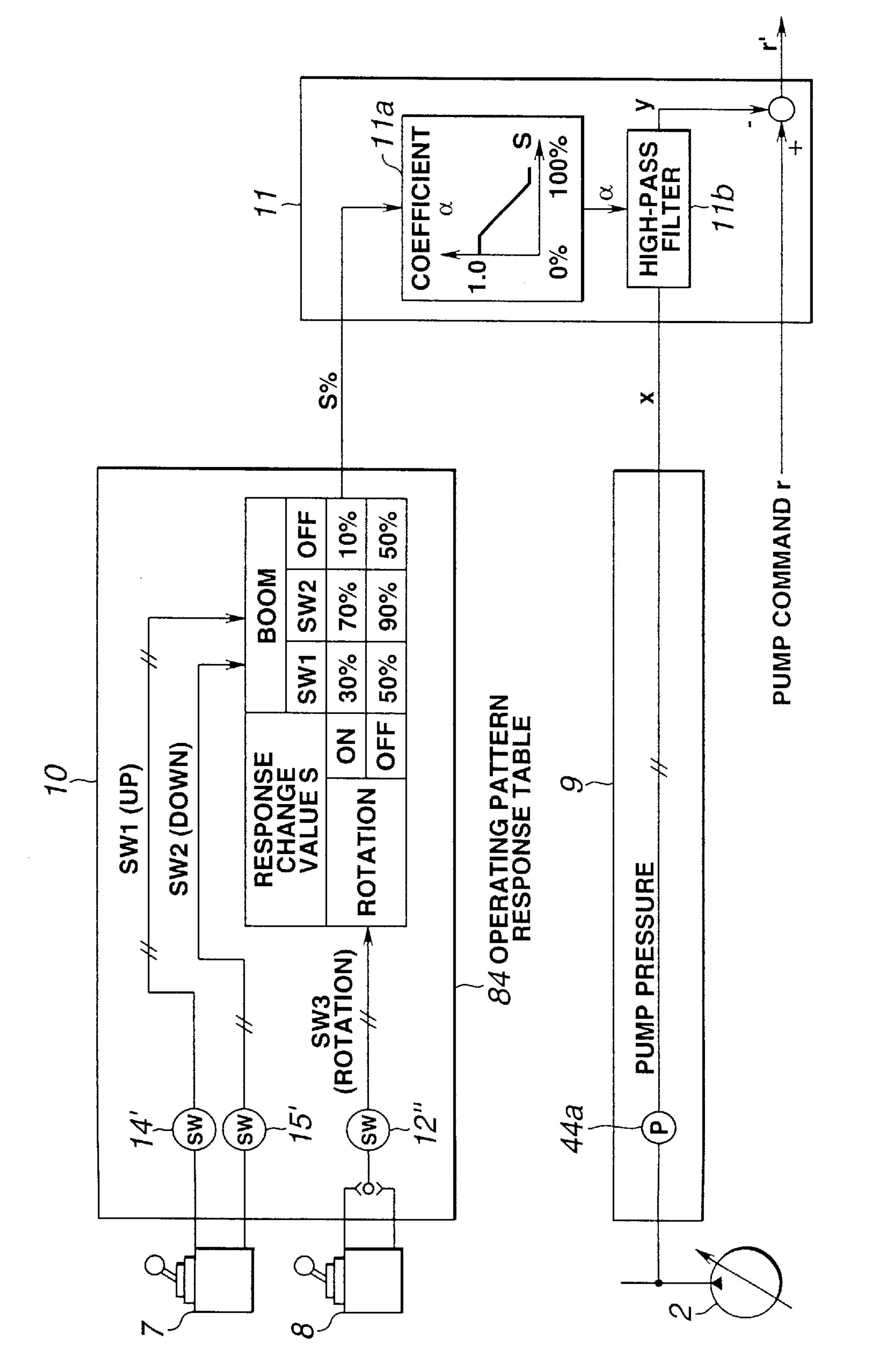
FIGS. 21(*a*)–(*c*) are diagrams showing various aspects for changing the suppression quantity of a response in accordance with the contents of work.
Figure 21B:
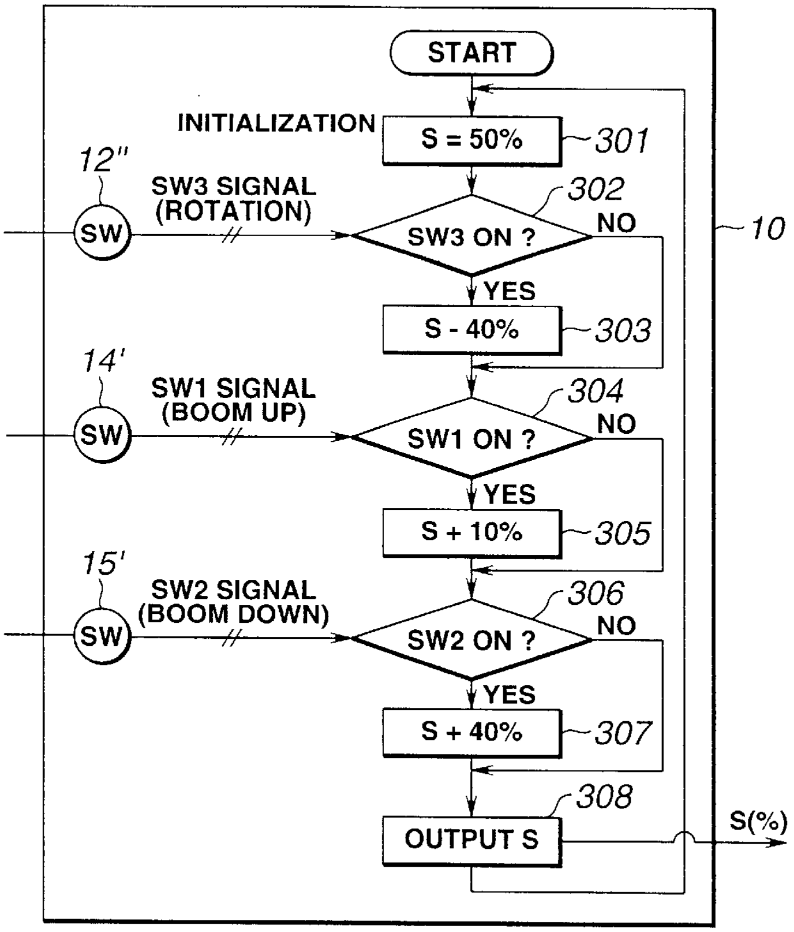
Figure 21C:
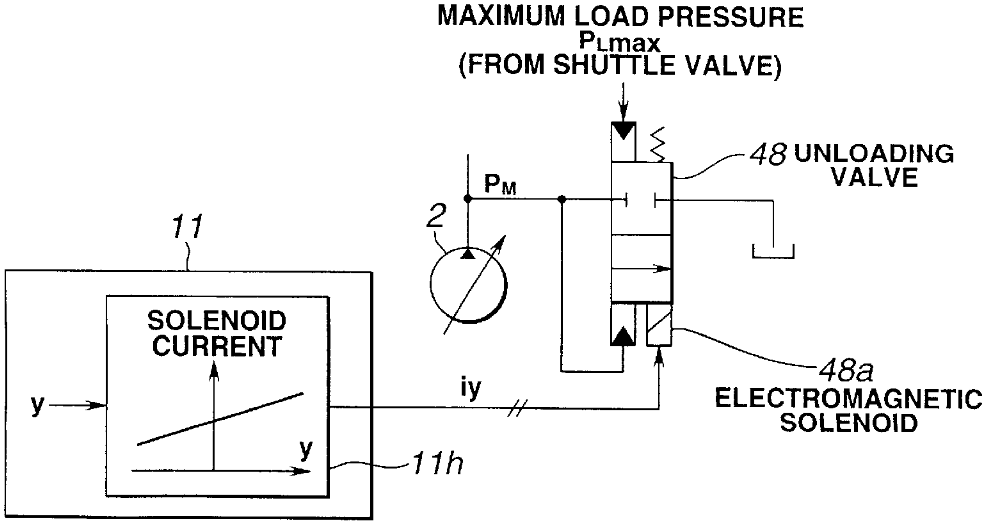
Figure 22A:
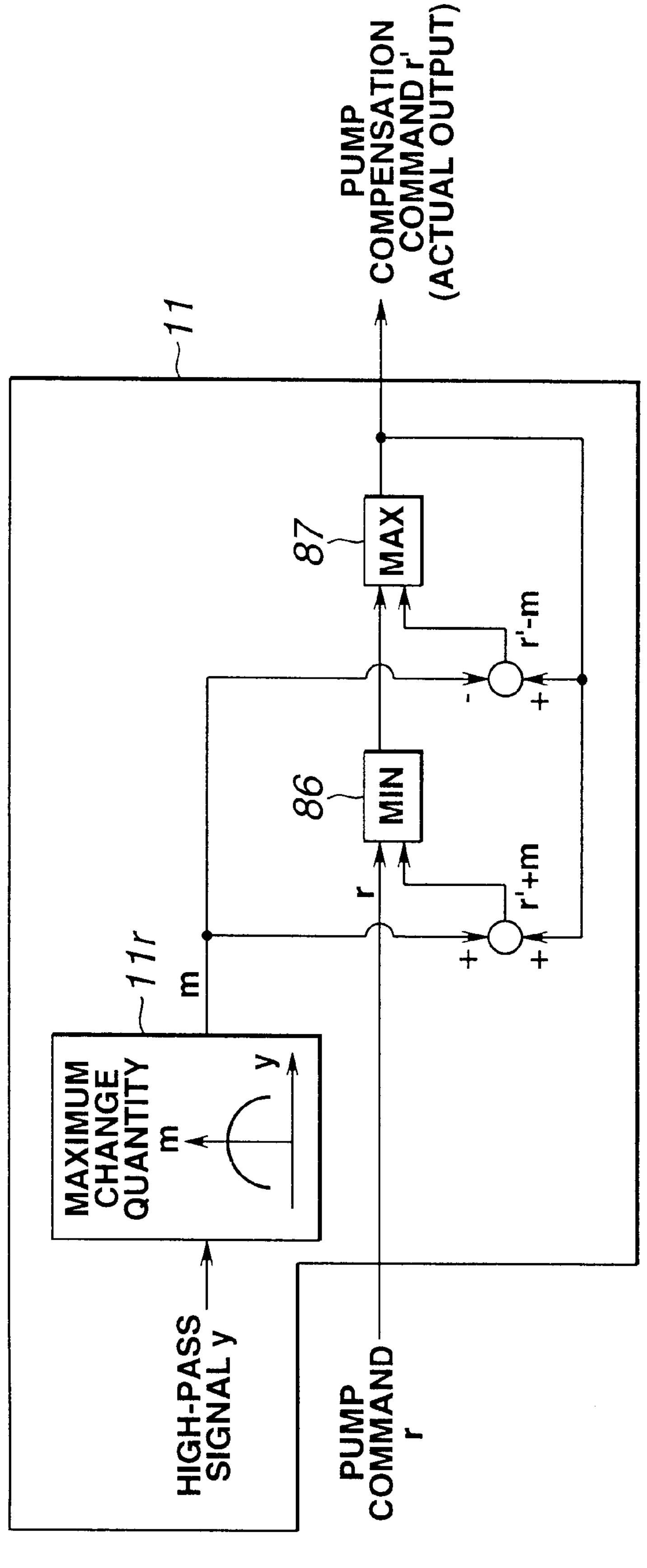
FIGS. 22(*a*)–(*f*) are diagrams showing various aspects for suppressing a response by performing an operation that limits the upper end of a command value change gradient in accordance with the magnitude of a fluctuation component.
Figure 22B:
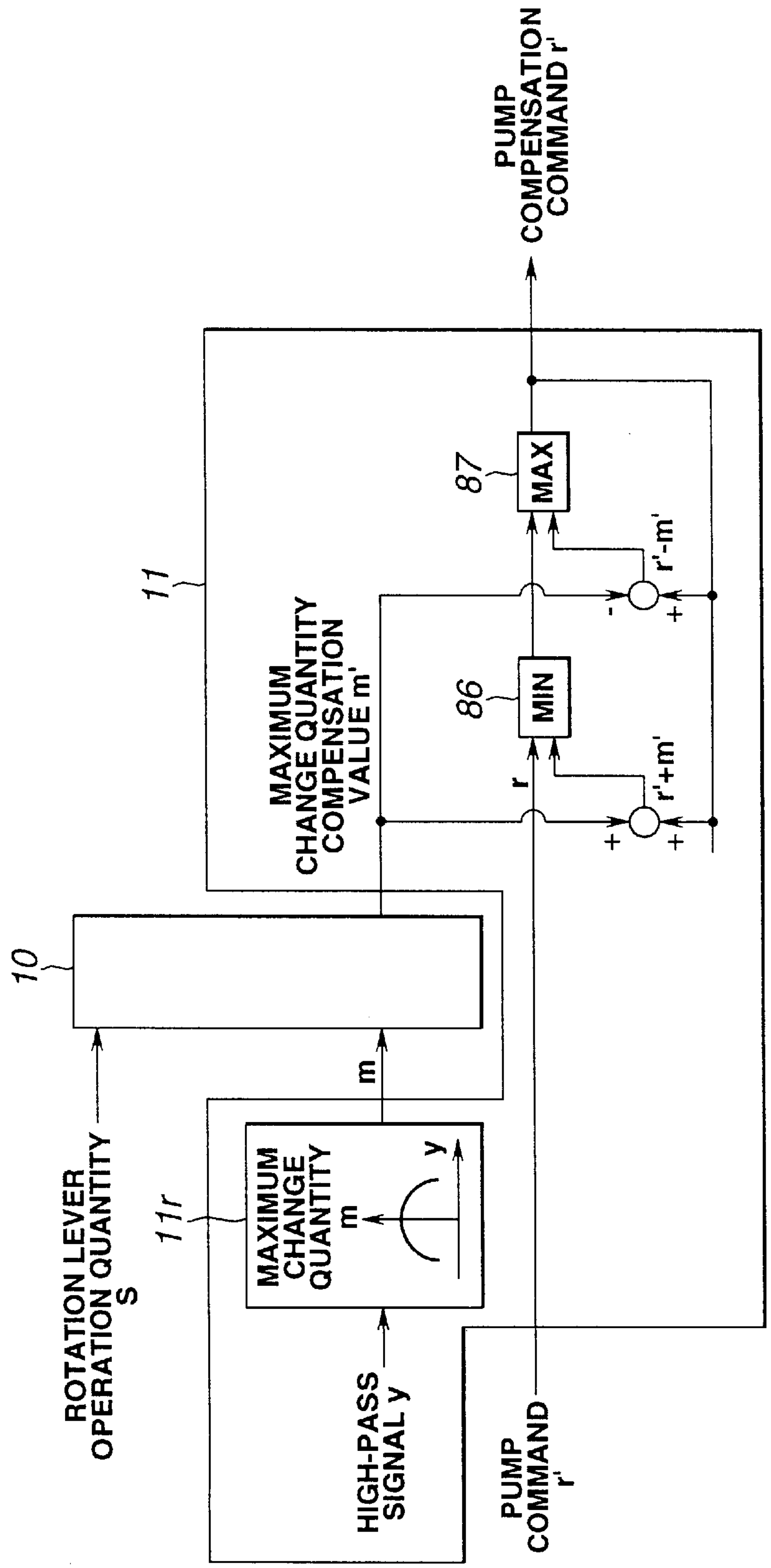
Figure 22C:
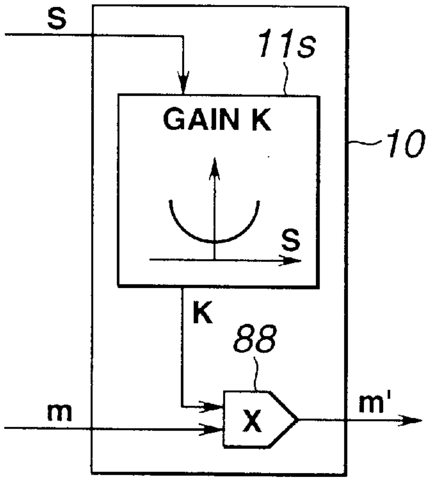
Figure 22D:
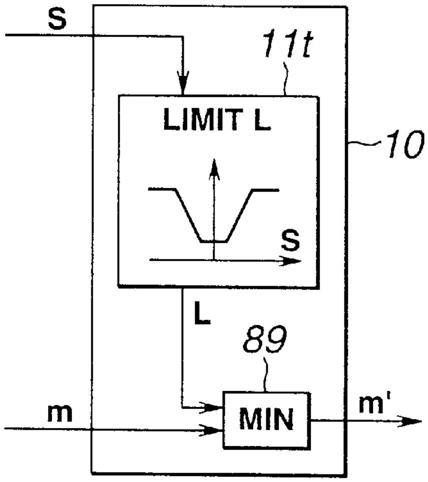
Figure 22E:
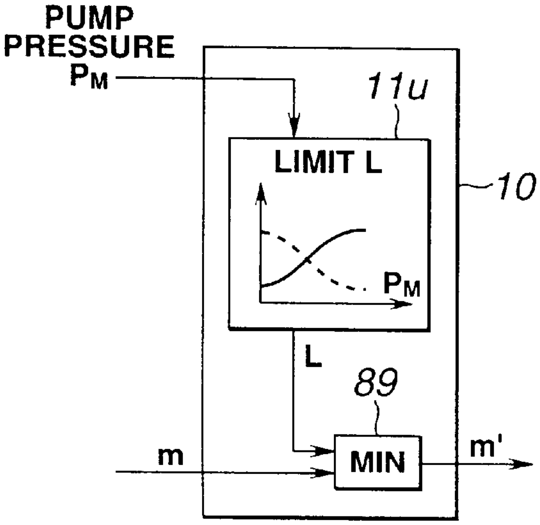
Figure 22F:
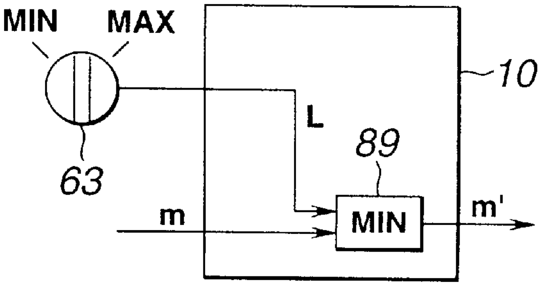

In the aspect of the embodiment shown in FIG. 21(*a*), the existence of a boom operation lever 7 operation is detected by pressure switches 14' (SW1), 15' (SW2). And the existence of a rotation operation lever 8 operation is detected by pressure switch 12" (SW3). Pressure switch 14' outputs an ON signal when the operation lever 7 is operated in the boom-up direction, and outputs an OFF signal when the operation lever 7 is not operated in the boom-up direction. Similarly, pressure switch 15' outputs an ON signal when the operation lever 7 is operated in the boom-down direction, and outputs an OFF signal when the operation lever 7 is not operated in the boom-down direction. Similarly, pressure switch 12" outputs on ON signal when a rotation operation is performed, and outputs an OFF signal when a rotation operation is not performed.

In an operation pattern response memory table 84 of a suppression quantity specifying portion 10, there is stored a response change value s corresponding to a boom-up operation ON/OFF, a boom-down operation ON/OFF, and a rotation operation ON/OFF. A response change value s is displayed and normalized as a % unit. Here, for an individual rotation operation (rotation is ON, but boom-up, boom-down are both OFF), the response change value s is set at 10% to make response the slowest. Further, for a combined control rotation and boom-up operation (rotation is ON, and boom-up is ON), the response change value s is set at 30% to make response the second slowest. Further, for an individual boom-up operation (rotation is OFF, boom-up is ON), the response change value s is set at 50%, for a combined control rotation and boom-down operation (rotation is ON, and boom-down is ON), the response change value s is set at 70%, for an individual boom-down operation (rotation is OFF, boom-down is ON), the response change value s is set at 90%, and when all levers are in the neutral position (rotation, boom-up, and boom-down all OFF), the response change value s is set at 50%.

Accordingly, a response change value s corresponding to an ON/OFF signal outputted from pressure switches 14', 15', 12" is read out from the above-mentioned operation pattern response memory table 84. In other words, the content of the work (individual rotation operation and so forth) is determined from combining existing operation lever 7, 8 operations, and in accordance with the work content thereof, a response change value s is selected for changing the response suppression quantity.

A response change value s determined by the suppression quantity specifying portion 10 is inputted to a response suppressing portion 11. In the response suppressing portion 11, there is provided a memory table 11*a* of a corresponding relationship, wherein a frequency threshold value change coefficient α becomes smaller as a response change value s becomes larger. A frequency threshold value change coefficient α corresponding to a response change value s is read out from the memory table 11*a* thereof.

In a suppression quantity specifying portion 9, a hydraulic pump 2 discharge pressure PM is detected as the quantity of state x by a pump discharge pressure sensor 44*a*. The discharge pressure x thereof is inputted to the response suppressing portion 11, and a fluctuation component y thereof is extracted in accordance with a high-pass filter 11*b*. This fluctuation component y is changed in accordance with a frequency threshold value change coefficient α read out from the above-mentioned memory table 11*a*. A compensated flow command r' is obtained by subtracting this fluctuation component y from a pump flow command r, and the compensated flow command r' is outputted to a swash plate drive mechanism portion 31.

Accordingly, when, for example, only operation lever 8 is operated, a determination is made that an individual rotation operation is being performed, the hydraulic pump 2 response suppression quantity becomes larger, and slow response suited to an individual rotation operation is realized by the frequency threshold value change coefficient α becoming larger in accordance with the response change value s becoming a small value (10%). In accordance therewith, lever operability, work efficiency are improved during an individual rotation operation.

The suppression quantity specifying portion 10 can also be constituted as shown in FIG. 21(*b*).

In the aspect of the embodiment shown in FIG. 21(*b*), there is a separate aspect, which obtains a response change value s in accordance with performing an addition or subtraction operation that accords with the existence of an operation lever 7, 8 operation.

That is, when all levers 7, 8 are in a neutral position, the response change value s is set at 50% (Step 301). Than, when a rotation operation is performed (rotation pressure switch SW3 in ON), 40% is subtracted from the current response change value s to achieve the required slow response (Determination of YES in Step 302, Step 303). Further, when a boom-up operation is performed (boom-up pressure switch SW1 is ON), 10% is added to the current response change value s to achieve a slightly faster response (Determination of YES in Step 304, Step 305). Further, when a boom-down operation is performed (boom-down pressure switch SW2 is ON), 40% is added to the current response change value s to achieve a fast response (Determination of YES in Step 306, Step 307). In accordance with performing addition and subtraction operations in this manner, a stipulated response change value s if outputted to the response suppressing portion 11 (Step 308).

Consequently, when performing a boom-down operation during roller compaction work, which involves repeated boom-up/down operations, the response change value s becomes 100%, the hydraulic pump 2 response suppression quantity can be set to the minimum (enabling maximum hydraulic pump 2 response), making it possible to ensure the roller compaction shock force. Further, when performing a boom-up operation during roller compaction work, the response change value s becomes 60%, the hydraulic pump 2 response suppression quantity can be made slightly larger (enabling a slightly smaller hydraulic pump 2 response), making it possible to prevent pop out in line with a boom-up operation.

Further, at a combined control rotation and boom-up operation, since the response change value s becomes 20%, enabling the hydraulic pump 2 response suppression quantity to be moved to near maximum, when performing, for example, a hoist rotation work, in which a load is loaded into a dump truck or the like, the hydraulic pump 2 responds slowly even if the operation levers are manipulated roughly. In accordance therewith, the work machine can be raised without spilling the dirt. Further, at a combined control rotation and boom-down operation, since the response change value s becomes 50%, when performing, for example, down rotation work, in which the work machine is returned to the excavation position empty, hydraulic pump 2 response relative to lever control becomes fast, enabling work efficiency to be enhanced.

Rather than compensating a command to the pump 2 as described above, as shown in FIG. 21(*c*), a command to an unloading valve 48, which unloads pump 2 discharge pressure oil to a tank can be compensated instead. This FIG. 21(*c*) is an example of the same constitution as that of FIG. 14(*c*) described above, and a command to the unloading valve 48 is compensated so that the command current iy to the unloading valve 48 becomes larger as the fluctuation component y becomes larger, the unloading orifice is suppressed, and in accordance therewith, the pump 2 load pressure is suppressed.

In the above aspect of the embodiment, a fluctuation component y is obtained in a response suppressing portion 11, and response is suppressed by subtracting the fluctuation component y thereof from a command value r, but in place thereof, as shown in FIG. 22, response can also be suppressed by performing an operation, which limits the upper limit of a gradient of change of a command value r in accordance with the size of a fluctuation component y.

In the response suppressing portion 11 shown in FIG. 22(*a*), there is stored in a function table 11*r* a function, by which the maximum change quantity m of a pump flow command r (upper limit value of the gradient of change of a command value r) becomes smaller as the absolute value of a fluctuation component y becomes larger. Accordingly, when a fluctuation component y is computed, and outputted from a high-pass filter 11, the maximum change quantity m of the fluctuation component y thereof is read out from the above-mentioned function table 11*r*.

A maximum flow command r'+m, in which a maximum change quantity m is added to the previous pump compensation flow command value r', and a current pump flow command value r are inputted to a minimum value selecting portion 86, and the smallest of the values thereof is selected, and outputted. A selected value outputted from the minimum value selecting portion 86, and a minimum flow command r'−m, in which a maximum change quantity m is subtracted from the previous pump compensation flow command value r', are inputted to a maximum value selecting portion 87, and the largest of the values thereof is outputted as the current pump compensation flow command value r'. In this manner, the current pump flow command value r is outputted after being compensated so as to be less than the maximum flow command r'+m, and more than the minimum flow command r'−m.

When the absolute value of a fluctuation component y is small, since the maximum change quantity takes a sufficiently large value, and the range of the pump flow command value r'−m through r'+m is large, the change in the pump flow command r is not inhibited much at all. Therefore, hydraulic pump 2 response is hardly suppressed at all. Since the maximum change quantity m takes a small value in accordance with the absolute value of a fluctuation component y becoming large, and the range of the pump flow command value r'−m through r'+m becomes small, the change in the pump flow command r is limited, and hydraulic pump 2 response is suppressed.

Further, in FIG. 22(*a*), using a maximum change quantity m, a change on the side, in which a pump flow command r increases, is limited in accordance with a maximum flow command r'+m, and furthermore, a change on the side, in which a pump flow command r decreases, is limited in accordance with a minimum flow command r'−m, but the pump flow command r increase-side change in accordance with the maximum flow command r'+m alone can be limited. In the case thereof, the provision of a maximum value selecting portion 87 is omitted.

FIG. 22(*b*) is an aspect of the embodiment, which adds a suppression quantity specifying portion 10 to the constitution shown in FIG. 22(*a*). The operation quantity of a rotation operation lever 8, for example, is inputted to the suppression quantity specifying portion 10, and the hydraulic pump 2 response suppression quantity is changed in accordance with the lever operation quantity thereof.

In the aspects of the embodiment up until FIG. 21, it was necessary to obtain a frequency threshold value change coefficient α in accordance with the magnitude of a lever operation quantity, but in this aspect of the embodiment, the hydraulic pump 2 response suppression quantity can be changed without obtaining a frequency threshold value change coefficient α. Specific examples thereof are provided in FIG. 22(*c*)–FIG. 22(*d*).

In the suppression quantity specifying portion 10 shown in FIG. 22(*c*), a corresponding relationship, wherein gain K becomes larger as the absolute value of lever operation quantity S becomes larger, is stored in a memory table 11*s*. Accordingly, gain K corresponding to a current level operation quantity S is obtained from the above-mentioned memory table 11*s*, the gain K thereof is multiplied in a multiplying portion 88 by a maximum change quantity m, and the maximum change quantity m, by which gain K thereof was multiplied, is outputted as a maximum change quantity compensation value m'. As a result thereof, by gain becoming small when the rotation operation lever 8 is operated in the fine control region (when the absolute value of the operation quantity S is small), the maximum change quantity m is compensated to a smaller value m', making it impossible for a pump flow command r to be suddenly changed. In other words, the hydraulic pump 2 response suppression quantity is increased. Conversely, by gain becoming large when the rotation operation lever 8 is operated in the full lever region (when the absolute value of the operation quantity S is large), the maximum change quantity m is compensated to a larger value m', permitting a sudden change in a pump flow command r. In other words, the hydraulic pump 2 response suppression quantity is decreased. In this way, the same as when a frequency threshold value change coefficient α is obtained, the response suppression quantity is changed in a manner in which a fluctuation component y becomes large at operation lever fine control, and becomes small at full lever operation.

Further, in the suppression quantity specifying portion 10 shown in FIG. 22(*d*), a corresponding relationship, wherein a limiting value Lt becomes larger as the absolute value of lever operation quantity S becomes larger, is stored in a memory table 11*t*. Accordingly, a limiting value Lt corresponding to a current lever operation quantity S is obtained from the above-mentioned memory table lit, the smallest value of the maximum change quantity m, and this limiting value Lt is selected in a minimum value selecting portion 89, and the maximum change quantity m limited in accordance with this limiting value Lt is outputted as a maximum change quantity compensation value m'. In this case was well, the response suppression quantity is changed in a manner in which a fluctuation component y becomes large at operation lever fine control, and becomes small at full lever operation.

Further, as shown in FIG. 22(*e*), the hydraulic pump 2 discharge pressure PM can be used instead of the operation quantity of the rotation operation lever 8.

In the suppression quantity specifying portion 10 of FIG. 22(*e*), a corresponding relationship, wherein a limiting value Lt becomes larger as pump discharge pressure PM becomes larger, is stored in a memory table 11*u*. Accordingly, a limiting value Lt corresponding to a current pump discharge pressure PM is obtained from the above-mentioned memory table 11*u*, the smallest value of the maximum change quantity m and this limiting value Lt is selected in the minimum value selecting portion 89, and the maximum change quantity m limited in accordance with this limiting value Lt is outputted as a maximum change quantity compensation value m'.

Accordingly, when pump discharge pressure PM is low, a change in the hydraulic pump 2 discharge flow command r is subjected to limiting in accordance with the limiting value Lt, and slowly increases and decreases. Conversely, when the pump discharge pressure has become high, a change in the hydraulic pump 2 discharge flow command r is no longer subjected to limiting in accordance with the limiting value Lt, and sudden changes in the command value r are permitted.

As a result thereof, when performing work, in which a load is not applied to a work machine, such as correction work, for example, since the pump flow command r ceases to imitate a sudden lever operation, and changes smoothly, even an unskilled operator can readily perform lever operations when doing correction work. Further, when performing work, in which hydraulic actuator load pressure (pump discharge pressure) becomes high, such as heavy excavation work, and loading work, fast response that accords with lever operation is achieved.

Further, from the standpoint of the constitution of a hydraulic circuit, there are cases, in which a hydraulic pump 2 servo mechanism is driven by using the driving pressure of the hydraulic pump 2 itself. In this case, a change in discharge flow (responsiveness) becomes structurally faster as pump discharge pressure PM becomes higher. Therefore, in this case, there can be stored in memory table 11*u* a corresponding relationship, wherein, by contrast, a limiting value Lt becomes smaller as pump discharge pressure PM becomes larger, as indicated by the broken line in FIG. 11(*e*). In accordance therewith, constant responsiveness is maintained by the hydraulic pump 2 at all times.

Further, as shown in FIG. 22(*f*), rather than changing response suppression quantity in accordance with the operation quantity of the rotation operation lever 8, and hydraulic pump 2 discharge pressure PM, response suppression quantity can be changed by changing the limiting value Lt of the maximum change quantity m in accordance with manually operating an adjustment dial 63. According to this aspect of the embodiment, the maximum change quantity m is adjusted to an arbitrary value, and the response suppression quantity is changed in accordance with operator skill level, and work content.

In this case, the response suppression quantity can be switched ON/OFF in binary. The switch thereof is provided, for example, on the knob of an operation lever.

For example, when positioning work, which requires steadiness, and bucket sifting work (skeleton work), which requires responsiveness, are performed together, each time the switch provided on the knob of an operation lever is pressed, the response suppression quantity is switched ON/OFF. In accordance therewith, it becomes possible for an operator to switch the response suppression quantity ON/OFF without releasing his hand from the operation lever, and since work continuity is maintained, work efficiency is greatly enhanced.

Furthermore, in the aspect of the embodiment shown in FIG. 22(*b*), a suppression quantity specifying portion 10 is provided in the stage subsequent to a memory table 11*r*, which determines a maximum change quantity m, but, of course, the value of a fluctuation component y can also be changed by providing a suppression quantity specifying portion 10 in the stage previous to the same table 11*r*.

Furthermore, in describing the aspects of the embodiment shown in FIG. 22, the example used was of a case in which the response suppression target apparatus is a hydraulic pump 2, but the various hydraulic control apparatus cited in the aspects of the embodiment up to FIG. 21, such as an engine, flow control valve, pressure compensating valve, and so forth, can also be used as the response suppression target apparatus.

Furthermore, in the aspects of the embodiment described above, as arithmetic operations for the response control performed by a response suppressing portion 11, it is assumed that an arithmetic operation, in which a fluctuation component y is subtracted from a command value r (for example, FIG. 2), or in which the upper limit of a gradient of a change of a command value r is limited in accordance with the magnitude of a fluctuation component y (for example, FIG. 22(*a*)), is performed, but the arithmetic operation for response suppression performed by a response suppressing portion 11 is not limited to only such subtraction, limiting operations, but rather can also be various other arithmetic operations, such as multiplication, division, or a combination of various arithmetic operations, such as multiplication and division.

Figure 24:
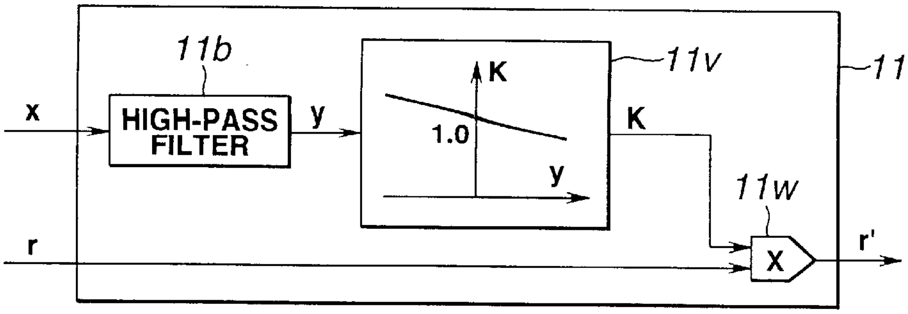
FIG. 24 is a diagram showing an example of an aspect for suppressing response in accordance with multiplying by a response suppressing portion.

FIG. 24 shows an example of an aspect of the embodiment, which performs response suppression in accordance with multiplication in a response suppressing portion 11.

To the response suppressing portion 11 shown in FIG. 24, a pump flow command r is inputted, and furthermore, a quantity of state x, which indicates boom load pressure, is also inputted. A fluctuation component y of the quantity of state x is determined in the high-pass filter b of the response suppressing portion 11. In a memory table 11*v* of the response suppressing portion 11, there is set gain K, the value of which becomes smaller as a fluctuation component y becomes larger. The gain K thereof takes a value of 1.0 when the fluctuation component y is 0, and takes a value in the vicinity of 1.0 in accordance with the value of the fluctuation component y. Gain K, which accords with a fluctuation component y value, is read out from memory table 11*v*, multiplied by a pump command value r in a multiplier 11*w*, and outputted to the pump 2 as a pump compensated flow command r'(=r·K).

Consequently, when boom load pressure x fluctuates, and pressure increases, the fluctuation component y becomes y>0, a gain K of less than 1.0 is multiplied by the pump flow command r, and a flow command that is smaller than the actual flow command r is outputted to the pump 2 as a compensated flow command r'. Consequently, pump 2 flow is decreased, and the flow supplied to the boom is decreased, the result thereof being that an increase in the pressure that drives the boom is suppressed.

Further, in the aspects of the embodiment described above, the descriptions were premised on an input signal r (for example, the pump flow command r), and a quantity of state x (for example, the boom load pressure x) relative to a response suppression target apparatus (for example, the hydraulic pump 2) being a different physical quantity, but the input signal r, and quantity of state x can also be the same physical quantity.

Figure 25:
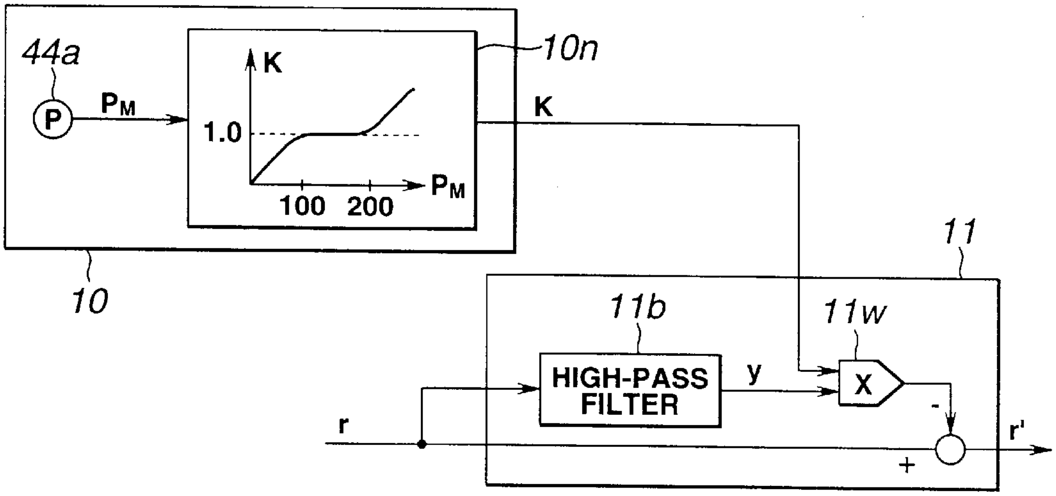
FIG. 25 is a diagram showing an aspect, which inputs a pump flow command into a response suppressing portion, and which performs response suppression by inputting this pump flow command into the response suppressing portion as a quantity of state.

FIG. 25 shows an aspect of the embodiment, which performs response suppression by inputting a pump flow command r to a response suppressing portion 11, and furthermore, by inputting this pump flow command r to the response suppressing portion 11 as a quantity of state x.

In the high-pass filter 11*b* of the response suppressing portion 11 shown in FIG. 25, a fluctuation component y of a pump flow command r is obtained. Meanwhile, in a memory table 10*n* of a suppression quantity specifying portion 10, there is set a suppression quantity (gain) K that accords with pump discharge pressure PM detected by a pump discharge pressure sensor 44*a*. The suppression quantity K thereof takes a value of less than 1.0 when the pump discharge pressure PM is less than 100 $kg/cm^2$, takes a value of 1.0 when the pump discharge pressure PM ranges between 100 $kg/cm^2$ and 200 $kg/cm^2$, and takes a value of greater than 1.0 when the pump discharge pressure PM is greater than 200 $kg/cm^2$. A suppression quantity K that accords with a pump discharge pressure PM read out from memory table 10*n* is applied to a multiplier 11*w* of the response suppressing portion 11, and multiplied by a fluctuation component y of a pump flow command x, and a suppression quantity in accordance with the pump discharge pressure PM is subtracted from a pump flow command r as a changed fluctuation component K·y. Consequently, a compensated flow command r' (=r−K·y) is outputted to the pump 2.

Consequently, when performing light load work, such as rough combing work, the pump discharge pressure PM becomes less than 100 $kg/cm^2$, and the pump 2 response suppression quantity K in accordance therewith becomes a small quantity of less than 1.0, permitting rapid movement. Further, when performing medium load work, such as loading work, the pump discharge pressure PM ranges between 100 $kg/cm^{2-200}$ $kg/cm^2$, and the pump 2 response suppression quantity K in accordance therewith becomes a standard magnitude 1.0, suppressing rapid movement. Furthermore, at heavy load work, such as heavy excavation work and in the pump relief state, the pump discharge pressure PM becomes greater than 200 $kg/cm^2$, and in accordance therewith, the fluctuation component y is assessed as excessive, and the pump 2 response suppression quantity K becomes a large quantity of greater than the standard magnitude of 1.0, suppressing rapid movement in the extreme.

Figure 26:
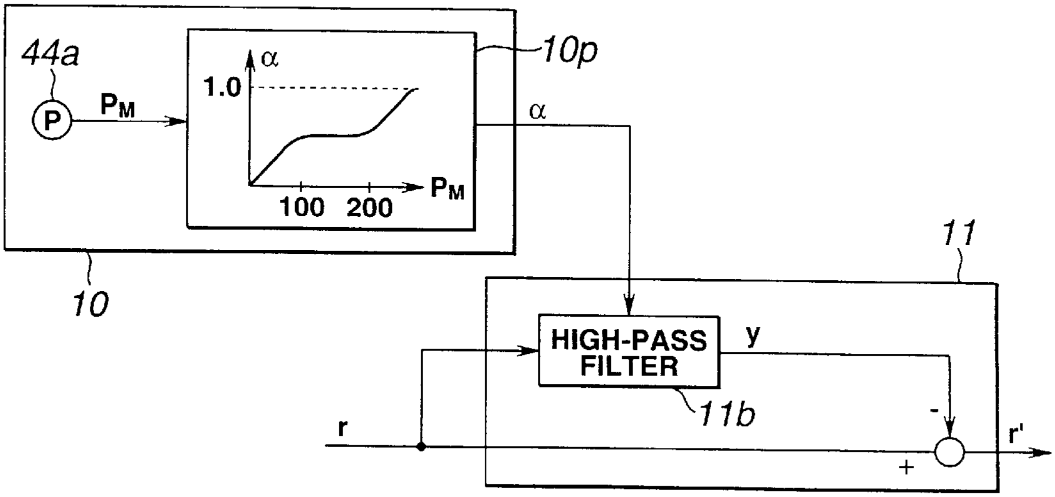
FIG. 26 is a diagram showing an example of a variation of FIG. 25.

Furthermore, in FIG. 25, gain K that accords with pump discharge pressure PM is set as a suppression quantity in the memory table 10*n* of the suppression quantity specifying portion 10, but, as shown in FIG. 26, a frequency threshold value change coefficient α that accords with a pump discharge pressure PM can also be set in a memory table 10*p* of a suppression quantity specifying portion 10.

A frequency threshold value change coefficient α that accords with a pump discharge pressure PM read out from the memory table 10*p* is applied a high-pass filter 11*b* of a response suppressing portion 11, a fluctuation component y of a pump flow command r is changed in accordance with a pump discharge pressure PM, and outputted from the high-pass filter 11*b*, and same is subtracted from a pump flow command r. Consequently, a compensated flow command r' is outputted to the pump 2.

What is claimed is:

1. A control device of a hydraulically-operated machine having hydraulic control apparatus comprised of:

a motor, a hydraulic pump which is driven by the motor, at least one hydraulic actuator which is driven in accordance with being supplied with a pressure oil discharged from the hydraulic pump, and a flow control valve which is driven in accordance with an operation of an operation lever and which controls a flow of the pressure oil supplied to the hydraulic actuator; a response suppression target apparatus, established from said hydraulic control apparatus, for which a response of an output signal relative to an input signal is to be suppressed, the control device of the hydraulically-operated machine, comprising:

quantity of state detecting means for detecting as a quantity of state either a physical quantity which changes in accordance with an operation of the response suppression target apparatus, or an operation quantity which changes the physical quantity; and response suppressing means for suppressing a response of the response suppression target apparatus by subtracting from an input signal to the response suppression target apparatus a frequency component signal of greater than a predetermined frequency, from among quantity of state detection signals detected by the quantity of state detecting means.

2. A control device of a hydraulically-operated machine having hydraulic control apparatus comprised of: a hydraulic pump which is driven by a motor, at least one hydraulic actuator which is driven in accordance with being supplied with a pressure oil discharged from the hydraulic pump, and a flow control valve which is driven in accordance with an operation of an operation lever and which controls a flow of the pressure oil supplied to the hydraulic actuator; a response suppression target apparatus, established from said hydraulic control apparatus for which a response of an output signal relative to an input signal is to be suppressed, the control device of the hydraulically-operated machine comprising:

quantity of state detecting means for detecting as a quantity of state either a physical quantity which changes in accordance with an operation of the response suppression target apparatus, or an operation quantity which changes the physical quantity; and response suppressing means for suppressing the response of the response suppression target apparatus by limiting a per-unit-time change quantity of an input signal to the response suppression target apparatus so that same becomes less than an upper limit value, which accords with a magnitude of a fluctuation quantity of a quantity of state detection signal detected by the quantity of state detecting means.

3. A control device of a hydraulically-operated machine having hydraulic control apparatus comprised of: a hydraulic pump which is driven by a motor, at least one hydraulic actuator which is driven in accordance with being supplied with a pressure oil discharged from the hydraulic pump, and a flow control valve which is driven in accordance with an operation of an operation lever and which controls a flow of the pressure oil supplied to the hydraulic actuator; a response suppression target apparatus, established from said hydraulic control apparatus for which a response of an output signal relative to an input signal is to be suppressed, the control device of the hydraulically-operated machine comprising:

quantity of state detecting means for detecting as a quantity of state either a physical quantity which changes in accordance with an operation of the response suppression target apparatus, or an operation quantity which changes the physical quantity;

suppression quantity specifying means for specifying a suppression quantity of the response of the response suppression target apparatus; and response suppressing means for suppressing the response of the output signal relative to the input signal in accordance with compensating the input signal to the response suppression target apparatus so as to prevent by a magnitude of the specified suppression quantity a change in the physical quantity based on the quantity of state detected by the quantity of state detecting means and the suppression quantity specified by the suppression quantity specifying means.

4. The control device of the hydraulically-operated machine according to claim 3, wherein the response suppressing means performs a compensation operation, which subtracts from an input signal to the response suppression target apparatus a frequency component signal of greater than a prescribed frequency, from among quantity of state detection signals detected by the quantity of state detecting means.

5. The control device of the hydraulically-operated machine according to claim 3, wherein the response suppressing means performs a compensation operation, which subtracts from an input signal to the response suppression target apparatus a frequency component signal of greater than a prescribed frequency, which accords with a suppression quantity specified in accordance with the suppression quantity specifying means, from among quantity of state detection signals detected by the quantity of state detecting means.

6. The control device of the hydraulically-operated machine according to claim 3, wherein the response suppressing means performs a compensation operation, which limits a per-unit-time change quantity of an input signal to the response suppression target apparatus so that same becomes less than an upper limit value, which accords with a magnitude of a fluctuation quantity of a quantity of state detection signal detected by the quantity of state detecting means.

7. The control device of the hydraulically-operated machine according to claim 3, wherein the response suppressing means performs a compensation operation, which limits a per-unit-time change quantity of an input signal to the response suppression target apparatus so that same becomes less than an upper limit value, which accords with a magnitude of a fluctuation quantity of a quantity of state detection signal detected by the quantity of state detecting means, and which changes the upper limit value in accordance with a suppression quantity specified in accordance with the suppression quantity specifying means.

8. The control device of the hydraulically-operated machine according to claim 3, wherein the suppression quantity specifying means specifies a suppression quantity in accordance with a discharge pressure of the hydraulic pump, or a load pressure of the hydraulic actuator, or a differential pressure of the hydraulic pump discharge pressure and the hydraulic actuator load pressure.

9. The control device of the hydraulically-operated machine according to claim 3, wherein the suppression quantity specifying means specifies a suppression quantity in accordance with an operation quantity of the operation lever.

10. The control device of the hydraulically-operator machine according to claim 3, wherein the suppression quantity specifying means specifies a suppression quantity in accordance with a combination of respective hydraulic actuators driven in accordance with respective operation levers.

11. The control device of the hydraulically-operated machine according to claim 3, wherein the suppression quantity specifying means specifies a suppression quantity in accordance with an attitude of the hydraulically-operated machine.

12. The control device of the hydraulically-operated machine according to claim 3, wherein the suppression quantity specifying means specifies a suppression quantity in accordance with a discharge command signal to the hydraulic pump, or a swash plate position of the hydraulic pump, or a discharge flow of the hydraulic pump, or an absorbed torque of the hydraulic pump.

13. The control device of the hydraulically-operated machine according to claim 3, wherein the suppression quantity specifying means specifies a suppression quantity in accordance with a deviation between either a number of revolutions of the motor, or a target number of revolutions of the motor, and an actual number of revolutions.

14. The control device of the hydraulically-operated machine according to claim 3, wherein the suppression quantity specifying means specifies a suppression quantity in accordance with a temperature of a pressure oil, or a temperature of a cooling water of the motor.

15. The control device of the hydraulically-operated machine according to claim 3, wherein the suppression quantity specifying means specifies a suppression quantity in accordance with a manual operation.

16. The control device of the hydraulically-operated machine according to claim 3, further comprising:

abnormality detecting means for detecting an abnormality of the hydraulically-operated machine, the suppression quantity specifying means specifying a suppression quantity, which accords with an abnormality content, when an abnormality is detected in accordance with the abnormality detecting means.

17. The control device of a hydraulically-operated machine according to either one of claims 1 to 3, further comprising:

as the hydraulic control apparatus, a pressure compensating valve for controlling a differential pressure between a pressure of a pressure oil of a pressure oil influx side, and a pressure of a pressure oil of a pressure oil outflow side of the flow control valve, the pressure compensating valve being established as the response suppression target apparatus.

18. The control device of the hydraulically-operated machine according to either one of claims 1 to 3, further comprising:

as the hydraulic control apparatus, a control valve for discharging an excess amount of pressure oil discharged from the hydraulic pump, the control valve being established as the response suppression target apparatus.

19. The control device of the hydraulically-operated machine according to either one of claims 1 to 3, wherein a quantity of state, which is detected by the quantity of state detecting means, is a discharge pressure of the hydraulic pump, or a load pressure of the hydraulic actuator, or a differential pressure of the hydraulic pump discharge pressure and the hydraulic actuator load pressure.

20. The control device of the hydraulically-operated machine according to either one of claims 1 to 3, wherein a quantity of state, which is detected by the quantity of state detecting means, is an operation quantity of the operation lever.

21. The control device of the hydraulically-operated machine according to either one of claims 1 to 3, wherein a quantity of state, which is detected by the quantity of state detecting means, is a discharge command signal to the hydraulic pump, or a swash plate position of the hydraulic pump, or a discharge flow of the hydraulic pump, or an absorbed torque of the hydraulic pump.

22. The control device of the hydraulically-operated machine according to either one of claims 1 to 3, wherein a quantity of state, which is detected by the quantity of state detecting means, is a deviation between either a number of revolutions of the motor, or a target number of revolutions of the motor, and an actual number of revolutions.

23. The control device of the hydraulically-operated machine according to either one of claims 1 to 3, wherein a quantity of state, which is detected by the quantity of state detecting means, is a command signal to the response suppression target apparatus.

24. The control device of the hydraulically-operated machine according to either one of claims 1 to 3, wherein the response suppressing means performs a compensation operation, which multiplies by an input signal to the response suppression target apparatus a gain, which accords with a frequency component signal of greater than a prescribed frequency, from among quantity of state detection signals detected by the quantity of state detecting means.

* * * * *